(12) United States Patent
Tabata et al.

(10) Patent No.: US 7,118,509 B2
(45) Date of Patent: *Oct. 10, 2006

(54) MULTIPLE-STEP TRANSMISSION

(75) Inventors: Atsushi Tabata, Okazaki (JP); Akira Hoshino, Nishikamo-gun (JP); Terufumi Miyazaki, Toyota (JP); Atsushi Honda, Seto (JP); Akiharu Abe, Toyota (JP); Hirofumi Ota, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 130 days.

This patent is subject to a terminal disclaimer.

(21) Appl. No.: 10/838,097

(22) Filed: May 4, 2004

(65) Prior Publication Data

US 2004/0242366 A1    Dec. 2, 2004

(30) Foreign Application Priority Data

May 27, 2003    (JP)    ............................ 2003-149540
Aug. 5, 2003    (JP)    ............................ 2003-286623

(51) Int. Cl.
  *F16H 3/62*    (2006.01)
(52) U.S. Cl. ..................................... 475/276
(58) Field of Classification Search ............... 475/275, 475/276
  See application file for complete search history.

(56) References Cited

U.S. PATENT DOCUMENTS

| 6,634,980 B1 | 10/2003 | Ziemer | |
| 6,743,140 B1 * | 6/2004 | Lee et al. | ..................... 475/275 |
| 6,758,784 B1 * | 7/2004 | Lee et al. | ..................... 475/275 |

FOREIGN PATENT DOCUMENTS

| DE | 101 15 983 | 10/2002 |
| JP | 8-105496 | 4/1996 |
| JP | 2956173 | 7/1999 |
| JP | 2000-199549 | 7/2000 |

(Continued)

*Primary Examiner*—Dirk Wright
(74) *Attorney, Agent, or Firm*—Oblon, Spivak, McClelland, Maier & Neustadt, P.C.

(57) ABSTRACT

A multiple-step transmission including a first transmission portion including a first intermediate output path which transmits, at a first speed ratio, an input rotary motion of an input member, and a second intermediate output path which transmits the input rotary motion at a second speed ratio greater than the first speed ratio; and a second transmission portion including a 2-1, a 2-2, and a 2-3 planetary gear set each of which includes a sun gear, a carrier, and a ring gear, the 2-1, 2-2, and 2-3 planetary gear sets being partly connected to each other to provide a first, a second, a third, a fourth, and a fifth rotary element, the second transmission portion further including a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion, the brakes and the clutches being switched to provide the output rotary motion in each of a plurality of speed steps.

21 Claims, 40 Drawing Sheets

FOREIGN PATENT DOCUMENTS

| | | |
|---|---|---|
| JP | 2000-266138 | 9/2000 |
| JP | 2001-82555 | 3/2001 |
| JP | 2001-182785 | 7/2001 |
| JP | 2002-206601 | 7/2002 |
| JP | 2002-227940 | 8/2002 |
| JP | 2002-295609 | 10/2002 |
| JP | 2002-323098 | 11/2002 |

* cited by examiner

|  | C1 | C2 | C3 | C4 | B1 | B2 | SPEED RATIO | SPEED-RATIO STEP |
|---|---|---|---|---|---|---|---|---|
| 1st | ○ |  |  |  |  | ○ | 3.518 |  |
| 2nd | ○ |  |  |  | ○ |  | 2.508 | 1.402 |
| 3rd | ○ | ○ |  |  |  |  | 1.802 | 1.392 |
| 4th | ○ |  |  | ○ |  |  | 1.295 | 1.391 |
| 5th |  |  | ○ | ○ |  |  | 1.000 | 1.295 |
| 6th |  | ○ |  | ○ |  |  | 0.834 | 1.200 |
| 7th |  |  |  | ○ | ○ |  | 0.690 | 1.208 |
| 8th |  |  | ○ |  | ○ |  | 0.588 | 1.173 |
| Rev |  | ○ |  |  |  | ○ | 2.574 | TOTAL RANGE 5.980 |

|  | C1 | C2 | C3 | C4 | B1 | B2 | SPEED RATIO | SPEED-RATIO STEP |
|---|---|---|---|---|---|---|---|---|
| 1st | ○ |  |  |  |  | ○ | 3.518 |  |
| 2nd | ○ |  |  |  | ○ |  | 2.508 | 1.402 |
| 3rd | ○ | ○ |  |  |  |  | 1.802 | 1.392 |
| 4th | ○ |  |  | ○ |  |  | 1.244 | 1.448 |
| 5th |  |  | ○ | ○ |  |  | 1.000 | 1.244 |
| 6th |  | ○ |  | ○ |  |  | 0.834 | 1.200 |
| 7th |  |  | ○ |  |  | ○ | 0.690 | 1.208 |
| 8th |  |  | ○ |  | ○ |  | 0.588 | 1.173 |
| Rev |  | ○ |  |  |  | ○ | 2.574 | TOTAL RANGE 5.980 |

|     | C1 | C2 | C3 | C4 | B1 | B2 | SPEED RATIO | SPEED-RATIO STEP |
|-----|----|----|----|----|----|----|-------------|------------------|
| 1st | O  |    |    |    |    | O  | 3.518       |                  |
| 2nd | O  |    |    |    | O  |    | 2.508       | 1.402            |
| 3rd | O  | O  |    |    |    |    | 1.802       | 1.392            |
| 4th | O  |    | O  |    |    |    | 1.295       | 1.391            |
| 5th |    |    | O  | O  |    |    | 1.000       | 1.295            |
| 6th |    | O  |    | O  |    |    | 0.834       | 1.200            |
| 7th |    |    | O  | O  |    |    | 0.690       | 1.208            |
| 8th |    |    | O  |    | O  |    | 0.588       | 1.173            |
| Rev |    | O  |    |    |    | O  | 2.574       | TOTAL RANGE 5.980 |

| | C1 | C2 | C3 | C4 | B1 | B2 | SPEED RATIO | SPEED-RATIO STEP |
|---|---|---|---|---|---|---|---|---|
| 1st | ○ | | | | | ○ | 3.518 | |
| 2nd | ○ | | | | ○ | | 2.508 | 1.402 |
| 3rd | ○ | ○ | | | | | 1.802 | 1.392 |
| 4th | ○ | | | ○ | | | 1.244 | 1.448 |
| 5th | | | ○ | ○ | | | 1.000 | 1.244 |
| 6th | | ○ | | ○ | | | 0.834 | 1.200 |
| 7th | | | | ○ | ○ | | 0.690 | 1.208 |
| 8th | | | ○ | | ○ | | 0.588 | 1.173 |
| Rev | | ○ | | | | ○ | 2.574 | TOTAL RANGE 5.980 |

|     | C1 | C2 | C3 | C4 | B1 | B2 | SPEED RATIO | SPEED-RATIO STEP |
|-----|----|----|----|----|----|----|-------------|------------------|
| 1st | O  |    |    |    |    | O  | 3.518       |                  |
| 2nd | O  |    |    |    | O  |    | 2.508       | 1.402            |
| 3rd | O  | O  |    |    |    |    | 1.802       | 1.392            |
| 4th | O  |    | O  |    |    |    | 1.295       | 1.391            |
| 5th |    |    | O  | O  |    |    | 1.000       | 1.295            |
| 6th |    | O  |    | O  |    |    | 0.834       | 1.200            |
| 7th |    |    |    | O  | O  |    | 0.690       | 1.208            |
| 8th |    |    | O  |    | O  |    | 0.588       | 1.173            |
| Rev |    | O  |    |    |    | O  | 2.574       | TOTAL RANGE 5.980 |

|      | C1 | C2 | C3 | C4 | B1 | B2 | SPEED RATIO | SPEED-RATIO STEP |
|------|----|----|----|----|----|----|-------------|------------------|
| 1st  | ○  |    |    |    |    | ○  | 3.518       |                  |
| 2nd  | ○  |    |    |    | ○  |    | 2.508       | 1.402            |
| 3rd  | ○  | ○  |    |    |    |    | 1.802       | 1.392            |
| 4th  | ○  |    |    | ○  |    |    | 1.244       | 1.448            |
| 5th  |    |    | ○  | ○  |    |    | 1.000       | 1.244            |
| 6th  |    | ○  |    | ○  |    |    | 0.834       | 1.200            |
| 7th  |    |    |    | ○  | ○  |    | 0.690       | 1.208            |
| 8th  |    |    | ○  |    | ○  |    | 0.588       | 1.173            |
| Rev  |    | ○  |    |    |    | ○  | 2.574       | TOTAL RANGE 5.980 |

|  | C1 | C2 | C3 | C4 | B1 | B2 | SPEED RATIO | SPEED-RATIO STEP |
|---|---|---|---|---|---|---|---|---|
| 1st | O |  |  |  |  | O | 3.518 |  |
| 2nd | O |  |  |  | O |  | 2.508 | 1.402 |
| 3rd | O | O |  |  |  |  | 1.802 | 1.392 |
| 4th | O |  | O |  |  |  | 1.295 | 1.391 |
| 5th |  |  | O | O |  |  | 1.000 | 1.295 |
| 6th |  | O |  | O |  |  | 0.834 | 1.200 |
| 7th |  |  |  | O | O |  | 0.690 | 1.208 |
| 8th |  |  | O |  | O |  | 0.588 | 1.173 |
| Rev |  | O |  |  |  | O | 2.574 | TOTAL RANGE 5.980 |

|  | C1 | C2 | C3 | C4 | B1 | B2 | SPEED RATIO | SPEED-RATIO STEP |
|---|---|---|---|---|---|---|---|---|
| 1st | O |  |  |  |  | O | 3.518 |  |
| 2nd | O |  |  |  | O |  | 2.508 | 1.402 |
| 3rd | O | O |  |  |  |  | 1.802 | 1.392 |
| 4th | O |  |  | O |  |  | 1.244 | 1.448 |
| 5th |  |  | O | O |  |  | 1.000 | 1.244 |
| 6th |  | O |  | O |  |  | 0.834 | 1.200 |
| 7th |  |  | O | O |  |  | 0.690 | 1.208 |
| 8th |  |  | O |  | O |  | 0.588 | 1.173 |
| Rev |  | O |  |  |  | O | 2.574 | TOTAL RANGE 5.980 |

|      | C1 | C2 | C3 | C4 | B1 | B2 | SPEED RATIO | SPEED-RATIO STEP |
|------|----|----|----|----|----|----|-------------|------------------|
| 1st  | O  |    |    |    |    | O  | 3.518       |                  |
| 2nd  | O  |    |    |    | O  |    | 2.508       | 1.402            |
| 3rd  | O  | O  |    |    |    |    | 1.802       | 1.392            |
| 4th  | O  |    |    | O  |    |    | 1.295       | 1.391            |
| 5th  |    |    |    | O  | O  |    | 1.000       | 1.295            |
| 6th  |    | O  |    | O  |    |    | 0.834       | 1.200            |
| 7th  |    |    |    | O  | O  |    | 0.690       | 1.208            |
| 8th  |    |    | O  |    | O  |    | 0.588       | 1.173            |
| Rev  |    | O  |    |    |    | O  | 2.574       | TOTAL RANGE 5.980 |

| | C1 | C2 | C3 | C4 | B1 | B2 | SPEED RATIO | SPEED-RATIO STEP |
|---|---|---|---|---|---|---|---|---|
| 1st | ○ | | | | | ○ | 3.518 | |
| 2nd | ○ | | | | ○ | | 2.508 | 1.402 |
| 3rd | ○ | ○ | | | | | 1.802 | 1.392 |
| 4th | ○ | | | ○ | | | 1.244 | 1.448 |
| 5th | | | ○ | ○ | | | 1.000 | 1.244 |
| 6th | | ○ | | ○ | | | 0.834 | 1.200 |
| 7th | | | | ○ | ○ | | 0.690 | 1.208 |
| 8th | | | ○ | | ○ | | 0.588 | 1.173 |
| Rev | | ○ | | | | ○ | 2.574 | TOTAL RANGE 5.980 |

|     | C1 | C2 | C3 | C4 | B1 | B2 | SPEED RATIO | SPEED-RATIO STEP |
|-----|----|----|----|----|----|----|----|----|
| 1st | O |   |   |   |   | O | 3.518 |  |
| 2nd | O |   |   |   | O |   | 2.508 | 1.402 |
| 3rd | O | O |   |   |   |   | 1.802 | 1.392 |
| 4th | O |   |   | O |   |   | 1.295 | 1.391 |
| 5th |   |   | O | O |   |   | 1.000 | 1.295 |
| 6th |   | O |   | O |   |   | 0.834 | 1.200 |
| 7th |   |   | O | O |   |   | 0.690 | 1.208 |
| 8th |   |   | O | O |   |   | 0.588 | 1.173 |
| Rev |   | O |   |   |   | O | 2.574 | TOTAL RANGE 5.980 |

|      | C1 | C2 | C3 | C4 | B1 | B2 | SPEED RATIO | SPEED-RATIO STEP |
|------|----|----|----|----|----|----|-------------|------------------|
| 1st  | ○  |    |    |    |    | ○  | 3.518       |                  |
| 2nd  | ○  |    |    |    | ○  |    | 2.508       | 1.402            |
| 3rd  | ○  | ○  |    |    |    |    | 1.802       | 1.392            |
| 4th  | ○  |    |    | ○  |    |    | 1.244       | 1.448            |
| 5th  |    |    | ○  | ○  |    |    | 1.000       | 1.244            |
| 6th  |    | ○  |    | ○  |    |    | 0.834       | 1.200            |
| 7th  |    |    | ○  |    |    | ○  | 0.690       | 1.208            |
| 8th  |    |    | ○  |    |    | ○  | 0.588       | 1.173            |
| Rev  |    | ○  |    |    |    | ○  | 2.574       | TOTAL RANGE 5.980 |

| | C1 | C2 | C3 | C4 | B1 | B2 | SPEED RATIO | SPEED-RATIO STEP |
|---|---|---|---|---|---|---|---|---|
| 1st | ○ | | | | | ○ | 3.518 | |
| 2nd | ○ | | | | ○ | | 2.508 | 1.402 |
| 3rd | ○ | ○ | | | | | 1.802 | 1.392 |
| 4th | ○ | | | ○ | | | 1.295 | 1.391 |
| 5th | | | ○ | ○ | | | 1.000 | 1.295 |
| 6th | | ○ | | ○ | | | 0.834 | 1.200 |
| 7th | | | ○ | | ○ | | 0.690 | 1.208 |
| 8th | | | ○ | | | ○ | 0.588 | 1.173 |
| Rev | | ○ | | | | ○ | 2.574 | TOTAL RANGE 5.980 |

|  | C1 | C2 | C3 | C4 | B1 | B2 | SPEED RATIO | SPEED-RATIO STEP |
|---|---|---|---|---|---|---|---|---|
| 1st | O |  |  |  |  | O | 3.518 | |
| 2nd | O |  |  |  | O |  | 2.508 | 1.402 |
| 3rd | O | O |  |  |  |  | 1.802 | 1.392 |
| 4th | O |  |  | O |  |  | 1.244 | 1.448 |
| 5th |  |  | O | O |  |  | 1.000 | 1.244 |
| 6th |  | O |  | O |  |  | 0.834 | 1.200 |
| 7th |  |  |  | O | O |  | 0.690 | 1.208 |
| 8th |  |  | O |  | O |  | 0.588 | 1.173 |
| Rev |  | O |  |  |  | O | 2.574 | TOTAL RANGE 5.980 |

|      | C1 | C2 | C3 | C4 | B1 | B2 | SPEED RATIO | SPEED-RATIO STEP |
|------|----|----|----|----|----|----|-------------|------------------|
| 1st  | O  |    |    |    |    | O  | 3.518       |                  |
| 2nd  | O  |    |    |    | O  |    | 2.508       | 1.402            |
| 3rd  | O  | O  |    |    |    |    | 1.802       | 1.392            |
| 4th  | O  |    |    | O  |    |    | 1.295       | 1.391            |
| 5th  |    |    | O  | O  |    |    | 1.000       | 1.295            |
| 6th  |    | O  |    | O  |    |    | 0.834       | 1.200            |
| 7th  |    |    || O  | O  |    |    | 0.690       | 1.208            |
| 8th  |    |    | O  |    | O  |    | 0.588       | 1.173            |
| Rev  |    | O  |    |    |    | O  | 2.574       | TOTAL RANGE 5.980 |

|  | C1 | C2 | C3 | C4 | B1 | B2 | SPEED RATIO | SPEED-RATIO STEP |
|---|---|---|---|---|---|---|---|---|
| 1st | ○ |  |  |  |  | ○ | 3.518 |  |
| 2nd | ○ |  |  |  | ○ |  | 2.508 | 1.402 |
| 3rd | ○ | ○ |  |  |  |  | 1.802 | 1.392 |
| 4th | ○ |  |  | ○ |  |  | 1.244 | 1.448 |
| 5th |  |  | ○ | ○ |  |  | 1.000 | 1.244 |
| 6th |  | ○ |  | ○ |  |  | 0.834 | 1.200 |
| 7th |  |  |  | ○ | ○ |  | 0.690 | 1.208 |
| 8th |  |  | ○ |  | ○ |  | 0.588 | 1.173 |
| Rev |  | ○ |  |  |  | ○ | 2.574 | TOTAL RANGE 5.980 |

| | C1 | C2 | C3 | C4 | B1 | B2 | SPEED RATIO | SPEED-RATIO STEP |
|---|---|---|---|---|---|---|---|---|
| 1st | ○ | | | | | ○ | 3.518 | |
| 2nd | ○ | | | | ○ | | 2.508 | 1.402 |
| 3rd | ○ | ○ | | | | | 1.802 | 1.392 |
| 4th | ○ | | | ○ | | | 1.295 | 1.391 |
| 5th | | | ○ | ○ | | | 1.000 | 1.295 |
| 6th | | ○ | | ○ | | | 0.834 | 1.200 |
| 7th | | | ○ | | ○ | | 0.690 | 1.208 |
| 8th | | | ○ | | | ○ | 0.588 | 1.173 |
| Rev | | ○ | | | | ○ | 2.574 | TOTAL RANGE 5.980 |

|  | C1 | C2 | C3 | C4 | B1 | B2 | SPEED RATIO | SPEED-RATIO STEP |
|---|---|---|---|---|---|---|---|---|
| 1st | ○ |  |  |  |  | ○ | 3.518 | |
| 2nd | ○ |  |  |  | ○ |  | 2.508 | 1.402 |
| 3rd | ○ | ○ |  |  |  |  | 1.802 | 1.392 |
| 4th | ○ |  |  | ○ |  |  | 1.244 | 1.448 |
| 5th |  |  | ○ | ○ |  |  | 1.000 | 1.244 |
| 6th |  | ○ |  | ○ |  |  | 0.834 | 1.200 |
| 7th |  |  |  | ○ | ○ |  | 0.690 | 1.208 |
| 8th |  |  | ○ |  | ○ |  | 0.588 | 1.173 |
| Rev |  | ○ |  |  |  | ○ | 2.574 | TOTAL RANGE 5.980 |

| | C1 | C2 | C3 | C4 | B1 | B2 | SPEED RATIO | SPEED-RATIO STEP |
|---|---|---|---|---|---|---|---|---|
| 1st | O | | | | | O | 3.518 | |
| 2nd | O | | | | O | | 2.508 | 1.402 |
| 3rd | O | O | | | | | 1.802 | 1.392 |
| 4th | O | | O | | | | 1.295 | 1.391 |
| 5th | | | O | O | | | 1.000 | 1.295 |
| 6th | | O | | O | | | 0.834 | 1.200 |
| 7th | | | | O | O | | 0.690 | 1.208 |
| 8th | | | O | | O | | 0.588 | 1.173 |
| Rev | | O | | | | O | 2.574 | TOTAL RANGE 5.980 |

| | C1 | C2 | C3 | C4 | B1 | B2 | SPEED RATIO | SPEED-RATIO STEP |
|---|---|---|---|---|---|---|---|---|
| 1st | ○ | | | | | ○ | 3.518 | 1.402 |
| 2nd | ○ | | | | ○ | | 2.508 | 1.392 |
| 3rd | ○ | ○ | | | | | 1.802 | 1.448 |
| 4th | ○ | | | ○ | | | 1.244 | 1.244 |
| 5th | | | ○ | ○ | | | 1.000 | 1.200 |
| 6th | | ○ | | ○ | | | 0.834 | 1.208 |
| 7th | | | ○ | | ○ | | 0.690 | 1.173 |
| 8th | | | ○ | | | ○ | 0.588 | TOTAL RANGE |
| Rev | | ○ | | | | ○ | 2.574 | 5.980 |

|  | C1 | C2 | C3 | C4 | B1 | B2 | SPEED RATIO | SPEED-RATIO STEP |
|---|---|---|---|---|---|---|---|---|
| 1st | ○ |  |  |  |  | ○ | 3.518 | |
| 2nd | ○ |  |  |  | ○ |  | 2.508 | 1.402 |
| 3rd | ○ | ○ |  |  |  |  | 1.802 | 1.392 |
| 4th | ○ |  |  | ○ |  |  | 1.295 | 1.391 |
| 5th |  |  | ○ | ○ |  |  | 1.000 | 1.295 |
| 6th |  | ○ |  | ○ |  |  | 0.834 | 1.200 |
| 7th |  |  | ○ |  | ○ |  | 0.690 | 1.208 |
| 8th |  |  | ○ |  | ○ |  | 0.588 | 1.173 |
| Rev |  | ○ |  |  |  | ○ | 2.574 | TOTAL RANGE 5.980 |

|  | C1 | C2 | C3 | C4 | B1 | B2 | SPEED RATIO | SPEED-RATIO STEP |
|---|---|---|---|---|---|---|---|---|
| 1st | ○ |  |  |  |  | ○ | 3.518 | |
| 2nd | ○ |  |  |  | ○ |  | 2.508 | 1.402 |
| 3rd | ○ | ○ |  |  |  |  | 1.802 | 1.392 |
| 4th | ○ |  |  | ○ |  |  | 1.244 | 1.448 |
| 5th |  |  | ○ | ○ |  |  | 1.000 | 1.244 |
| 6th |  | ○ |  | ○ |  |  | 0.834 | 1.200 |
| 7th |  |  |  | ○ | ○ |  | 0.690 | 1.208 |
| 8th |  |  | ○ |  | ○ |  | 0.588 | 1.173 |
| Rev |  | ○ |  |  |  | ○ | 2.574 | TOTAL RANGE 5.980 |

|     | C1 | C2 | C3 | C4 | B1 | B2 | SPEED RATIO | SPEED-RATIO STEP |
|-----|----|----|----|----|----|----|-------------|------------------|
| 1st | O  |    |    |    |    | O  | 3.518       |                  |
| 2nd | O  |    |    |    | O  |    | 2.508       | 1.402            |
| 3rd | O  | O  |    |    |    |    | 1.802       | 1.392            |
| 4th | O  |    |    | O  |    |    | 1.295       | 1.391            |
| 5th |    |    | O  | O  |    |    | 1.000       | 1.295            |
| 6th |    | O  |    | O  |    |    | 0.834       | 1.200            |
| 7th |    |    |    | O  | O  |    | 0.690       | 1.208            |
| 8th |    |    | O  |    | O  |    | 0.588       | 1.173            |
| Rev |    | O  |    |    |    | O  | 2.574       | TOTAL RANGE 5.980 |

| | C1 | C2 | C3 | C4 | B1 | B2 | SPEED RATIO | SPEED-RATIO STEP |
|---|---|---|---|---|---|---|---|---|
| 1st | O | | | | | O | 3.518 | |
| 2nd | O | | | | O | | 2.508 | 1.402 |
| 3rd | O | O | | | | | 1.802 | 1.392 |
| 4th | O | | | O | | | 1.244 | 1.448 |
| 5th | | | O | O | | | 1.000 | 1.244 |
| 6th | | O | | O | | | 0.834 | 1.200 |
| 7th | | | | O | O | | 0.690 | 1.208 |
| 8th | | | O | | O | | 0.588 | 1.173 |
| Rev | | O | | | | O | 2.574 | TOTAL RANGE 5.980 |

|  | C1 | C2 | C3 | C4 | B1 | B2 | SPEED RATIO | SPEED-RATIO STEP |
|---|---|---|---|---|---|---|---|---|
| 1st | ○ |  |  |  |  | ○ | 3.518 |  |
| 2nd | ○ |  |  | ○ |  |  | 2.508 | 1.402 |
| 3rd | ○ | ○ |  |  |  |  | 1.802 | 1.392 |
| 4th | ○ |  | ○ |  |  |  | 1.295 | 1.391 |
| 5th |  |  | ○ | ○ |  |  | 1.000 | 1.295 |
| 6th |  | ○ |  | ○ |  |  | 0.834 | 1.200 |
| 7th |  |  |  | ○ | ○ |  | 0.690 | 1.208 |
| 8th |  |  | ○ |  | ○ |  | 0.588 | 1.173 |
| Rev |  | ○ |  |  |  | ○ | 2.574 | TOTAL RANGE 5.980 |

|      | C1 | C2 | C3 | C4 | B1 | B2 | SPEED RATIO | SPEED-RATIO STEP |
|------|----|----|----|----|----|----|-------------|------------------|
| 1st  | ○  |    |    |    |    | ○  | 3.518       |                  |
| 2nd  | ○  |    |    |    | ○  |    | 2.508       | 1.402            |
| 3rd  | ○  | ○  |    |    |    |    | 1.802       | 1.392            |
| 4th  | ○  |    |    | ○  |    |    | 1.244       | 1.448            |
| 5th  |    |    | ○  | ○  |    |    | 1.000       | 1.244            |
| 6th  |    | ○  |    | ○  |    |    | 0.834       | 1.200            |
| 7th  |    |    |    | ○  | ○  |    | 0.690       | 1.208            |
| 8th  |    |    | ○  |    | ○  |    | 0.588       | 1.173            |
| Rev  |    | ○  |    |    |    | ○  | 2.574       | TOTAL RANGE 5.980 |

MULTIPLE-STEP TRANSMISSION

BACKGROUND OF THE INVENTION

1. Field of the Invention

The present invention relates to improvements of a multiple-step transmission which has at least seven forward speed steps or gear positions.

2. Discussion of Related Art

For vehicles, there are widely used automatic transmissions which have a plurality of planetary gear sets, a plurality of clutches, and a plurality of brakes. As those automatic transmissions, there have been proposed multiple-step transmissions which have at least six forward speed steps or gear positions. Examples of those multiple-step transmissions are disclosed by Patent Document 1 (JP-A-2002-206601), Patent Document 2 (JP-A-8-105496), Patent Document 3 (JP-A-2000-199549), Patent Document 4 (JP-A-2000-266138), Patent Document 5 (JP-A-2001-82555), Patent Document 6 (JP-A-2002-227940), Patent Document 7 (JP-A-2002-295609), and Patent Document 8 (JP-B2-2956173). In those examples, three or four planetary gear sets are employed to provide from six to twelve forward speed steps.

Meanwhile, the multiple-step transmissions are required to (a) have a sufficiently wide range of speed ratio in total, (b) have respective speed ratios whose steps have substantially same ratios or nearly same ratios, (c) have the least number of clutches and brakes, (d) be able to change easily respective operating states of the clutches and brakes, for the purpose of changing speed steps, (e) have the least number of planetary gear sets, and (f) employ respective planetary gear sets whose gear ratios $\rho$ {i.e., (number of teeth of sun gear)/(number of teeth of ring gear)} fall in the range of from about 0.3 to about 0.6, for the purpose of enjoying a reduced size. However, it is difficult to meet all of the above-indicated requirements and accordingly the conventional transmissions have not been sufficiently satisfactory. For example, the multiple-step transmission disclosed by the above-indicated Patent Document 1 employs seven engaging elements, i.e., clutches and brakes, and needs to change respective operating states of at most four engaging elements, for the purpose of changing speed steps. Therefore, this transmission needs a complex and highly accurate speed-change controllability, and may produce a speed-change shock. In addition, the gear ratios $\rho$ of the planetary gear sets of the transmission falls in the range of from 0.273 to 0.778, and accordingly the transmission can hardly be constructed in a small size.

SUMMARY OF THE INVENTION

It is therefore an object of the present invention to provide a multiple-step transmission which has a plurality of speed steps (preferably, seven or eight forward speed steps) and which can satisfy, to a high degree, at least one of a required speed-ratio characteristic, such as speed-ratio steps or total speed-ratio range; a required speed-change controllability; and a required size. This object may be achieved according to any one of the following modes of the present invention in the form of a multiple-step transmission, each of which is numbered like the appended claims and may depend from the other mode or modes, where appropriate, to indicate and clarify possible combinations of technical features. It is, however, to be understood that the present invention is not limited to the technical features or any combinations thereof that will be described below for illustrative purposes only. It is to be further understood that a plurality of features included in any one of the following modes of the invention are not necessarily provided altogether, and that the invention may be embodied without employing at least one of the features described with respect to each of the modes.

(1) A multiple-step transmission, comprising:
  a first transmission portion including
    a first intermediate output path which transmits, at a first speed ratio, an input rotary motion of an input member, and
    a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and
  a second transmission portion including
    a 2-1 planetary gear set, a 2-2 planetary gear set, and a 2-3 planetary gear set each of which includes a sun gear, a carrier, and a ring gear, the 2-1 planetary gear set, the 2-2 planetary gear set, and the 2-3 planetary gear set being partly connected to each other so as to provide a first rotary element, a second rotary element, a third rotary element, a fourth rotary element, and a fifth rotary element,
    a first brake which selectively stops a rotary motion of the first rotary element,
    a second brake which selectively stops a rotary motion of the second rotary element,
    a first clutch which selectively connects the fifth rotary element to the second intermediate output path of the first transmission portion,
    a second clutch which selectively connects the first rotary element to the second intermediate output path,
    a third clutch which selectively connects the second rotary element to the first intermediate output path of the first transmission portion, and
    a fourth clutch which selectively connects the third rotary element to the first intermediate output path,
    the fourth rotary element being connected to an output member so as to provide an output rotary motion,
  each of the first and second brakes and the first, second, third, and fourth clutches being switched between an engaged state thereof and a disengaged state thereof, so as to provide the output rotary motion in each of a plurality of speed steps.

The multiple-step transmission according to the mode (1) has the plurality of speed steps, e.g., at least seven forward speed steps, owing to the first transmission portion including the two intermediate output paths having the different speed ratios, the second transmission portion including the three planetary gear ratios, the four clutches, and the two brakes. Therefore, the multiple-step transmission can be constructed to be light and compact. In addition, in this transmission, the speed steps can be changed by changing the respective operating states of two engaging elements out of the six engaging elements, i.e., the four clutches and/or the two brakes. Thus, the present transmission can enjoy an easy speed-change control and prevent a speed-change shock.

The first to fifth rotary elements may be defined according to any of the fifth to eighteenth modes (5) to (18) of this invention, described later. If, in those modes, respective gear ratios $\rho$ of the three planetary gear sets of the second transmission portion are set to fall in the range of, e.g., from about 0.3 to about 0.6, those planetary gear sets can enjoy a considerably small size (or diameter), respective steps of respective speed ratios of at least seven speed steps can have substantially same ratios or nearly same ratios, and the speed steps can have a considerably wide range of speed ratio in total, e.g., about 6.

The present multiple-step transmission is preferably used as an automatic transmission for a vehicle. For example, this transmission receives an input rotary motion from a running-related drive source such as an internal combustion engine via a fluid coupling such as a torque converter, changes a rotational speed of the rotary motion at an appropriate speed ratio, and transmits an output rotary motion from an output member such as an output gear or an output shaft, to left and right drive wheels via a differential gear unit. However, the present transmission may be used for other applications than vehicles. The input member may be an axis member of a turbine of a torque converter.

The present transmission may be transversely set on an FF (front-engine, front-drive) vehicle or longitudinally set on an FR (front-engine, rear-drive) vehicle. In the former case, the transmission is mounted such that an axis line thereof extends in a widthwise direction of the FF vehicle; and in the latter case, the transmission is mounted such that an axis line thereof extends in a lengthwise direction of the FR vehicle.

This transmission may be one which automatically changes speed steps based on running conditions of a vehicle, such as an amount of operation of an accelerator pedal or a running speed of the vehicle, or one which changes speed steps according to driver's operation of a switch (e.g., a speed-step increasing or decreasing operation). The present multiple-step transmission may have at least seven forward speed steps, and preferably has eight forward speed steps. However, the present transmission may have six or less forward speed steps. In addition, the second clutch and the second brake may be engaged to provide the output rotary motion in a reverse direction in a reverse speed step.

The present multiple-step transmission may have seven forward speed steps according to the third or nineteenth mode (3) or (19) of this invention, described later. In those cases, it is possible to omit any one of the first to eighth forward speed steps. For example, it is possible to omit the eighth forward speed step and employ the first to seventh forward speed steps, to omit the first forward speed step and employ the second to eighth forward speed steps, or to omit the seventh forward speed step and employ the first to sixth and eighth forward speed steps.

Each of the first to fourth clutches and the first and second brakes is preferably provided by a hydraulically actuated frictional coupling device which is hydraulically actuated, and frictionally engaged, by a hydraulic-cylinder device and which includes a plurality of frictional plates or a single frictional plate, or a frictional belt. However, each of the clutches and the brakes may be provided by a different sort of engaging element such as an electromagnetic one. For an easier speed-change control, a one-way clutch may be provided in parallel to one or more of the brakes and the clutches. For example, in the case where a one-way clutch is provided in parallel to the second brake, a first forward speed step may be established by causing just the first clutch to be engaged, and may be changed to a second forward speed step by causing just the first brake to be engaged. In the case where an engine brake is not needed, the second brake may be replaced with a one-way clutch, because the one-way clutch has the function of stopping a rotary motion, like the brake. In addition, it is possible to provide, in parallel to the first brake, a brake and a one-way clutch that are arranged in series.

The first transmission portion may include a planetary gear set according to the twenty-first mode (21) of this invention, described later. In this case, the second intermediate output path of the first transmission portion may have a speed ratio {=(rotational speed of input rotary motion)/(rotational speed of output rotary motion)} greater than 1.0, and accordingly may transmit the input rotary motion of the input member at a reduced rotational speed, while the first intermediate output path transmits the input rotary motion of the input member as it is, i.e., at a speed ratio of 1.0. However, the speed ratio of the first intermediate output path may not be equal to 1.0. For instance, the first intermediate output path may have a speed ratio smaller than 1.0, and accordingly may transmit the input rotary motion of the input member at an increased rotational speed, while the second intermediate output path transmits the input rotary motion of the input member as it is, i.e., at a speed ratio of 1.0. The planetary gear set of the first transmission portion may be provided on the common axis line on which the second transmission portion is provided.

The planetary gear set according to the twenty-first mode (21) is preferably provided by a double-pinion planetary gear set or a single-pinion planetary gear set each of which includes, as three rotary elements, a sun gear, a carrier, and a ring gear. One of the sun gear, the carrier, and the ring gear of the planetary gear set is connected to the input member and is driven or rotated by the same; another of the three rotary elements is fixed to be not rotatable; and the remaining rotary element is rotated, as an intermediate output member, at a reduced speed, as compared with the rotational speed of the input member.

In the case where the planetary gear set according to the twenty-first mode (21) is provided by the single-pinion planetary gear, a pinion gear that is supported by the carrier may be provided by a stepped pinion gear including a large-diameter portion and a small-diameter portion. That is, the single-pinion planetary gear may be a complex planetary gear set. In this case, the three rotary elements may be provided by the carrier, and a sun gear and a ring gear which are meshed with one, and the other, of the large-diameter and small-diameter portions of the stepped pinion gear, respectively. Otherwise, the three rotary elements may be provided by the carrier, and a large-diameter sun gear and a small-diameter sun gear which are meshed with the large-diameter and small-diameter portions of the stepped pinion gear, respectively, or by the carrier, and a large-diameter ring gear and a small-diameter ring gear which are meshed with the large-diameter and small-diameter portions of the stepped pinion gear, respectively.

The first transmission portion may include the planetary gear set according to the twenty-first mode (21) of this invention. However, the first transmission portion may be constructed in various manners, for instance, it may be provided by a parallel-axis-type transmission. For instance, the parallel-axis-type first transmission portion may be provided over a first axis line to which a rotary motion of an input member is inputted, and a second axis line which is parallel to the first axis line and on which the second transmission portion is provided; and the first transmission portion may include a first power transmitter which transmits the rotary motion inputted to the first axis line from the input member, to the second axis line, at a predetermined first speed ratio {=(rotational speed about first axis line)/(rotational speed about first axis line)}, and a second power transmitter which transmits the rotary motion inputted to the first axis line from the input member, to the second axis line, at a second speed ratio greater than the first speed ratio. In this case, a path in which the rotary motion is transmitted by the first power transmitter provides the first intermediate output path; and a path in which the rotary motion is transmitted by the second power transmitter provides the second intermediate output path.

Each of the first and second power transmitters each of which transmits power from the side of the first axis line to the side of the second axis line, may be provided by, e.g., a pair of counter gears. However, each power transmitter may be provided by a different sort of power transmitter, such as pulley and belt, or sprocket and chain.

The first power transmitter may have a first speed ratio of, e.g., 1.0, and accordingly may transmit the rotary motion received from the side of the first axis line, as it is, to the side of the second axis line; and the second power transmitter may have a second speed ratio greater than the first speed ratio, and accordingly may transmit the received rotary motion, at a reduced speed, to the side of the second axis line. However, the first speed ratio of the first power transmitter may not be equal to 1.0, for instance, may be smaller than 1.0, and accordingly the first power transmitter may transmit the received rotary motion, at an increased speed, to the side of the second axis line; and the second speed ratio of the second power transmitter may be greater than the first speed ratio, e.g., 1.0, and accordingly may transmit the received rotary motion, as it is, to the side of the second axis line.

The second transmission portion may be arranged according to any of the fifth to eighteenth modes (5) to (18) of this invention, described later. However, the second transmission portion may be arranged in different manners.

A positional relationship between the 2-1, 2-2, and 2-3 planetary gear sets of the second transmission portion is free of limitations. For example, the 2-1, 2-2, and 2-3 planetary gear sets may be arranged in the order of description along the axis of the second transmission portion. However, the 2-1 or 2-3 planetary gear set may be provided between the other two planetary gear sets in the axial direction. The clutches and the brakes may be provided in various manners. For example, all of those elements may be provided locally in one end portion of the second transmission portion, or may be grouped into two groups which are provided on either side of the planetary gear sets, respectively.

(2) The multiple-step transmission according to the mode (1), wherein said each of the first and second brakes and the first, second, third, and fourth clutches is switched between the engaged state thereof and the disengaged state thereof, so as to provide the output rotary motion in each of at least seven forward speed steps.

(3) A multiple-step transmission, comprising:
a first transmission portion including
a first intermediate output path which transmits, at a first speed ratio, an input rotary motion of an input member, and
a second intermediate output path which transmits the input rotary motion of the input member at a second speed ratio greater than the first speed ratio, so that a rotational speed of the rotary motion transmitted by the second intermediate output path is lower than a rotational speed of the rotary motion transmitted by the first intermediate output path; and
a second transmission portion including
a 2-1 planetary gear set, a 2-2 planetary gear set, and a 2-3 planetary gear set each of which includes a sun gear, a carrier, and a ring gear, the 2-1 planetary gear set, the 2-2 planetary gear set, and the 2-3 planetary gear set being partly connected to each other so as to provide a first rotary element, a second rotary element, a third rotary element, a fourth rotary element, and a fifth rotary element,
a first brake which selectively stops a rotary motion of the first rotary element,
a second brake which selectively stops a rotary motion of the second rotary element,
a first clutch which selectively connects the fifth rotary element to the second intermediate output path of the first transmission portion,
a second clutch which selectively connects the first rotary element to the second intermediate output path,
a third clutch which selectively connects the second rotary element to the first intermediate output path of the first transmission portion, and
a fourth clutch which selectively connects the third rotary element to the first intermediate output path,
the fourth rotary element being connected to an output member so as to provide an output rotary motion in each of at least seven forward speed steps selected from the group consisting of a first forward speed step, a second forward speed step, a third forward speed step, a fourth forward speed step, a fifth forward speed step, a sixth forward speed step, a seventh forward speed step, and an eighth forward speed step,
the first clutch and the second brake being engaged to provide the output rotary motion in the first forward speed step having a first speed ratio as a greatest speed ratio,
the first clutch and the first brake being engaged to provide the output rotary motion in the second forward speed step having a second speed ratio smaller than the first speed ratio of the first forward speed step,
the first clutch and the second clutch being engaged to provide the output rotary motion in the third forward speed step having a third speed ratio smaller than the second speed ratio of the second forward speed step,
the first clutch and the third clutch being engaged to provide the output rotary motion in the fourth forward speed step having a fourth speed ratio smaller than the third speed ratio of the third forward speed step,
the third clutch and the fourth clutch being engaged to provide the output rotary motion in the fifth forward speed step having a fifth speed ratio smaller than the fourth speed ratio of the fourth forward speed step,
the second clutch and the fourth clutch being engaged to provide the output rotary motion in the sixth forward speed step having a sixth speed ratio smaller than the fifth speed ratio of the fifth forward speed step,
the fourth clutch and the first brake being engaged to provide the output rotary motion in the seventh forward speed step having a seventh speed ratio smaller than the sixth speed ratio of the sixth forward speed step, and
the third clutch and the first brake being engaged to provide the output rotary motion in the eighth forward speed step having an eighth speed ratio smaller than the seventh speed ratio of the seventh forward speed step.

(4) A multiple-step transmission, comprising:
a first transmission portion including
a first intermediate output path which transmits, at a first speed ratio, an input rotary motion of an input member, and
a second intermediate output path which transmits the input rotary motion of the input member at a second speed ratio greater than the first speed ratio, so that a rotational speed of the rotary motion transmitted by the second intermediate output path is lower than a rotational speed of the rotary motion transmitted by the first intermediate output path; and a second transmission portion including a 2-1 planetary gear set, a 2-2 planetary gear set, and a 2-3 planetary gear set each of which includes a sun gear, a carrier, and a ring gear, the 2-1 planetary gear set, the 2-2 planetary gear set, and the 2-3 planetary gear set being partly connected to each other so as to provide a first rotary element, a second rotary element, a third rotary element, a fourth rotary element, and a fifth rotary element, a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion in each of a first forward speed step, a second forward speed step, a third forward speed step, a fourth forward speed step, a fifth forward speed step, a sixth forward speed step, a seventh forward speed step, and an eighth forward speed step, the first clutch and the second brake being engaged to provide the output rotary motion in the first forward speed step having a first speed ratio as a greatest speed ratio, the first clutch and the first brake being engaged to provide the output rotary motion in the second forward speed step having a second speed ratio smaller than the first speed ratio of the first forward speed step, the first clutch and the second clutch being engaged to provide the output rotary motion in the third forward speed step having a third speed ratio smaller than the second speed ratio of the second forward speed step, the first clutch and the third clutch being engaged to provide the output rotary motion in the fourth forward speed step having a fourth speed ratio smaller than the third speed ratio of the third forward speed step, the third clutch and the fourth clutch being engaged to provide the output rotary motion in the fifth forward speed step having a fifth speed ratio smaller than the fourth speed ratio of the fourth forward speed step, the second clutch and the fourth clutch being engaged to provide the output rotary motion in the sixth forward speed step having a sixth speed ratio smaller than the fifth speed ratio of the fifth forward speed step, the fourth clutch and the first brake being engaged to provide the output rotary motion in the seventh forward speed step having a seventh speed ratio smaller than the sixth speed ratio of the sixth forward speed step, and the third clutch and the first brake being engaged to provide the output rotary motion in the eighth forward speed step having an eighth speed ratio smaller than the seventh speed ratio of the seventh forward speed step.

(5) The multiple-step transmission according to any of the modes (1) to (4), wherein the 2-1 planetary gear set comprises a double-pinion planetary gear set, the 2-2 planetary gear set comprises a single-pinion planetary gear set, and the 2-3 planetary gear set comprises a single-pinion planetary gear set, and wherein the first rotary element comprises the respective sun gears of the 2-1 and 2-3 planetary gear sets that are connected to each other; the second rotary element comprises the ring gear of the 2-2 planetary gear set; the third rotary element comprises the ring gear of the 2-1 planetary gear set, and the respective carriers of the 2-2 and 2-3 planetary gear sets, that are connected to each other; the fourth rotary element comprises the sun gear of the 2-2 planetary gear set and the ring gear of the 2-3 planetary gear set that are connected to each other; and the fifth rotary element comprises the carrier of the 2-1 planetary gear set.

(6) The multiple-step transmission according to any of the modes (1) to (4), wherein the 2-1 planetary gear set comprises a double-pinion planetary gear set, the 2-2 planetary gear set comprises a single-pinion planetary gear set, and the 2-3 planetary gear set comprises a single-pinion planetary gear set, and wherein the first rotary element comprises the carrier of the 2-1 planetary gear set and the sun gear of the 2-3 planetary gear set that are connected to each other; the second rotary element comprises the ring gear of the 2-2 planetary gear set; the third rotary element comprises the ring gear of the 2-1 planetary gear set, and the respective carriers of the 2-2 and 2-3 planetary gear sets, that are connected to each other; the fourth rotary element comprises the sun gear of the 2-2 planetary gear set and the ring gear of the 2-3 planetary gear set that are connected to each other; and the fifth rotary element comprises the sun gear of the 2-1 planetary gear set.

(7) The multiple-step transmission according to any of the modes (1) to (4), wherein the 2-1 planetary gear set comprises a single-pinion planetary gear set, the 2-2 planetary gear set comprises a double-pinion planetary gear set, and the 2-3 planetary gear set comprises a single-pinion planetary gear set, and wherein the first rotary element comprises the respective sun gears of the 2-1 and 2-2 planetary gear sets that are connected to each other; the second rotary element comprises the ring gear of the 2-3 planetary gear set; the third rotary element comprises the ring gear of the 2-2 planetary gear set and the carrier of the 2-3 planetary gear set that are connected to each other; the fourth rotary element comprises the respective carriers of the 2-1 and 2-2 planetary gear sets and the sun gear of the 2-3 planetary gear set that are connected to each other; and the fifth rotary element comprises the ring gear of the 2-1 planetary gear set.

(8) The multiple-step transmission according to any of the modes (1) to (4), wherein the 2-1 planetary gear set comprises a single-pinion planetary gear set, the 2-2 planetary gear set comprises a double-pinion planetary gear set, and the 2-3 planetary gear set comprises a single-pinion planetary gear set, and wherein the first rotary element comprises the respective sun gears of the 2-2 and 2-3 planetary gear sets that are connected to each other; the second rotary element comprises the ring gear of the 2-1 planetary gear set; the third rotary element comprises the carrier of the 2-1 planetary gear set; the fourth rotary element comprises the sun gear of the 2-1 planetary gear set, the ring gear of the 2-2 planetary gear set, and the carrier of the 2-3 planetary gear set that are connected to each other; and the fifth rotary element comprises the carrier of the 2-2 planetary gear set and the ring gear of the 2-3 planetary gear set.

(9) The multiple-step transmission according to any of the modes (1) to (4), wherein the 2-1 planetary gear set comprises a double-pinion planetary gear set, the 2-2 planetary gear set comprises a single-pinion planetary gear set, and the 2-3 planetary gear set comprises a single-pinion planetary gear set, and wherein the first rotary element comprises the respective sun gears of the 2-1 and 2-2 planetary gear sets that are connected to each other; the second rotary element comprises the ring gear of the 2-3 planetary gear set; the third rotary element comprises the ring gear of the 2-1 planetary gear set and the carrier of the 2-3 planetary gear set; the fourth rotary element comprises the carrier of the 2-2 planetary gear set and the sun gear of the 2-3 planetary gear set that are connected to each other; and the fifth rotary element comprises the carrier of the 2-1 planetary gear set and the ring gear of the 2-2 planetary gear set.

(10) The multiple-step transmission according to any of the modes (1) to (4), wherein the 2-1 planetary gear set comprises a single-pinion planetary gear set, the 2-2 planetary gear set comprises a single-pinion planetary gear set, and the 2-3 planetary gear set comprises a double-pinion planetary gear set, and wherein the first rotary element comprises the respective sun gears of the 2-1 and 2-3 planetary gear sets that are connected to each other; the second rotary element comprises the respective ring gears of the 2-2 and 2-3 planetary gear sets that are connected to each other; the third rotary element comprises the carrier of the 2-2 planetary gear set; the fourth rotary element comprises the carrier of the 2-1 planetary gear set, the sun gear of the 2-2 planetary gear set, and the carrier of the 2-3 planetary gear set that are connected to each other; and the fifth rotary element comprises the ring gear of the 2-1 planetary gear set.

(11) The multiple-step transmission according to any of the modes (1) to (4), wherein the 2-1 planetary gear set comprises a double-pinion planetary gear set, the 2-2 planetary gear set comprises a single-pinion planetary gear set, and the 2-3 planetary gear set comprises a single-pinion planetary gear set, and wherein the first rotary element comprises the respective sun gears of the 2-1 and 2-2 planetary gear sets that are connected to each other; the second rotary element comprises the respective ring gears of the 2-1 and 2-3 planetary gear sets that are connected to each other; the third rotary element comprises the carrier of the 2-3 planetary gear set; the fourth rotary element comprises the carrier of the 2-2 planetary gear set and the sun gear of the 2-3 planetary gear set that are connected to each other; and the fifth rotary element comprises the carrier of the 2-1 planetary gear set and the ring gear of the 2-2 planetary gear set that are connected to each other.

(12) A multiple-step transmission, comprising:
a first transmission portion including
a first intermediate output path which transmits, at a first speed ratio, an input rotary motion of an input member, and
a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and
a second transmission portion including
a 2-1 double-pinion planetary gear set, a 2-2 single-pinion planetary gear set, and a 2-3 single-pinion planetary gear set each of which includes a sun gear, a carrier, and a ring gear, the respective sun gears of the 2-1 and 2-3 planetary gear being connected to each other to provide a first rotary element, the ring gear of the 2-2 planetary gear set providing a second rotary element, the ring gear of the 2-1 planetary gear set, and the respective carriers of the 2-2 and 2-3 planetary gear sets being connected to each other to provide a third rotary element, the sun gear of the 2-2 planetary gear set and the ring gear of the 2-3 planetary gear set being connected to each other to provide a fourth rotary element, the carrier of the 2-1 planetary gear set providing a fifth rotary element, a first brake which selectively stops a rotary motion of the first rotary element,
a second brake which selectively stops a rotary motion of the second rotary element,
a first clutch which selectively connects the fifth rotary element to the second intermediate output path of the first transmission portion,
a second clutch which selectively connects the first rotary element to the second intermediate output path,
a third clutch which selectively connects the second rotary element to the first intermediate output path of the first transmission portion, and
a fourth clutch which selectively connects the third rotary element to the first intermediate output path,
the fourth rotary element being connected to an output member so as to provide an output rotary motion of the output member,
each of the first and second brakes and the first, second, third, and fourth clutches being switched between an engaged state thereof and a disengaged state thereof, so as to provide the output rotary motion in each of a plurality of speed steps.

(13) A multiple-step transmission, comprising:
a first transmission portion including
a first intermediate output path which transmits, at a first speed ratio, an input rotary motion of an input member, and
a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and
a second transmission portion including
a 2-1 double-pinion planetary gear set, a 2-2 single-pinion planetary gear set, and a 2-3 single-pinion planetary gear set each of which includes a sun gear, a carrier, and a ring gear, the carrier of the 2-1 planetary gear set and the sun gear of the 2-3 planetary gear set being connected to each other to provide a first rotary element; the ring gear of the 2-2 planetary gear set providing a second rotary element; the ring gear of the 2-1 planetary gear set and the respective carriers of the 2-2 and 2-3 planetary gear sets being connected to each other to provide a third rotary element; the sun gear of the 2-2 planetary gear set and the ring gear of the 2-3 planetary gear set being connected to each other to provide a fourth rotary element; and the sun gear of the 2-1 planetary gear set providing a fifth rotary element,
a first brake which selectively stops a rotary motion of the first rotary element,
a second brake which selectively stops a rotary motion of the second rotary element,
a first clutch which selectively connects the fifth rotary element to the second intermediate output path of the first transmission portion,
a second clutch which selectively connects the first rotary element to the second intermediate output path,
a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion of the output member, each of the first and second brakes and the first, second, third, and fourth clutches being switched between an engaged state thereof and a disengaged state thereof, so as to provide the output rotary motion in each of a plurality of speed steps.

(14) A multiple-step transmission, comprising:

a first transmission portion including a first intermediate output path which transmits, at a first speed ratio, an input rotary motion of an input member, and a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and a second transmission portion including a 2-1 single-pinion planetary gear set, a 2-2 double-pinion planetary gear set, and a 2-3 single-pinion planetary gear set each of which includes a sun gear, a carrier, and a ring gear, the respective sun gears of the 2-1 and 2-2 planetary gear sets being connected to each other to provide a first rotary element; the ring gear of the 2-3 planetary gear set providing a second rotary element; the ring gear of the 2-2 planetary gear set and the carrier of the 2-3 planetary gear set being connected to each other to provide a third rotary element; the respective carriers of the 2-1 and 2-2 planetary gear sets and the sun gear of the 2-3 planetary gear set being connected to each other to provide a fourth rotary element; and the ring gear of the 2-1 planetary gear set providing a fifth rotary element, a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion of the output member, each of the first and second brakes and the first, second, third, and fourth clutches being switched between an engaged state thereof and a disengaged state thereof, so as to provide the output rotary motion in each of a plurality of speed steps.

(15) A multiple-step transmission, comprising:

a first transmission portion including a first intermediate output path which transmits, at a first speed ratio, an input rotary motion of an input member, and a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and a second transmission portion including a 2-1 single-pinion planetary gear set, a 2-2 double-pinion planetary gear set, and a 2-3 single-pinion planetary gear set each of which includes a sun gear, a carrier, and a ring gear, the respective sun gears of the 2-2 and 2-3 planetary gear sets being connected to each other to provide a first rotary element; the ring gear of the 2-1 planetary gear set providing a second rotary element; the carrier of the 2-1 planetary gear set providing a third rotary element; the sun gear of the 2-1 planetary gear set, the ring gear of the 2-2 planetary gear set, and the carrier of the 2-3 planetary gear set being connected to each other to provide a fourth rotary element; and the carrier of the 2-2 planetary gear set the ring gear of the 2-3 planetary gear set being connected to each other to provide a fifth rotary element, a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion of the output member, each of the first and second brakes and the first, second, third, and fourth clutches being switched between an engaged state thereof and a disengaged state thereof, so as to provide the output rotary motion in each of a plurality of speed steps.

(16) A multiple-step transmission, comprising:

a first transmission portion including a first intermediate output path which transmits, at a first speed ratio, an input rotary motion of an input member, and a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and a second transmission portion including a 2-1 double-pinion planetary gear set, a 2-2 single-pinion planetary gear set, and a 2-3 single-pinion planetary gear set each of which includes a sun gear, a carrier, and a ring gear, the respective sun gears of the 2-1 and 2-2 planetary gear sets being connected to each other to provide a first rotary element; the ring gear of the 2-3 planetary gear set providing a second rotary element; the ring gear of the 2-1 planetary gear set and the carrier of the 2-3 planetary gear set being connected to provide a third rotary element; the carrier of the 2-2 planetary gear set and the sun gear of the 2-3 planetary gear set being connected to each other to provide a fourth rotary element; and the carrier of the 2-1 planetary gear set the ring gear of the 2-2 planetary gear set being connected to each other to provide a fifth rotary element, a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion of the output member, each of the first and second brakes and the first, second, third, and fourth clutches being switched between an engaged state thereof and a disengaged state thereof, so as to provide the output rotary motion in each of a plurality of speed steps.

(17) A multiple-step transmission, comprising:

a first transmission portion including a first intermediate output path which transmits, at a first speed ratio, an input rotary motion of an input member, and a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and a second transmission portion including a 2-1 single-pinion planetary gear set, a 2-2 single-pinion planetary gear set, and a 2-3 double-pinion planetary gear set each of which includes a sun gear, a carrier, and a ring gear, the respective sun gears of the 2-1 and 2-3 planetary gear sets being connected to each other to provide a first rotary element; the respective ring gears of the 2-2 and 2-3 planetary gear sets being connected to each other to provide a second rotary element; the carrier of the 2-2 planetary gear set providing a third rotary element; the carrier of the 2-1 planetary gear set, the sun gear of the 2-2 planetary gear set, and the carrier of the 2-3 planetary gear set being connected to each other to provide a fourth rotary element; and the ring gear of the 2-1 planetary gear set providing a fifth rotary element, a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion of the output member, each of the first and second brakes and the first, second, third, and fourth clutches being switched between an engaged state thereof and a disengaged state thereof, so as to provide the output rotary motion in each of a plurality of speed steps.

(18) A multiple-step transmission, comprising:

a first transmission portion including a first intermediate output path which transmits, at a first speed ratio, an input rotary motion of an input member, and a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and a second transmission portion including a 2-1 double-pinion planetary gear set, a 2-2 single-pinion planetary gear set, and a 2-3 single-pinion planetary gear set each of which includes a sun gear, a carrier, and a ring gear, the respective sun gears of the 2-1 and 2-2 planetary gear sets being connected to each other to provide a first rotary element; the respective ring gears of the 2-1 and 2-3 planetary gear sets being connected to each other to provide a second rotary element; the carrier of the 2-3 planetary gear set providing a third rotary element; the carrier of the 2-2 planetary gear set and the sun gear of the 2-3 planetary gear set being connected to each other to provide a fourth rotary element; and the carrier of the 2-1 planetary gear set and the ring gear of the 2-2 planetary gear set being connected to each other to provide a fifth rotary element, a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion of the output member, each of the first and second brakes and the first, second, third, and fourth clutches being switched between an engaged state thereof and a disengaged state thereof, so as to provide the output rotary motion in each of a plurality of speed steps.

(19) The multiple-step transmission according to any of the modes (12) to (18), wherein the output rotary motion is provided in each of at least seven forward speed steps selected from the group consisting of a first forward speed step, a second forward speed step, a third forward speed step, a fourth forward speed step, a fifth forward speed step, a sixth forward speed step, a seventh forward speed step, and an eighth forward speed step, and wherein the first clutch and the second brake are engaged to provide the output rotary motion in the first forward speed step having a first speed ratio as a greatest speed ratio, the first clutch and the first brake are engaged to provide the output rotary motion in the second forward speed step having a second speed ratio smaller than the first speed ratio of the first forward speed step, the first clutch and the second clutch are engaged to provide the output rotary motion in the third forward speed step having a third speed ratio smaller than the second speed ratio of the second forward speed step, the first clutch and the third clutch are engaged to provide the output rotary motion in the fourth forward speed step having a fourth speed ratio smaller than the third speed ratio of the third forward speed step, the third clutch and the fourth clutch are engaged to provide the output rotary motion in the fifth forward speed step having a fifth speed ratio smaller than the fourth speed ratio of the fourth forward speed step, the second clutch and the fourth clutch are engaged to provide the output rotary motion in the sixth forward speed step having a sixth speed ratio smaller than the fifth speed ratio of the fifth forward speed step, the fourth clutch and the first brake are engaged to provide the output rotary motion in the seventh forward speed step having a seventh speed ratio smaller than the sixth speed ratio of the sixth forward speed step, and the third clutch and the first brake are engaged to provide the output rotary motion in the eighth forward speed step having an eighth speed ratio smaller than the seventh speed ratio of the seventh forward speed step.

(20) The multiple-step transmission according to any of the modes (12) to (18), wherein the output rotary motion is provided in each of a first forward speed step, a second forward speed step, a third forward speed step, a fourth forward speed step, a fifth forward speed step, a sixth forward speed step, a seventh forward speed step, and an eighth forward speed step, and wherein the first clutch and the second brake are engaged to provide the output rotary motion in the first forward speed step having a first speed ratio as a greatest speed ratio, the first clutch and the first brake are engaged to provide the output rotary motion in the second forward speed step having a second speed ratio smaller than the first speed ratio of the first forward speed step, the first clutch and the second clutch are engaged to provide the output rotary motion in the third forward speed step having a third speed ratio smaller than the second speed ratio of the second forward speed step, the first clutch and the third clutch are engaged to provide the output rotary motion in the fourth forward speed step having a fourth speed ratio smaller than the third speed ratio of the third forward speed step, the third clutch and the fourth clutch are engaged to provide the output rotary motion in the fifth forward speed step having a fifth speed ratio smaller than the fourth speed ratio of the fourth forward speed step, the second clutch and the fourth clutch are engaged to provide the output rotary motion in the sixth forward speed step having a sixth speed ratio smaller than the fifth speed ratio of the fifth forward speed step, the fourth clutch and the first brake are engaged to provide the output rotary motion in the seventh forward speed step having a seventh speed ratio smaller than the sixth speed ratio of the sixth forward speed step, and the third clutch and the first brake are engaged to provide the output rotary motion in the eighth forward speed step having an eighth speed ratio smaller than the seventh speed ratio of the seventh forward speed step.

(21) The multiple-step transmission according to any of the modes (12) to (20), wherein the first transmission portion comprises a first planetary gear set including three elements a first one of which is connected to the input member and is rotated with the input member, a second one of which is fixed such that the second element is not rotatable about an axis thereof, and a third one of which provides an intermediate output member whose rotational speed is reduced from a rotational speed of the input rotary motion of the input member, and wherein the first intermediate output path of the first transmission portion transmits, at the first speed ratio of 1.0, a rotary motion of the first element to the second transmission portion and the second intermediate output path of the first transmission portion transmits, at the second speed ratio greater than the first speed ratio, a rotary motion of the third element to the second transmission portion.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figures 1A, 1B:
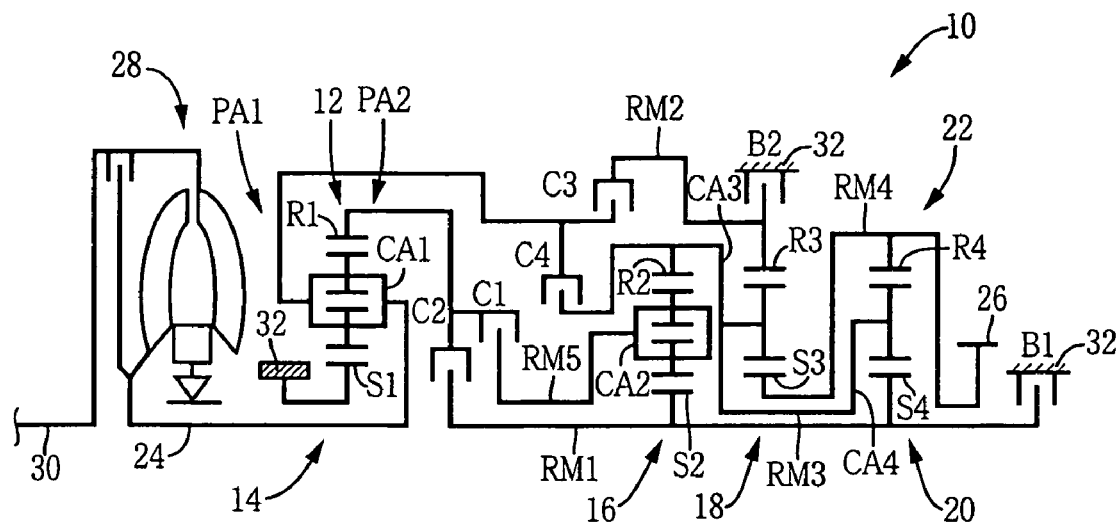
FIG. 1A is a schematic view of a vehicle automatic transmission according to a first embodiment of the present invention.
FIG. 1B is an operation table representing a relationship between speed steps of the transmission of FIG. 1A and combinations of respective operating states of engaging elements to establish the speed steps.

Hereinafter, there will be described preferred embodiments of the present invention by reference to the drawings. FIG. 1A schematically shows a vehicle automatic transmission 10 as a first embodiment of a vehicle multiple-step transmission according to the present invention; and FIG. 1B shows an operation table representing a relationship between a plurality of speed steps (i.e., first to eighth forward speed steps "$1^{st}$" through "$8^{th}$", and a reverse speed step "Rev"), and respective operations of engaging elements (i.e., first to fourth clutches C1 through C4, and two brakes B1, B2) and respective speed ratios of those speed steps. The vehicle automatic transmission 10 is readable on claims 1, 2, 3, 4, 5, 12, 19, 20, and 21. This transmission 10 may be transversely set in an FF (front-engine and front-drive) vehicle, or longitudinally set in an FR (front-engine and rear-drive) vehicle. The transmission 10 includes a first transmission portion 14 which is essentially constituted by a first planetary gear set 12 of double-pinion type, and a second transmission portion 22 which is essentially constituted by a second planetary gear set 16 of double-pinion type, a third planetary gear set 18 of single-pinion type, and a fourth planetary gear set 20 of single-pinion type. The transmission 10 changes a rotational speed of a rotary motion of an input shaft 24 as an input member, so that an output gear 26 as a final output member is rotated at the thus changed rotational speed. The input shaft 24 is connected to an axis of a turbine of a torque converter 28, and a rotary motion of a crankshaft 30 of an internal combustion engine, not shown, as a drive source of the vehicle is inputted to the input shaft 24 via the torque converter 28. The output gear 26 drives left and right drive wheels, not shown, via a differential gear unit, not shown, of the vehicle. The second planetary gear set 16 provides a 2-1 planetary gear set; the third planetary gear set 18 provides a 2-2 planetary gear set; and the fourth planetary gear set 20 provides a 2-3 planetary gear set. The transmission 10 is substantially symmetrical with respect to its centerline, and a lower half of the transmission 10 located below the centerline is not shown in FIG. 1A. This is true with the other transmissions as the other embodiments of the present invention.

The first planetary gear set 12 constituting the first transmission portion 14 includes a carrier CA1 which is connected to the input shaft 24 and is driven or rotated by the same 24; a sun gear S1 which is integrally fixed to a transmission case 32 as a non-rotary element of the transmission 10, such that the sun gear S1 is not rotatable about its axis; and a ring gear R1 as an intermediate output member whose rotational speed is reduced as compared with the rotational speed of the input shaft 24 and is outputted to the second transmission portion 22. In the present embodiment, a path in which the rotary motion of the input shaft 24 is outputted directly from the carrier CA1 to the second transmission portion 22 provides a first intermediate output path PA1 having a predetermined speed ratio; and another path in which the rotary motion of the input shaft 24 is outputted indirectly from the carrier CA1 to the second transmission portion 22 via the pinion gears supported by the carrier CA1, and the ring gear R1 as the intermediate output member provides a second intermediate output path PA2 having a speed ratio greater than the speed ratio of the first intermediate output path PA1.

The second, third, and fourth planetary gear sets 16, 18, 20 which cooperate with each other to constitute the second transmission portion 22 are partly connected to each other, so as to provide five rotary elements RM1, RM2, RM3, RM4, RM5. More specifically described, a sun gear S2 of the second planetary gear set 16 and a sun gear S4 of the fourth planetary gear set 20 are connected to each other to provide the first rotary element RM1; a ring gear R3 of the third planetary gear set 18 provides the second rotary element RM2; a ring gear R2 of the second planetary gear set 16, a carrier CA3 of the third planetary gear set 18, and a carrier CA4 of the fourth planetary gear set 20 are connected to each other to provide the third rotary element RM3; a sun gear S3 of the third planetary gear set 18 and a ring gear R4 of the fourth planetary gear set 20 are connected to each other to provide the fourth rotary element RM4; and a carrier CA2 of the second planetary gear set 16 provides the fifth rotary element RM5.

The first rotary element RM1 (i.e., the sun gears S2, S4) is selectively connected, by a first brake B1, to the transmission case 32, so that the first rotary element RM1 is stopped from rotation; the second rotary element RM2 (i.e., the ring gear R3) is selectively connected, by a second brake B2, to the transmission case 32, so that the second rotary element RM2 is stopped from rotation; the fifth rotary element RM5 (i.e., the carrier CA2) is selectively connected via a first clutch C1 to the ring gear R1 of the first planetary gear set 12 that provides the intermediate output member, i.e., to the second intermediate output path PA2; the first rotary element RM1 (i.e., the sun gears S2, S4) is selectively connected via a second clutch C2 to the ring gear R1, i.e., the second intermediate output path PA2; the second rotary element RM2 (i.e., the ring gear R3) is selectively connected via a third clutch C3 to the input shaft 24, i.e., the first intermediate output path PA1; the third rotary element RM3 (i.e., the ring gear R2 and the carriers CA3, CA4) is selectively connected via a fourth clutch C4 to the input shaft 24, i.e., the first intermediate output path PA1; and the fourth rotary element RM4 (i.e., the sun gear S3 and the ring gear R4) is integrally connected to the output gear 26 so as to output the rotary motion. The first brake B1, second brake B2, first clutch C1, second clutch C2, third clutch C3, and fourth clutch C4 are hydraulically operated frictional coupling devices each of which includes a plurality of friction plates.

Figure 2:
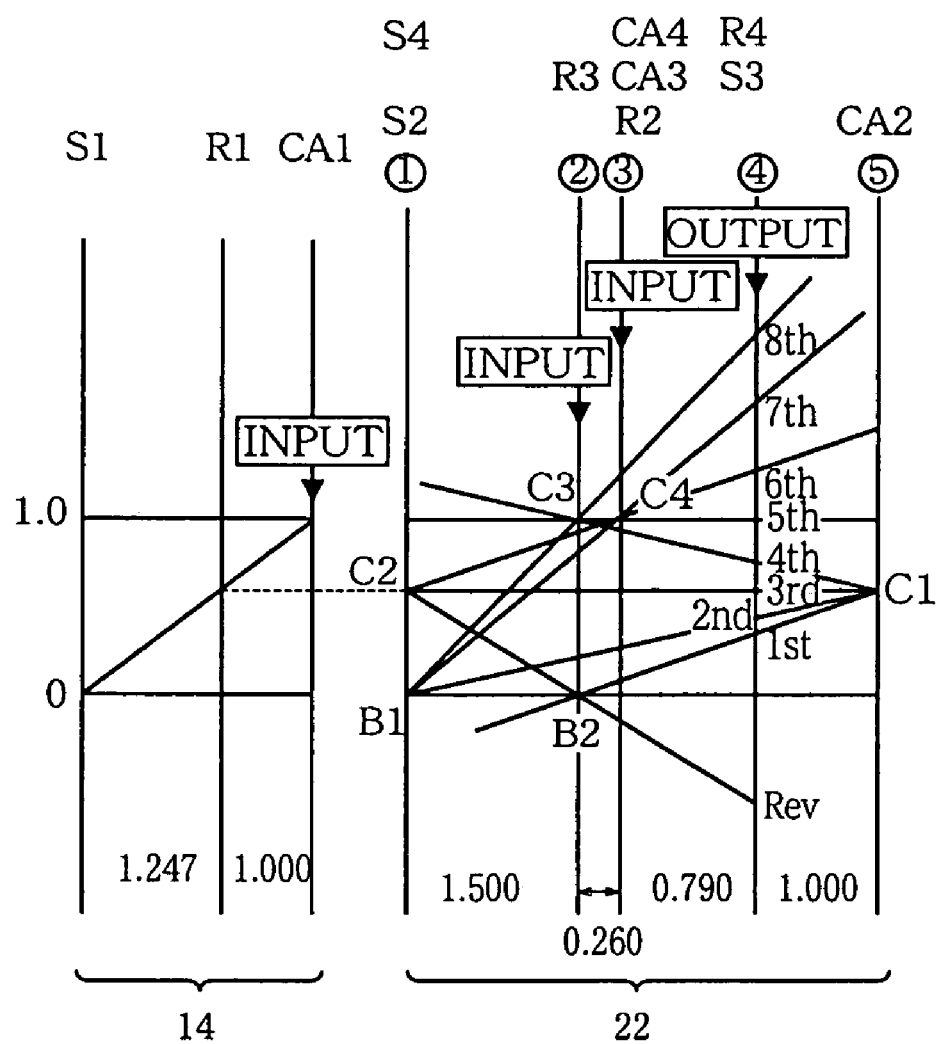
FIG. 2 is a collinear chart showing straight lines each of which represents respective rotational speeds of a plurality of rotary elements incorporated in the transmission of FIG. 1A.

FIG. 2 shows a collinear chart showing a plurality of straight lines each of which represents, in each of the speed steps, respective rotational speeds of the respective rotary elements of the first and second transmission portions 14, 22. A lower horizontal straight line indicates a rotational speed of "0", and an upper horizontal straight line indicates a relative rotational speed of "1.0", i.e., the rotational speed of the input shaft 24. Three vertical lines for the first transmission portion 14 represent the sun gear S1, the ring gear R1, and the carrier CA1, respectively, in the order from the left to the right. Distances between adjacent ones of the three vertical lines are defined by a gear ratio $\rho 1$ {=(number of teeth of sun gear S1)/(number of teeth of ring gear R1)} of the first planetary gear set 12. FIG. 2 shows a case where gear ratio $\rho 1$=0.445. Five vertical lines for the second transmission portion 22 represent the first rotary element RM1 (the sun gears S2, S4), the second rotary element RM2 (the ring gear R3), the third rotary element RM3 (the ring gear R2 and the carriers CA3, CA4), the fourth rotary element RM4 (the sun gear S3 and the ring gear R4), and the fifth rotary element RM5 (the carrier CA2, respectively, in the order from the left to the right. Distances between adjacent ones of the five vertical lines are defined by a gear ratio $\rho 2$ of the second planetary gear set 16, a gear ratio $\rho 3$ of the third planetary gear set 18, and a gear ratio $\rho 4$ of the fourth planetary gear set 20. FIG. 2 shows a case where gear ratio $\rho 2$=0.504, gear ratio $\rho 3$=0.329, and gear ratio $\rho 4$=0.449. In FIG. 2, the five vertical lines representing the five rotary elements RM1, RM2, RM3, RM4, RM5 are indicated at symbols "①", "②", "③", "④", "⑤", respectively. This is true with the other transmissions as the other embodiments.

As is apparent from the collinear chart of FIG. 2, when the first clutch C1 and the second brake B2 are operated or engaged (indicated at symbols "○" in FIG. 1B), the fifth rotary element RM5 is rotated at the reduced speed via the first transmission portion 14, and the second rotary element RM2 is stopped from rotation, while the fourth rotary element RM4 connected to the output gear 26 is rotated at a speed indicated at "$1^{st}$" (FIG. 2), so as to establish a first forward speed step "$1^{st}$" (FIG. 1B) having the greatest speed ratio {=(the rotational speed of the input shaft 24)/(the rotational speed of the output gear 26)}. When the first clutch C1 and the first brake B1 are engaged, the fifth rotary element RM5 is rotated at the reduced speed via the first transmission portion 14, and the first rotary element RM1 is stopped from rotation, while the fourth rotary element RM4 is rotated at a speed indicated at "$2^{nd}$", so as to establish a second forward speed step "$2^{nd}$" having a speed ratio smaller than the speed ratio of the first speed step. When the first clutch C1 and the second clutch C2 are engaged, the second transmission portion 22 as a whole is rotated at the reduced speed via the first transmission portion 14, while the fourth rotary element RM4 is rotated at a speed indicated at "$3^{rd}$", that is, the rotational speed of the ring gear R1 of the first transmission portion 14, so as to establish a third forward speed step "$3^{rd}$" having a speed ratio smaller than the speed ratio of the second speed step. When the first clutch C1 and the third clutch C3 are engaged, the fifth rotary element RM5 is rotated at the reduced speed via the first transmission portion 14, and the second rotary element RM2 is rotated together with the input shaft 24, while the fourth rotary element RM4 is rotated at a speed indicated at "$4^{th}$", so as to establish a fourth forward speed step "$4^{th}$" having a speed ratio smaller than the speed ratio of the third speed step. When the third clutch C3 and the fourth clutch C4 are engaged, the second transmission portion 22 is rotated together with the input shaft 24, while the fourth rotary element RM4 is rotated at a speed indicated at "$5^{th}$", that is, the rotational speed of the input shaft 24, so as to establish a fifth forward speed step "$5^{th}$" having a speed ratio smaller than the speed ratio of the fourth speed step. The speed ratio of the fifth speed step "$5^{th}$" is 1.000. When the second clutch C2 and the fourth clutch C4 are engaged, the first rotary element RM1 are rotated at the reduced speed via the first transmission portion 14, and the third rotary element RM3 is rotated together with the input shaft 24, while the fourth rotary element RM4 is rotated at a speed indicated at "$6^{th}$", so as to establish a sixth forward speed step "$6^{th}$" having a speed ratio smaller than the speed ratio of the fifth speed step. When the fourth clutch C4 and the first brake B1 are engaged, the third rotary element RM3 is rotated together with the input shaft 24, and the first rotary element RM1 is stopped from rotation, while the fourth rotary element RM4 is rotated at a speed indicated at "$7^{th}$" (FIG. 2), so as to establish a seventh forward speed step "$7^{th}$" having a speed ratio smaller than the speed ratio of the sixth speed step. When the third clutch C3 and the first brake B1 are engaged, the second rotary element RM2 is rotated together with the input shaft 24, and the first rotary element RM1 is stopped from rotation, while the fourth rotary element RM4 is rotated at a speed indicated at "$8^{th}$", so as to establish an eighth forward speed step "$8^{th}$" (FIG. 1B) having a speed ratio smaller than the speed ratio of the seventh speed step.

When the second clutch C2 and the second brake B2 are engaged (indicated at symbols "○" in FIG. 1B), the first rotary element RM1 is rotated at the reduced speed via the first transmission portion 14, and the second rotary element RM2 is stopped from rotation, while the fourth rotary element RM4 is rotated in a reverse direction at a speed indicated at "Rev" (FIG. 2), so as to establish a reverse speed step "Rev" (FIG. 1B).

The operation table of FIG. 1B represents the relationship between the speed steps of the transmission 10 and the combinations of operating states of the four clutches C1, C2, C3, C4 and the two brakes B1, B2, and symbols "○" indicate respective engaged or closed states of the engaging elements C1 to C4, B1, B2 and blanks indicate respective disengaged or opened states of the same C1 to C4, B1, B2. The respective speed ratios of the speed steps, shown in the operation table, depend on the respective gear ratios ρ1, ρ2, ρ3, ρ4 of the first, second, third, and fourth planetary gear sets 12, 16, 18, 20. For example, the respective speed ratios of the speed steps, shown in the operation table, are obtained in the case where the respective gear ratios ρ1, ρ2, ρ3, ρ4 of the four planetary gear sets 12, 16, 18, 20 are 0.445, 0.504, 0.329, and 0.449, respectively. In this case, appropriate gear-ratio steps (i.e., a ratio of the speed ratio of the first forward speed step to that of the second forward speed step, a ratio of the speed ratio of the second forward speed step to that of the third forward speed step, a ratio of the speed ratio of the third forward speed step to that of the fourth forward speed step, a ratio of the speed ratio of the fourth forward speed step to that of the fifth forward speed step, a ratio of the speed ratio of the fifth forward speed step to that of the sixth forward speed step, a ratio of the speed ratio of the sixth forward speed step to that of the seventh forward speed step, and a ratio of the speed ratio of the seventh forward speed step to that of the eighth forward speed step) are obtained, and a total range of those speed ratios (=3.518/0.558=5.980) is sufficiently great. In addition, a speed ratio, 2.574, of the reverse speed step "Rev" is also appropriate. Thus, the present transmission 10 as a whole enjoys appropriate speed-ratio characteristics.

Thus, in the vehicle automatic transmission 10 constructed as described above, the eight forward speed steps "$1^{st}$" to "$8^{th}$" can be established by the four planetary gear sets 12, 16, 18, 20, the four clutches C1 to C4, and the two brakes B1, B2. Therefore, the transmission 10 can enjoy a small weight and a small size, and accordingly can be easily mounted on the vehicle. In addition, as is apparent from FIG. 1B, each one of the speed steps can be changed with another speed step by operating just two elements selected from the six engaging elements C1 to C4, B1, B2. Thus, the changing of the speed steps can be easily controlled, and uncomfortable shocks that may be caused by the changing of speed steps can be effectively reduced.

In addition, since the respective gear ratios ρ1, ρ2, ρ3, ρ4 of the four planetary gear sets 12, 16, 18, 20 all fall in the range of from 0.3 to 0.6, the respective speed ratios of the first to eighth forward speed steps "$1^{st}$" to "$8^{th}$" can enjoy the substantially same gear-ratio steps, as indicated in FIG. 1B, while the planetary gear sets 12, 16, 18, 20 can enjoy a considerably small size (i.e., a considerably small diameter). Moreover, the transmission 10 has a large total speed-ratio range of about 6, and a great speed ratio of the reverse speed step "Rev". Thus, the transmission 10 as a whole can enjoy more appropriate speed-ratio characteristics.

Next, there will be described other embodiments of the present invention. The same reference signs as used in the first embodiment, shown in FIGS. 1A, 1B, and 2, will be used in the following description of the other embodiments, to identify the functionally corresponding elements, and the detailed description of those elements is omitted from the following description.

Figures 3, 4:
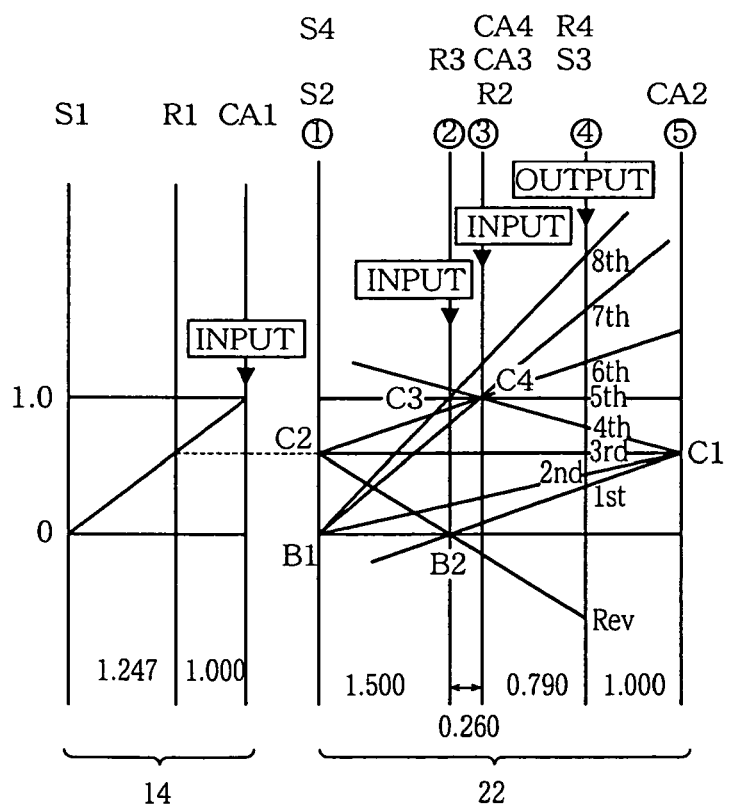
FIG. 3 is an operation table corresponding to FIG. 1B, for another vehicle automatic transmission as a second embodiment of the present invention, in which the combination of respective operating states of engaging elements to establish a fourth speed step differs from that of the operation table of FIG. 1B.
FIG. 4 is a collinear chart corresponding to FIG. 2, for the transmission as the second embodiment.

In the first embodiment shown in FIGS. 1A, 1B, and 2, when the first clutch C1 and the third clutch C3 are engaged, the fourth forward speed step "$4^{th}$" is established. However, in a second embodiment shown in FIGS. 3 and 4, when the first clutch C1 and the fourth clutch C4 are engaged (indicated at symbols "○" in FIG. 3), the fifth rotary element RM5 is rotated at the reduced speed via the first transmission portion 14, and the third rotary element RM3 is rotated together with the input shaft 24, while the fourth rotary element RM4 is rotated at a speed indicated at "$4^{th}$" (FIG. 4), so as to establish a fourth forward speed step "$4^{th}$" (FIG. 3). The second embodiment can enjoy the same advantages as those of the first embodiment shown in FIGS. 1A, 1B, and 2.

Figures 5A, 5B:
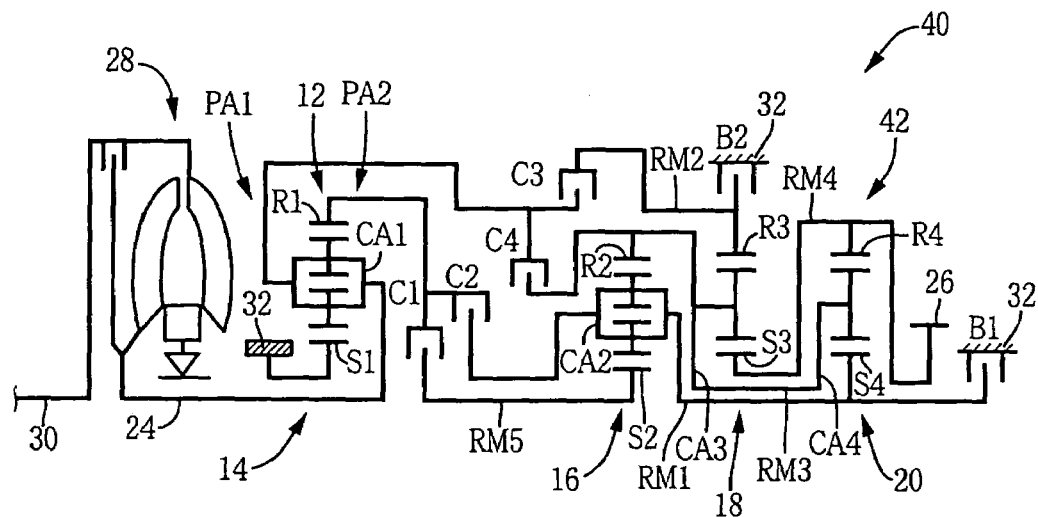
FIG. 5A is a view corresponding to FIG. 1A, showing another vehicle automatic transmission according to a third embodiment of the present invention, in which a second transmission portion differs from that in the first embodiment shown in FIG. 1A.
FIG. 5B is an operation table corresponding to FIG. 1B, for the transmission of FIG. 5A.

FIG. 5A corresponding to FIG. 1A schematically shows another vehicle automatic transmission 40 as a third embodiment of the vehicle multiple-step transmission according to the present invention; and FIG. 5B corresponding to FIG. 1B shows an operation table representing a relationship between a plurality of speed steps (i.e., first to eighth forward speed steps "$1^{st}$" through "$8^{th}$", and a reverse speed step "Rev"), and respective operations of engaging elements (i.e., first to fourth clutches C1 through C4, and first and second brakes B1, B2) and respective speed ratios of those speed steps. The vehicle automatic transmission 40 is readable on claims 1, 2, 3, 4, 6, 13, 19, 20, and 21. This transmission 40 differs from the transmission 10 shown in FIGS. 1A, 1B, and 2, with respect to a construction of a second transmission portion 42. More specifically described, a carrier CA2 of the second planetary gear set 16 and a sun gear S4 of the fourth planetary gear set 20 are connected to each other to provide a first rotary element RM1; a ring gear R3 of the third planetary gear set 18 provides a second rotary element RM2; a ring gear R2 of the second planetary gear set 16, a carrier CA3 of the third planetary gear set 18, and a carrier CA4 of the fourth planetary gear set 20 are connected to each other to provide a third rotary element RM3; a sun gear S3 of the third planetary gear set 18 and a ring gear R4 of the fourth planetary gear set 20 are connected to each other to provide a fourth rotary element RM4; and a sun gear S2 of the second planetary gear set 16 provides a fifth rotary element RM5. The first to fourth clutches C1, C2, C3, C4 and first and second brakes B1, B2 of the transmission 40 selectively connect the first to third and fifth rotary elements RM1 to RM3, RM5 to an input shaft 24, i.e., a first intermediate output path PA1, a ring gear R1 of a first planetary gear set 12, i.e., a second intermediate output path PA2, and a transmission case 32, in the same manner as the manner in that the first to fourth clutches C1 to C4 and first and second brakes B1, B2 of the transmission 10, shown in FIGS. 1A, 1B, and 2, selectively connect the first to third and fifth rotary elements RM1 to RM3, RM5 to the first and second intermediate output paths PA1, PA2 and the transmission case 32, and the fourth rotary element RM4 of the transmission 40 is integrally connected to an output gear 26, like in the transmission 10.

In the transmission 40, the eight forward speed steps, i.e., the first to eighth speed steps "$1^{st}$" to "$8^{th}$", and the reverse speed step "Rev" are established according to the operation table shown in FIG. 5B that is identical with the operation table shown in FIG. 1B. Respective speed ratios of those speed steps are determined by respective gear ratios ρ1, ρ2, ρ3, ρ4 of the first, second, third, and fourth planetary gear sets 12, 16, 18, 20. For example, in the case where gear ratio ρ1=0.445, gear ratio ρ2=0.496, gear ratio ρ3=0.329, and gear ratio ρ4=0.449, the speed ratios shown in FIG. 5B that are identical with the speed ratios shown in FIG. 1B, and a collinear chart shown in FIG. 6 that is identical with the collinear chart shown in FIG. 2 are obtained. Thus, the transmission 40 can enjoy the same advantages as those of the first embodiment shown in FIGS. 1A, 1B, and 2.

Figure 6:
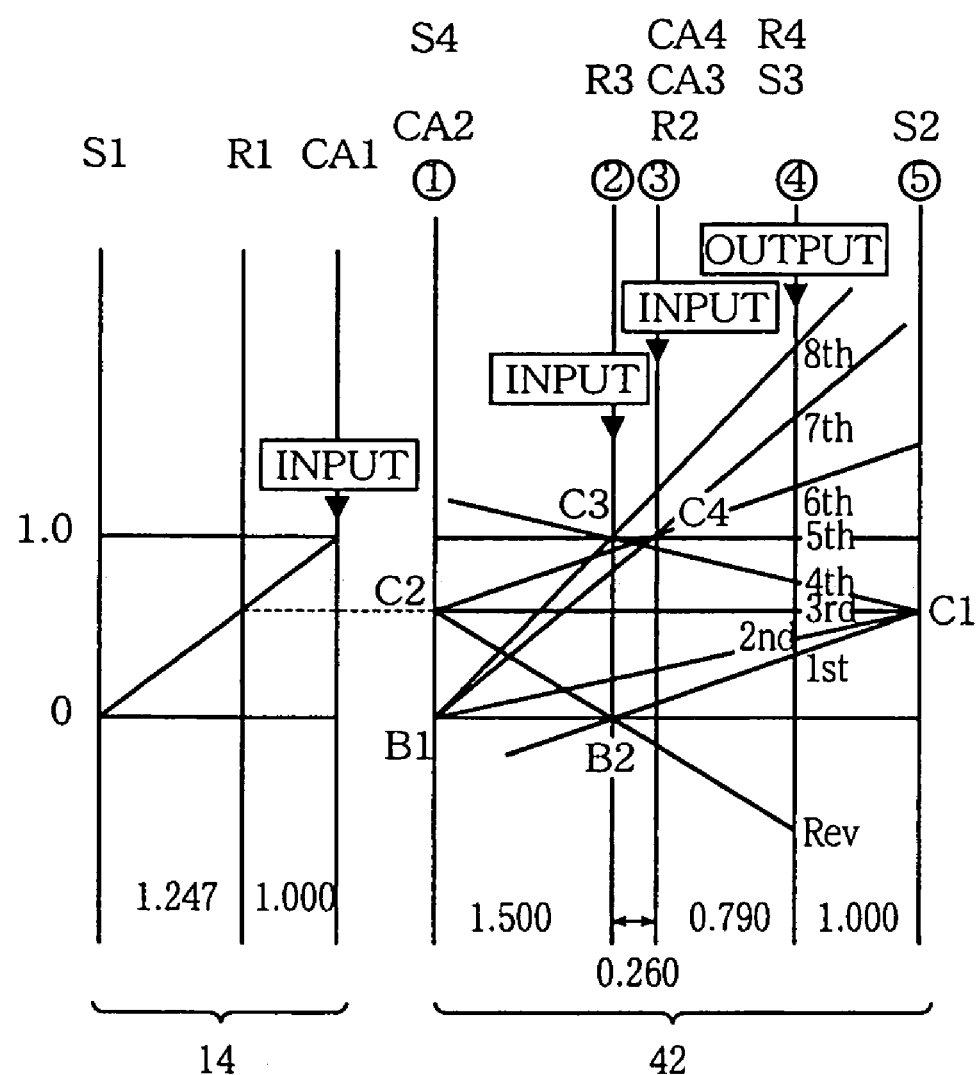
FIG. 6 is a collinear chart corresponding to FIG. 2, for the transmission of FIG. 5A.
Figures 7, 8:
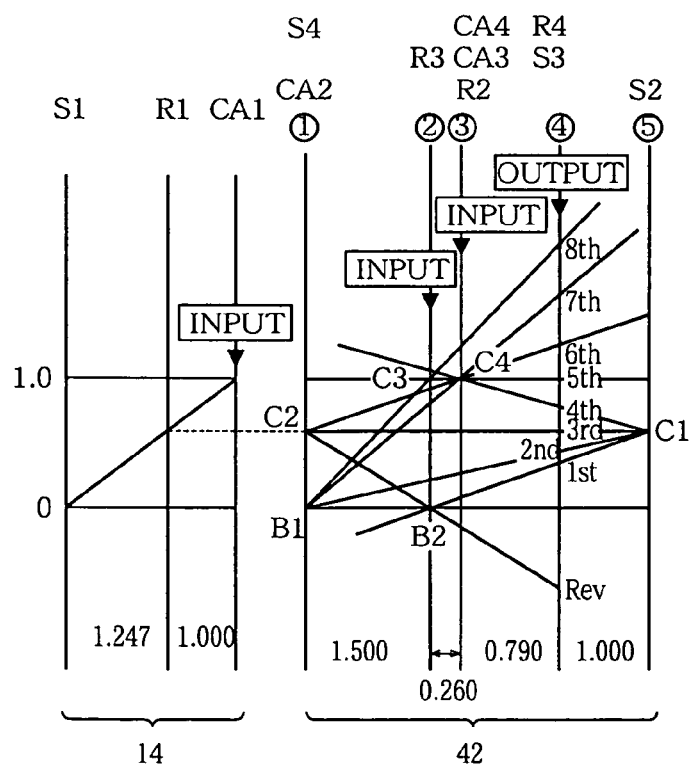
FIG. 7 is an operation table corresponding to FIG. 5B, for another vehicle automatic transmission as a fourth embodiment of the present invention, in which the combination of respective operating states of engaging elements to establish a fourth speed step differs from that of the operation table of FIG. 5B.
FIG. 8 is a collinear chart corresponding to FIG. 6, for the transmission as the fourth embodiment.

In the third embodiment shown in FIGS. 5A, 5B, and 6, when the first clutch C1 and the third clutch C3 are engaged, the fourth forward speed step "$4^{th}$" is established. However, in a fourth embodiment shown in FIGS. 7 and 8, when the first clutch C1 and the fourth clutch C4 are engaged (indicated at symbols "○" in FIG. 7), the fifth rotary element RM5 is rotated at the reduced speed via the first transmission portion 14, and the third rotary element RM3 is rotated together with the input shaft 24, while the fourth rotary element RM4 is rotated at a speed indicated at "$4^{th}$" (FIG. 8), so as to establish a fourth forward speed step "$4^{th}$" (FIG. 7). Since a speed ratio of the fourth speed step "$4^{th}$" in the fourth embodiment just a little differs from the speed ratio of the fourth speed step "$4^{th}$" in the third embodiment shown in FIGS. 5A, 5B, and 6, the fourth embodiment can enjoy the same advantages as those with the third embodiment.

Figures 9A, 9B:
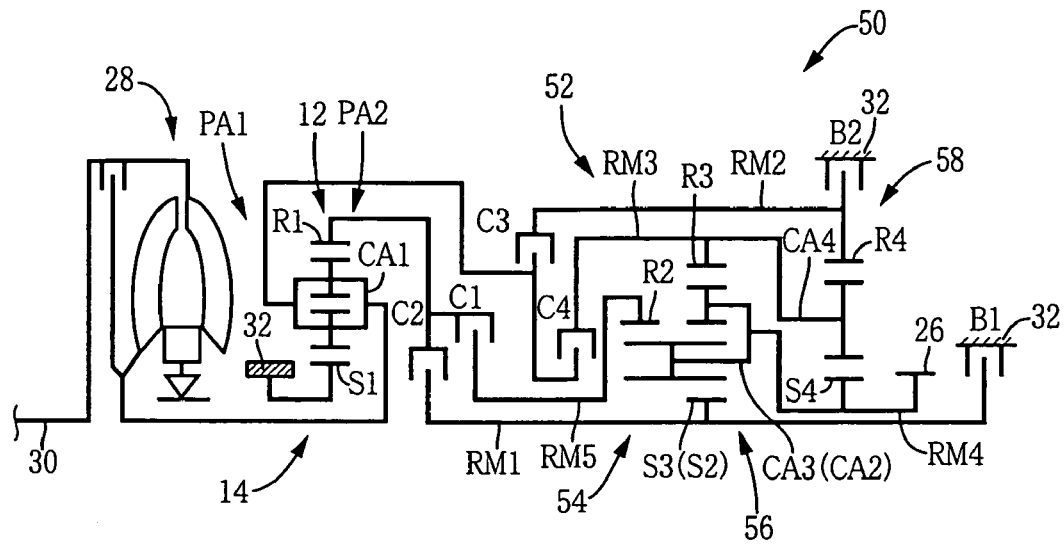
FIG. 9A is a view corresponding to FIG. 1A, showing another vehicle automatic transmission according to a fifth embodiment of the present invention, in which a second transmission portion differs from that in the first embodiment shown in FIG. 1A.
FIG. 9B is an operation table corresponding to FIG. 1B, for the transmission of FIG. 9A.

FIG. 9A corresponding to FIG. 1A schematically shows another vehicle automatic transmission 50 as a fifth embodiment of the vehicle multiple-step transmission according to the present invention; and FIG. 9B corresponding to FIG. 1B shows an operation table representing a relationship between a plurality of speed steps (i.e., first to eighth forward speed steps "$1^{st}$" through "$8^{th}$", and a reverse speed step "Rev"), and respective operations of engaging elements (i.e., first to fourth clutches C1 through C4, and first and second brakes B1, B2) and respective speed ratios of those speed steps. The vehicle automatic transmission 50 is readable on claims 1, 2, 3, 4, 7, 14, 19, 20, and 21. This transmission 50 differs from the transmission 10 shown in FIGS. 1A, 1B, and 2, with respect to a construction of a second transmission portion 52. More specifically described, the second transmission portion 52 is essentially constituted by a second planetary gear set 54 of single-pinion type, a third planetary gear set 56 of double-pinion type, and a fourth planetary gear set 58 of single-pinion type. A sun gear S2 of the second planetary gear set 54 and a sun gear S3 of the third planetary gear set 56 are connected to each other to provide a first rotary element RM1; a ring gear R4 of the fourth planetary gear set 58 provides a second rotary element RM2; a ring gear R3 of the third planetary gear set 56 and a carrier CA4 of the fourth planetary gear set 58 are connected to each other to provide a third rotary element RM3; a carrier CA2 of the second planetary gear set 54, a carrier CA3 of the third planetary gear set 56, and a sun gear S4 of the fourth planetary gear set 58 are connected to each other to provide a fourth rotary element RM4; and a ring gear R2 of the second planetary gear set 54 provides a fifth rotary element RM5. In the second transmission portion 52, there are some members each of which is shared by two planetary gear sets, like in Ravigneaux-type one. For example, the respective carriers CA2, CA3 of the second and third planetary gear sets 54, 56 are constituted by a common member; the sun gears S2, S3 of the same 54, 56 are constituted by a common member; and pinion gears of the second planetary gear set 54 function as first pinion gears of the third planetary gear set 56. The first to fourth clutches C1, C2, C3, C4 and first and second brakes B1, B2 of the transmission 50 selectively connect the first to third and fifth rotary elements RM1 to RM3, RM5 to an input shaft 24, i.e., a first intermediate output path PA1, a ring gear R1 of a first planetary gear set 12, i.e., a second intermediate output path PA2, and a transmission case 32, in the same manner as the manner in that the first to fourth clutches C1 to C4 and first and second brakes B1, B2 of the transmission 10, shown in FIGS. 1A, 1B, and 2, selectively connect the first to third and fifth rotary elements RM1 to RM3, RM5 to the first and second intermediate output paths PA1, PA2 and the transmission case 32, and the fourth rotary element RM4 of the transmission 50 is integrally connected to an output gear 26, like in the transmission 10. The second planetary gear set 54 provides a 2-1 planetary gear set; the third planetary gear set 56 provides a 2-2 planetary gear set; and the fourth planetary gear set 58 provides a 2-3 planetary gear set.

In the transmission 50, the eight forward speed steps, i.e., the first to eighth speed steps "$1^{st}$" to "$8^{th}$", and the reverse speed step "Rev" are established according to the operation table shown in FIG. 9B that is identical with the operation table shown in FIG. 1B. Respective speed ratios of those speed steps are determined by respective gear ratios ρ1, ρ2, ρ3, ρ4 of the first, second, third, and fourth planetary gear sets 12, 54, 56, 58. For example, in the case where gear ratio ρ1=0.445, gear ratio ρ2=0.392, gear ratio ρ3=0.310, and gear ratio ρ4=0.329, the speed ratios shown in FIG. 9B that are identical with the speed ratios shown in FIG. 1B, and a collinear chart shown in FIG. 10 that is identical with the collinear chart shown in FIG. 2 are obtained. Thus, the transmission 50 can enjoy the same advantages as those of the first embodiment shown in FIGS. 1A, 1B, and 2. In addition, in the fifth embodiment, the second transmission portion 52 employs some members each of which is shared by two planetary gear sets, like Ravigneaux-type one. Thus, the total number of parts used to produce the transmission 50, and/or an axial length of the same 50 can be decreased.

Figure 10:
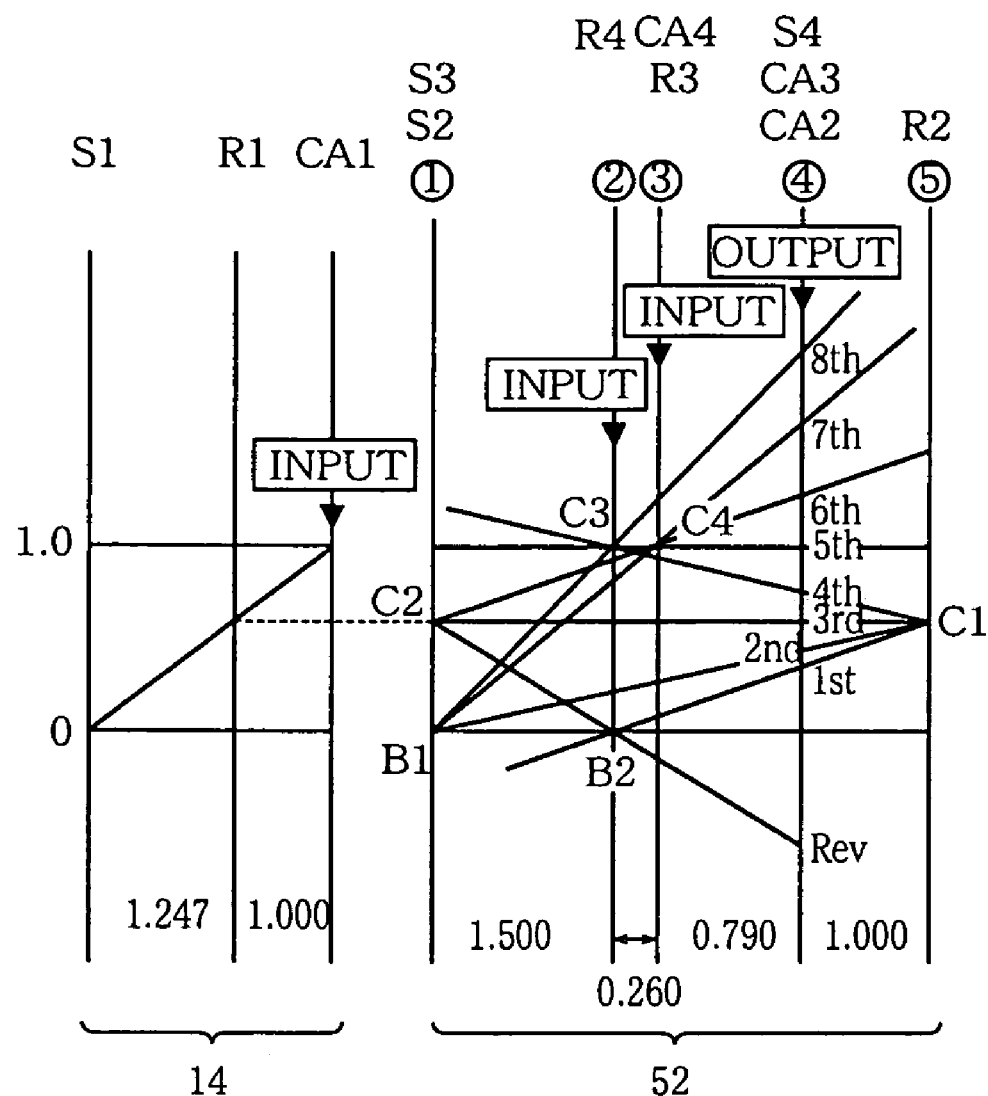
FIG. 10 is a collinear chart corresponding to FIG. 2, for the transmission of FIG. 9A.
Figures 11, 12:
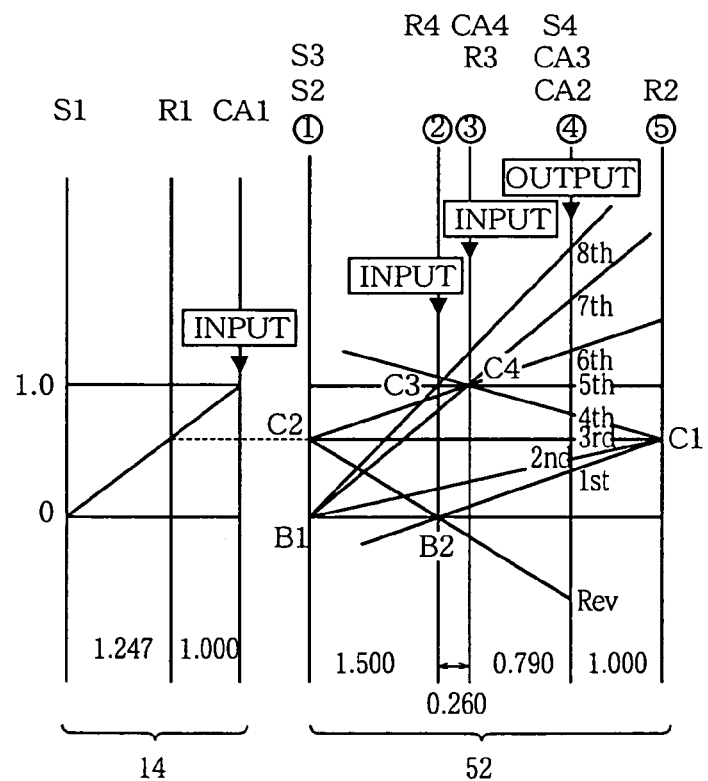
FIG. 11 is an operation table corresponding to FIG. 9B, for another vehicle automatic transmission as a sixth embodiment of the present invention, in which the combination of respective operating states of engaging elements to establish a fourth speed step differs from that of the operation table of FIG. 9B.
FIG. 12 is a collinear chart corresponding to FIG. 10, for the transmission as the sixth embodiment.

In the fifth embodiment shown in FIGS. 9A, 9B, and 10, when the first clutch C1 and the third clutch C3 are engaged, the fourth forward speed step "$4^{th}$" is established. However, in a sixth embodiment shown in FIGS. 11 and 12, when the first clutch C1 and the fourth clutch C4 are engaged (indicated at symbols "○" in FIG. 11), the fifth rotary element RM5 is rotated at the reduced speed via the first transmission portion 14, and the third rotary element RM3 is rotated together with the input shaft 24, while the fourth rotary element RM4 is rotated at a speed indicated at "$4^{th}$" (FIG. 12), so as to establish a fourth forward speed step "$4^{th}$" (FIG. 11). Since a speed ratio of the fourth speed step "$4^{th}$" in the sixth embodiment just a little differs from the speed ratio of the fourth speed step "$4^{th}$" in the fifth embodiment shown in FIGS. 5A, 5B, and 6, the fourth embodiment can enjoy the same advantages as those with the fifth embodiment.

Figures 13A, 13B:
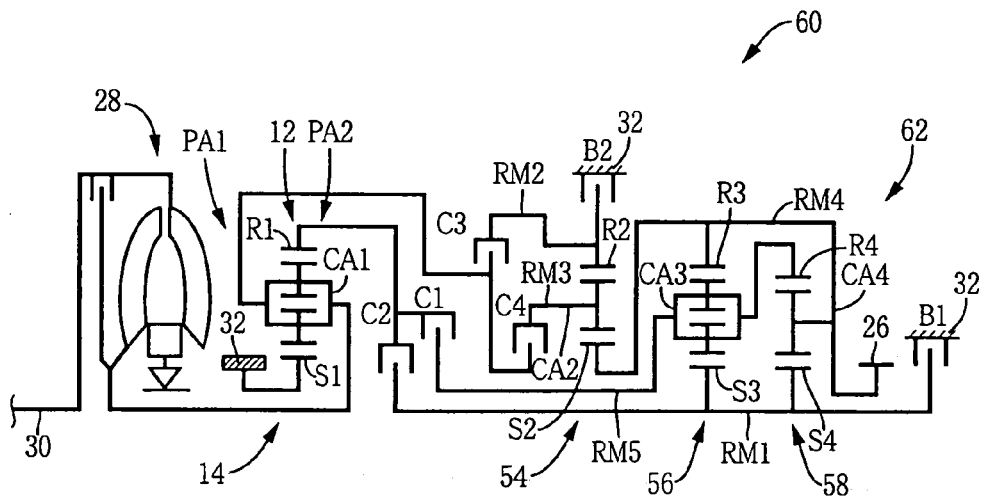
FIG. 13A is a view corresponding to FIG. 9A, showing another vehicle automatic transmission according to a seventh embodiment of the present invention, in which a second transmission portion differs from that in the fifth embodiment shown in FIG. 9A.
FIG. 13B is an operation table corresponding to FIG. 9B, for the transmission of FIG. 13A.

FIG. 13A corresponding to FIG. 1A schematically shows another vehicle automatic transmission 60 as a seventh embodiment of the vehicle multiple-step transmission according to the present invention; and FIG. 13B corresponding to FIG. 1B shows an operation table representing a relationship between a plurality of speed steps (i.e., first to eighth forward speed steps "$1^{st}$" through "$8^{th}$", and a reverse speed step "Rev"), and respective operations of engaging elements (i.e., first to fourth clutches C1 through C4, and first and second brakes B1, B2) and respective speed ratios of those speed steps. The vehicle automatic transmission 60 is readable on claims 1, 2, 3, 4, 8, 15, 19, 20, and 21. This transmission 60 differs from the transmission 50 shown in FIGS. 9A, 9B, and 10, with respect to a construction of a second transmission portion 62. More specifically described, a sun gear S3 of the third planetary gear set 56 and a sun gear S4 of the fourth planetary gear set 58 are connected to each other to provide a first rotary element RM1; a ring gear R2 of the second planetary gear set 54 provides a second rotary element RM2; a carrier CA2 of the second planetary gear set 54 provides a third rotary element RM3; a sun gear S2 of the second planetary gear set 54, a ring gear R3 of the third planetary gear set 56, and a carrier CA4 of the fourth planetary gear set 58 are connected to each other to provide a fourth rotary element RM4; and a carrier CA3 of the third planetary gear set 56 and a ring gear R4 of the fourth planetary gear set 58 are connected to each other to provide a fifth rotary element RM5. The first to fourth clutches C1, C2, C3, C4 and first and second brakes B1, B2 of the transmission 60 selectively connect the first to third and fifth rotary elements RM1 to RM3, RM5 to an input shaft 24, i.e., a first intermediate output path PA1, a ring gear R1 of a first planetary gear set 12, i.e., a second intermediate output path PA2, and a transmission case 32, in the same manner as the manner in that the first to fourth clutches C1 to C4 and first and second brakes B1, B2 of the transmission 50, shown in FIGS. 9A, 9B, and 10, selectively connect the first to third and fifth rotary elements RM1 to RM3, RM5 to the first and second intermediate output paths PA1, PA2 and the transmission case 32, and the fourth rotary element RM4 of the transmission 60 is integrally connected to an output gear 26, like in the transmission 50.

In the transmission 60, the eight forward speed steps, i.e., the first to eighth speed steps "$1^{st}$" to "$8^{th}$", and the reverse speed step "Rev" are established according to the operation table shown in FIG. 13B that is identical with the operation table shown in FIG. 1B. Respective speed ratios of those speed steps are determined by respective gear ratios ρ1, ρ2, ρ3, ρ4 of the first, second, third, and fourth planetary gear sets 12, 54, 56, 58. For example, in the case where gear ratio ρ1=0.445, gear ratio ρ2=0.329, gear ratio ρ3=0.282, and gear ratio ρ4=0.392, the speed ratios shown in FIG. 13B that are identical with the speed ratios shown in FIG. 1B, and a collinear chart shown in FIG. 14 that is identical with the collinear chart shown in FIG. 2 are obtained. Thus, the transmission 60 can enjoy the same advantages as those of the fifth embodiment shown in FIGS. 9A, 9B, and 10.

Figure 14:
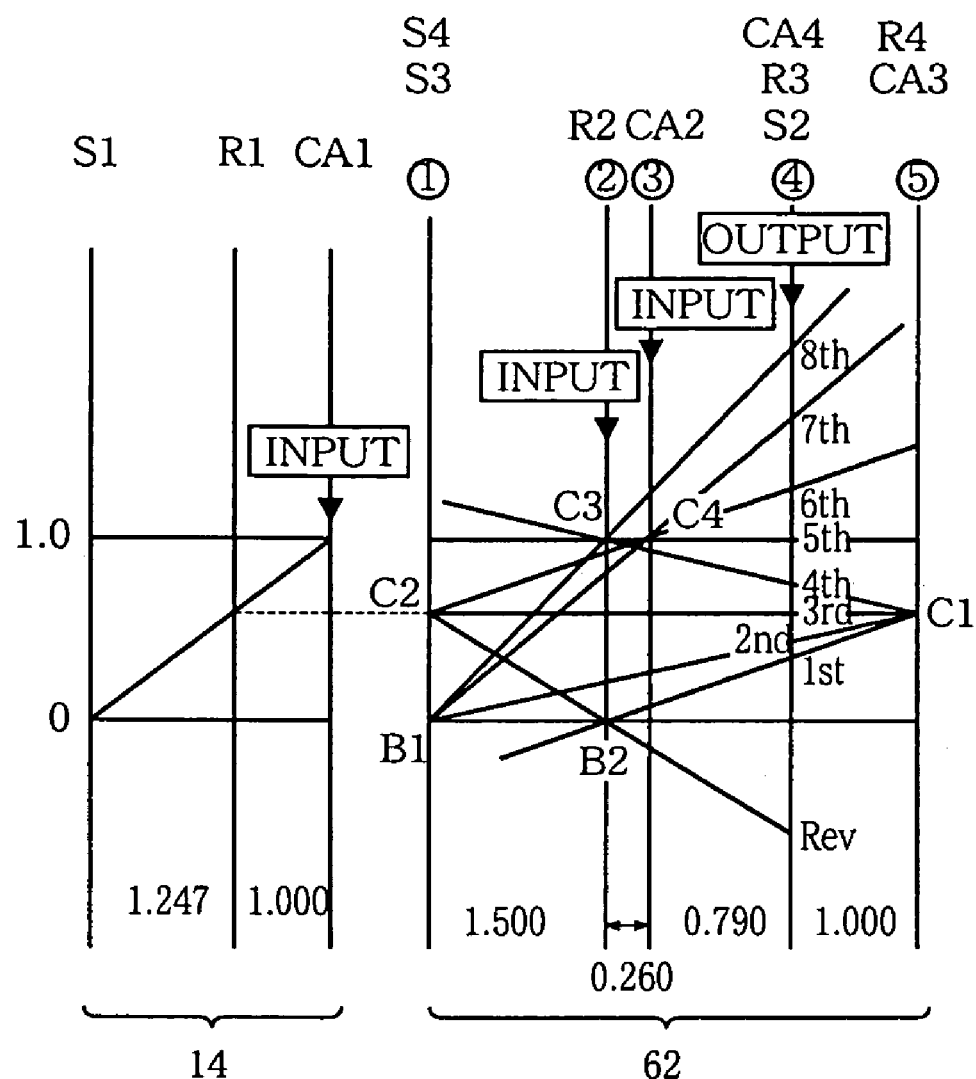
FIG. 14 is a collinear chart corresponding to FIG. 10, for the transmission of FIG. 13A.
Figures 15, 16:
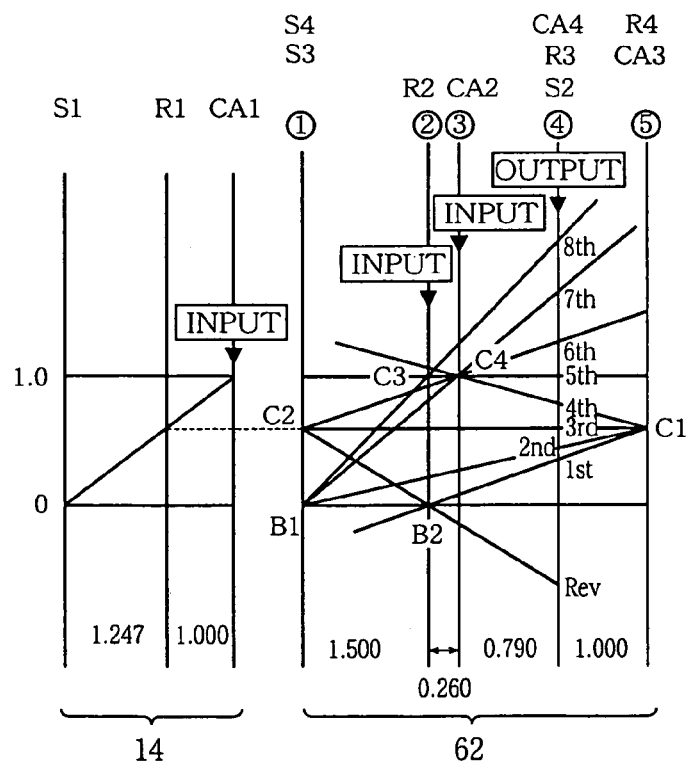
FIG. 15 is an operation table corresponding to FIG. 13B, for another vehicle automatic transmission as an eighth embodiment of the present invention, in which the combination of respective operating states of engaging elements to establish a fourth speed step differs from that of the operation table of FIG. 13B.
FIG. 16 is a collinear chart corresponding to FIG. 14, for the transmission as the eighth embodiment.

In the seventh embodiment shown in FIGS. 13A, 13B, and 14, when the first clutch C1 and the third clutch C3 are engaged, the fourth forward speed step "$4^{th}$" is established. However, in an eighth embodiment shown in FIGS. 15 and 16, when the first clutch C1 and the fourth clutch C4 are engaged (indicated at symbols "○" in FIG. 15), the fifth rotary element RM5 is rotated at the reduced speed via the first transmission portion 14, and the third rotary element RM3 is rotated together with the input shaft 24, while the fourth rotary element RM4 is rotated at a speed indicated at "$4^{th}$" (FIG. 16), so as to establish a fourth forward speed step "$4^{th}$" (FIG. 15). Since a speed ratio of the fourth speed step "$4^{th}$" in the eighth embodiment just a little differs from the speed ratio of the fourth speed step "$4^{th}$" in the seventh embodiment shown in FIGS. 13A, 13B, and 14, the eighth embodiment can enjoy the same advantages as those with the seventh embodiment.

Figures 17A, 17B:
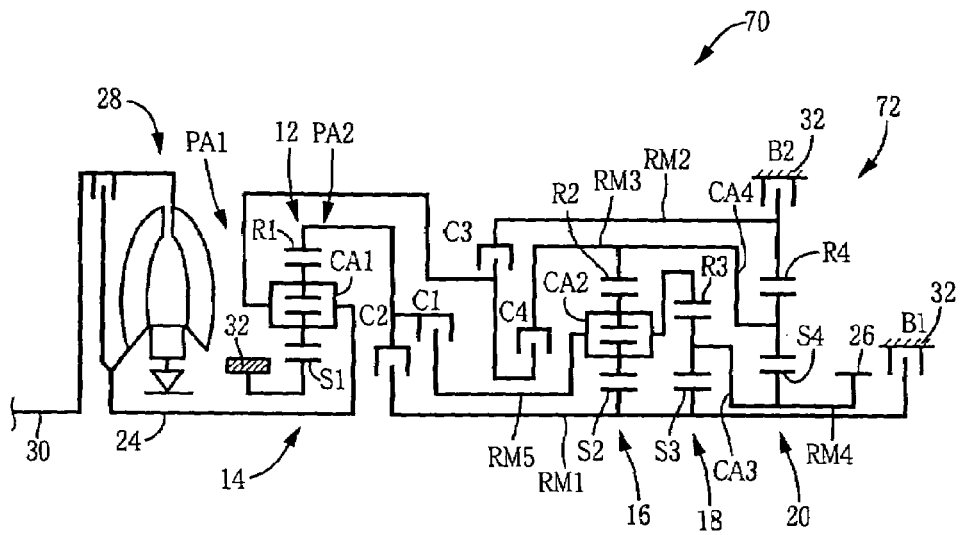
FIG. 17A is a view corresponding to FIG. 1A, showing another vehicle automatic transmission according to a ninth embodiment of the present invention, in which a second transmission portion differs from that in the first embodiment shown in FIG. 1A.
FIG. 17B is an operation table corresponding to FIG. 1B, for the transmission of FIG. 17A.

FIG. 17A corresponding to FIG. 1A schematically shows another vehicle automatic transmission 70 as a ninth embodiment of the vehicle multiple-step transmission according to the present invention; and FIG. 17B corresponding to FIG. 1B shows an operation table representing a relationship between a plurality of speed steps (i.e., first to eighth forward speed steps "$1^{st}$" through "$8^{th}$", and a reverse speed step "Rev"), and respective operations of engaging elements (i.e., first to fourth clutches C1 through C4, and first and second brakes B1, B2) and respective speed ratios of those speed steps. The vehicle automatic transmission 70 is readable on claims 1, 2, 3, 4, 9, 16, 19, 20, and 21. This transmission 70 differs from the transmission 10 shown in FIGS. 1A, 1B, and 2, with respect to a construction of a second transmission portion 72. More specifically described, a sun gear S2 of the second planetary gear set 16 and a sun gear S3 of the third planetary gear set 18 are connected to each other to provide a first rotary element RM1; a ring gear R4 of the fourth planetary gear set 20 provides a second rotary element RM2; a ring gear R2 of the second planetary gear set 16 and a carrier CA4 of the fourth planetary gear set 20 are connected to each other to provide a third rotary element RM3; a carrier CA3 of the third planetary gear set 18, and a sun gear S4 of the fourth planetary gear set 20 are connected to each other to provide a fourth rotary element RM4; and a carrier CA2 of the second planetary gear set 16 and a ring gear R3 of the third planetary gear set 18 are connected to each other to provide a fifth rotary element RM5. The first to fourth clutches C1, C2, C3, C4 and first and second brakes B1, B2 of the transmission 70 selectively connect the first to third and fifth rotary elements RM1 to RM3, RM5 to an input shaft 24, i.e., a first intermediate output path PA1, a ring gear R1 of a first planetary gear set 12, i.e., a second intermediate output path PA2, and a transmission case 32, in the same manner as the manner in that the first to fourth clutches C1 to C4 and first and second brakes B1, B2 of the transmission 10, shown in FIGS. 1A, 1B, and 2, selectively connect the first to third and fifth rotary elements RM1 to RM3, RM5 to the first and second intermediate output paths PA1, PA2 and the transmission case 32, and the fourth rotary element RM4 of the transmission 70 is integrally connected to an output gear 26, like in the transmission 10.

In the transmission 70, the eight forward speed steps, i.e., the first to eighth speed steps "$1^{st}$" to "$8^{th}$", and the reverse speed step "Rev" are established according to the operation table shown in FIG. 17B that is identical with the operation table shown in FIG. 1B. Respective speed ratios of those speed steps are determined by respective gear ratios ρ1, ρ2, ρ3, ρ4 of the first, second, third, and fourth planetary gear sets 12, 16, 18, 20. For example, in the case where gear ratio ρ1=0.445, gear ratio, ρ2=0.504, gear ratio ρ3=0.392, and gear ratio ρ4=0.329, the speed ratios shown in FIG. 17B that are identical with the speed ratios shown in FIG. 1B, and a collinear chart shown in FIG. 18 that is identical with the collinear chart shown in FIG. 2 are obtained. Thus, the transmission 70 can enjoy the same advantages as those of the first embodiment shown in FIGS. 1A, 1B, and 2.

Figure 18:
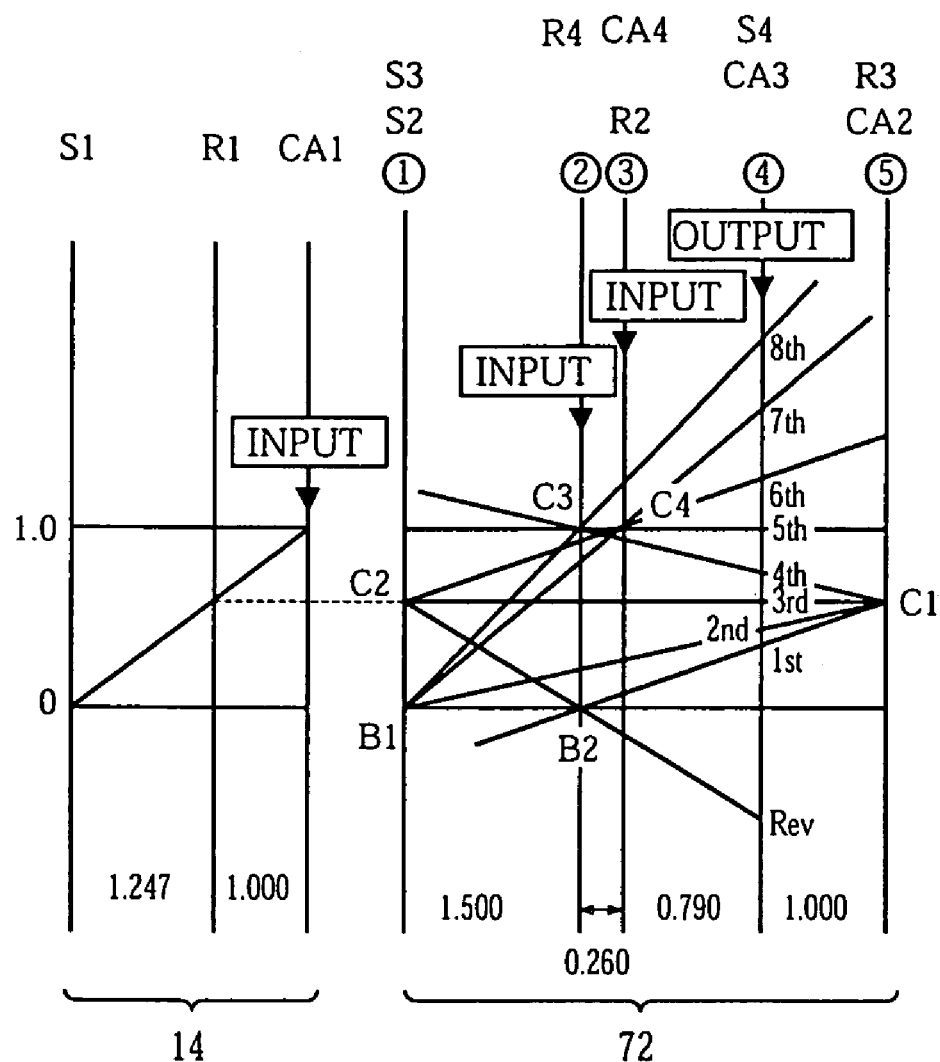
FIG. 18 is a collinear chart corresponding to FIG. 2, for the transmission of FIG. 17A.
Figures 19, 20:
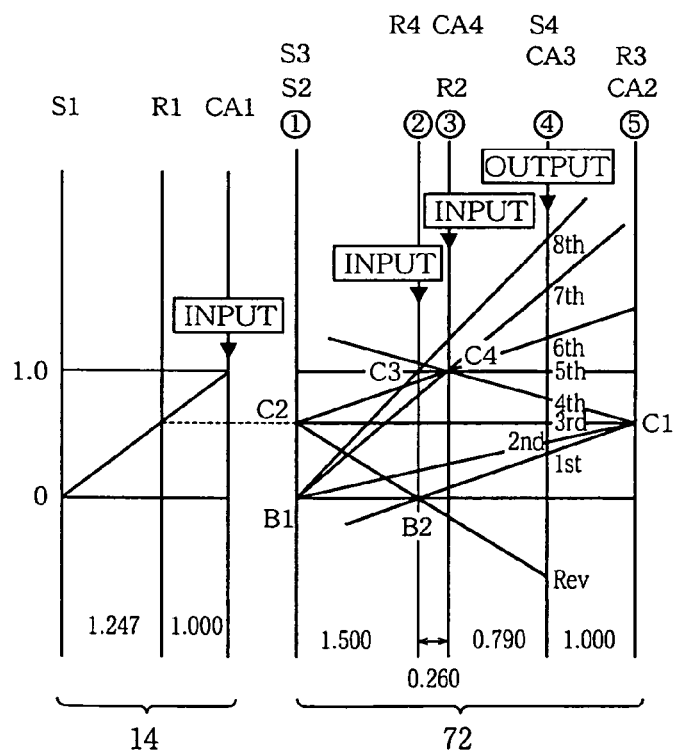
FIG. 19 is an operation table corresponding to FIG. 17B, for another vehicle automatic transmission as a tenth embodiment of the present invention, in which the combination of respective operating states of engaging elements to establish a fourth speed step differs from that of the operation table of FIG. 17B.
FIG. 20 is a collinear chart corresponding to FIG. 18, for the transmission as the tenth embodiment.

In the ninth embodiment shown in FIGS. 17A, 17B, and 18, when the first clutch C1 and the third clutch C3 are engaged, the fourth forward speed step "$4^{th}$" is established. However, in a tenth embodiment shown in FIGS. 19 and 20, when the first clutch C1 and the fourth clutch C4 are engaged (indicated at symbols "○" in FIG. 19), the fifth rotary element RM5 is rotated at the reduced speed via the first transmission portion 14, and the third rotary element RM3 is rotated together with the input shaft 24, while the fourth rotary element RM4 is rotated at a speed indicated at "$4^{th}$" (FIG. 20), so as to establish a fourth forward speed step "$4^{th}$" (FIG. 19). Since a speed ratio of the fourth speed step "$4^{th}$" in the tenth embodiment just a little differs from the speed ratio of the fourth speed step "$4^{th}$" in the ninth embodiment shown in FIGS. 17A, 17B, and 18, the tenth embodiment can enjoy the same advantages as those with the ninth embodiment.

Figures 21A, 21B:
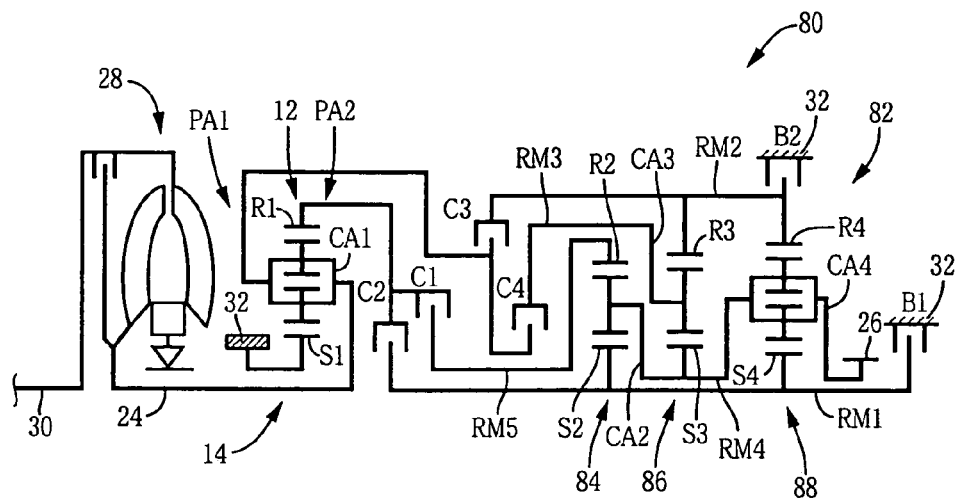
FIG. 21A is a view corresponding to FIG. 1A, showing another vehicle automatic transmission according to an eleventh embodiment of the present invention, in which a second transmission portion differs from that in the first embodiment shown in FIG. 1A.
FIG. 21B is an operation table corresponding to FIG. 1B, for the transmission of FIG. 21A.

FIG. 21A corresponding to FIG. 1A schematically shows another vehicle automatic transmission 80 as an eleventh embodiment of the vehicle multiple-step transmission according to the present invention; and FIG. 21B corresponding to FIG. 1B shows an operation table representing a relationship between a plurality of speed steps (i.e., first to eighth forward speed steps "$1^{st}$" through "$8^{th}$", and a reverse speed step "Rev"), and respective operations of engaging elements (i.e., first to fourth clutches C1 through C4, and first and second brakes B1, B2) and respective speed ratios of those speed steps. The vehicle automatic transmission 80 is readable on claims 1, 2, 3, 4, 10, 17, 19, 20, and 21. This transmission 80 differs from the transmission 10 shown in FIGS. 1A, 1B, and 2, with respect to a construction of a second transmission portion 82. More specifically described, the second transmission portion 82 is essentially constituted by a second planetary gear set 84 of single-pinion type, a third planetary gear set 86 of single-pinion type, and a fourth planetary gear set 88 of double-pinion type. A sun gear S2 of the second planetary gear set 84 and a sun gear S4 of the fourth planetary gear set 88 are connected to each other to provide a first rotary element RM1; a ring gear R3 of the third planetary gear set 86 and a ring gear R4 of the fourth planetary gear set 88 are connected to each other to provide a second rotary element RM2; a carrier CA3 of the third planetary gear set 86 provides a third rotary element RM3; a carrier CA2 of the second planetary gear set 84, a sun gear S3 of the third planetary gear set 86, and a carrier CA4 of the fourth planetary gear set 88 are connected to each other to provide a fourth rotary element RM4; and a ring gear R2 of the second planetary gear set 84 provides a fifth rotary element RM5. The first to fourth clutches C1, C2, C3, C4 and first and second brakes B1, B2 of the transmission 80 selectively connect the first to third and fifth rotary elements RM1 to RM3, RM5 to an input shaft 24, i.e., a first intermediate output path PA1, a ring gear R1 of a first planetary gear set 12, i.e., a second intermediate output path PA2, and a transmission case 32, in the same manner as the manner in that the first to fourth clutches C1 to C4 and first and second brakes B1, B2 of the transmission 10, shown in FIGS. 1A, 1B, and 2, selectively connect the first to third and fifth rotary elements RM1 to RM3, RM5 to the first and second intermediate output paths PA1, PA2 and the transmission case 32, and the fourth rotary element RM4 of the transmission 80 is integrally connected to an output gear 26, like in the transmission 10. The second planetary gear set 84 provides a 2-1 planetary gear set; the third planetary gear set 86 provides a 2-2 planetary gear set; and the fourth planetary gear set 88 provides a 2-3 planetary gear set.

In the transmission 80, the eight forward speed steps, i.e., the first to eighth speed steps "$1^{st}$" to "$8^{th}$", and the reverse speed step "Rev" are established according to the operation table shown in FIG. 21B that is identical with the operation table shown in FIG. 1B. Respective speed ratios of those speed steps are determined by respective gear ratios ρ1, ρ2, ρ3, ρ4 of the first, second, third, and fourth planetary gear sets 12, 84, 86, 88. For example, in the case where gear ratio ρ1=0.445, gear ratio ρ2=0.392, gear ratio ρ3=0.329, and gear ratio ρ4=0.412, the speed ratios shown in FIG. 21B that are identical with the speed ratios shown in FIG. 1B, and a collinear chart shown in FIG. 22 that is identical with the collinear chart shown in FIG. 2 are obtained. Thus, the transmission 80 can enjoy the same advantages as those of the first embodiment shown in FIGS. 1A, 1B, and 2.

Figure 22:
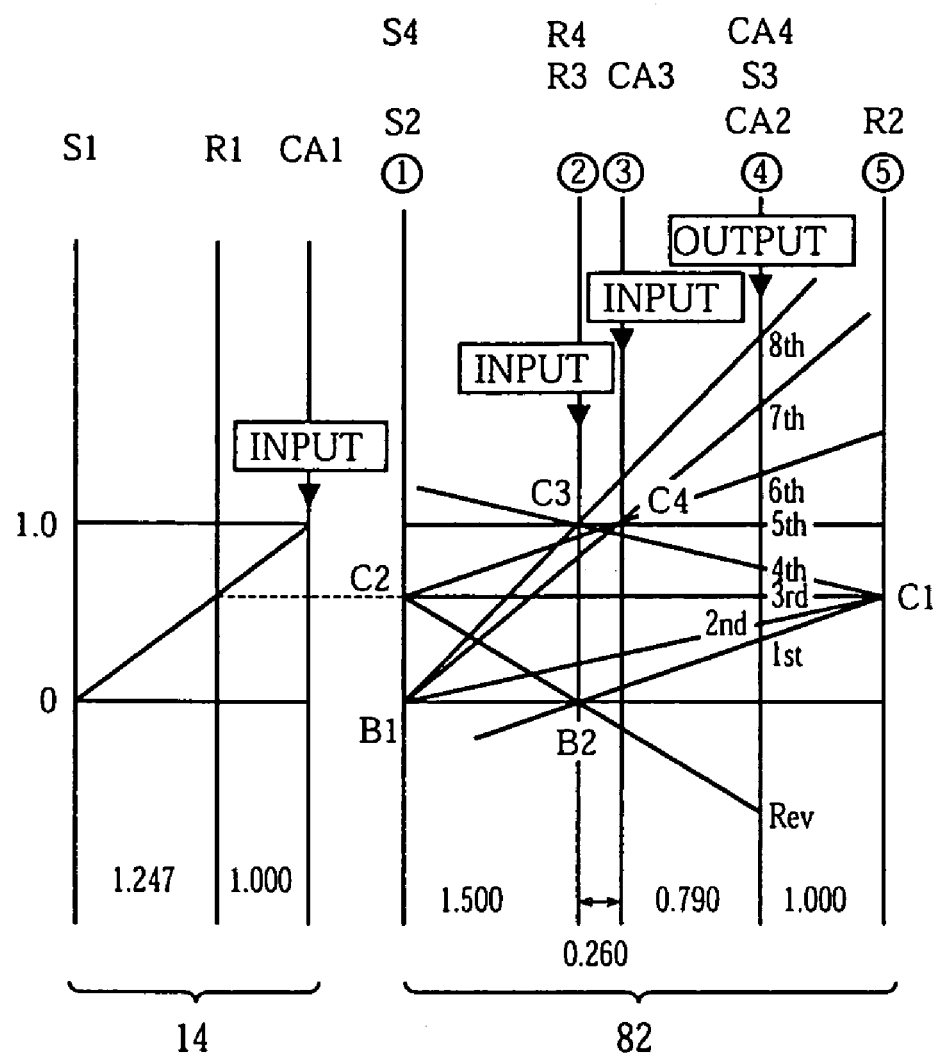
FIG. 22 is a collinear chart corresponding to FIG. 2, for the transmission of FIG. 21A.
Figures 23, 24:
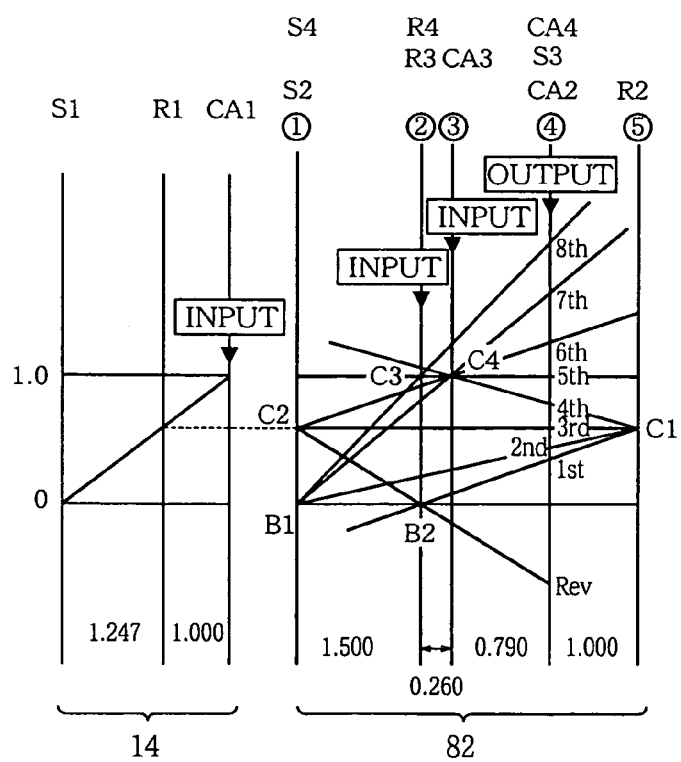
FIG. 23 is an operation table corresponding to FIG. 21B, for another vehicle automatic transmission as a twelfth embodiment of the present invention, in which the combination of respective operating states of engaging elements to establish a fourth speed step differs from that of the operation table of FIG. 21B.
FIG. 24 is a collinear chart corresponding to FIG. 22, for the transmission as the eleventh embodiment.

In the eleventh embodiment shown in FIGS. 21A, 21B, and 22, when the first clutch C1 and the third clutch C3 are engaged, the fourth forward speed step "$4^{th}$" is established. However, in a twelfth embodiment shown in FIGS. 23 and 24, when the first clutch C1 and the fourth clutch C4 are engaged (indicated at symbols "○" in FIG. 23), the fifth rotary element RM5 is rotated at the reduced speed via the first transmission portion 14, and the third rotary element RM3 is rotated together with the input shaft 24, while the fourth rotary element RM4 is rotated at a speed indicated at "$4^{th}$" (FIG. 24), so as to establish a fourth forward speed step "$4^{th}$" (FIG. 23). Since a speed ratio of the fourth speed step "$4^{th}$" in the twelfth embodiment just a little differs from the speed ratio of the fourth speed step "$4^{th}$" in the eleventh embodiment shown in FIGS. 21A, 21B, and 22, the twelfth embodiment can enjoy the same advantages as those with the eleventh embodiment.

Figure 25:
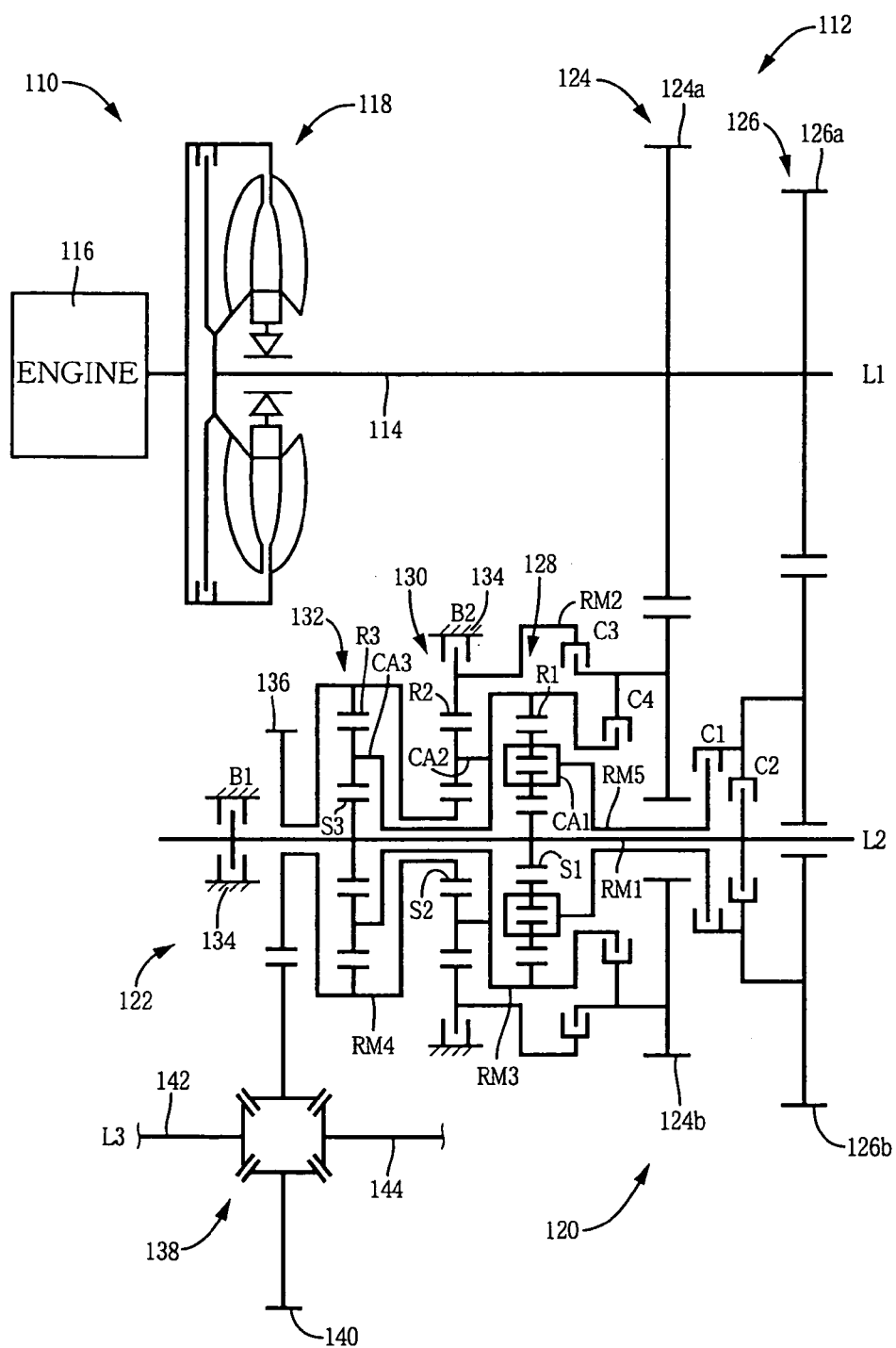
FIG. 25 is a schematic view corresponding to FIG. 1A, showing a vehicle drive apparatus including another vehicle automatic transmission of counter-gear type according to a thirteenth embodiment of the present invention, in which a first transmission portion is provided on two axis lines.
Figures 26, 27:
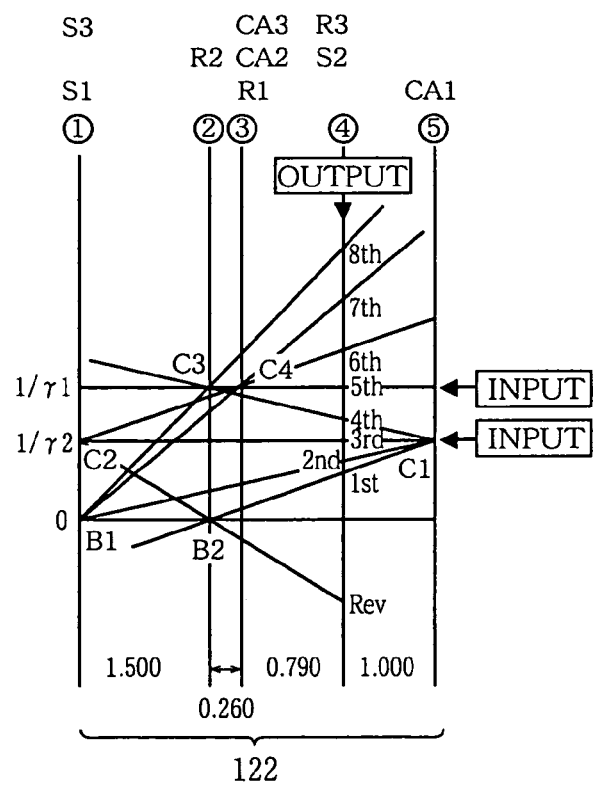
FIG. 26 is an operation table corresponding to FIG. 1B, for the transmission of FIG. 25.
FIG. 27 is a collinear chart corresponding to FIG. 2, for the transmission of FIG. 25.

FIG. 25 schematically shows a vehicle drive apparatus 110 which is preferably mounted on an FF vehicle such that the vehicle drive apparatus 110 is transversely set and which includes a vehicle automatic transmission 112 as a thirteenth embodiment of the vehicle multiple-step transmission according to the present invention; and FIG. 26 shows an operation table representing a relationship between a plurality of speed steps (i.e., first to eighth forward speed steps "$1^{st}$" through "$8^{th}$", and a reverse speed step "Rev"), and respective operations of engaging elements (i.e., first to fourth clutches C1 through C4, and first and second brakes B1, B2) and respective speed ratios of those speed steps. The vehicle automatic transmission 112 is readable on claims 1, 2, 3, 4, 5, 12, 19, and 20. This transmission 112 is provided over a first axis line L1 and a second axis line L2 which are parallel to each other. On the first axis line L1, there is provided an input shaft 114 as an input member to which power is inputted from an engine 116, such as an internal combustion engine which produces power by firing fuel, via a torque converter 118 as a fluid coupling. The input shaft 114 provides an axis of a turbine of the torque converter 118.

A first transmission portion 120 is provided over the first and second axis lines L1, L2; and a second transmission portion 122 is provided on the second axis line L2. The first transmission portion 120 includes a first power transmitter 124 including a pair of counter gears 124a, 124b meshed with each other, and a second power transmitter 126 including a pair of counter gears 126a, 126b meshed with each other. The counter gears 124a, 126a on the side of the first axis line L1 are provided, by, e.g., spline fitting, on the input shaft 114, such that the counter gears 124a, 124b are not rotatable relative to the input shaft 114, whereas the counter gears 124b, 126b on the side of the second axis line L2 are provided such that the counter gears 124b, 126b are rotatable about the axis line L2. A rotary motion of the counter gear 124a is transmitted to the counter gear 124b, at a first speed ratio γ1 (=(number of teeth of counter gear 124b)/(number of teeth of counter gear 124a); and a rotary motion of the counter gear 126a is transmitted to the counter gear 126b, at a second speed ratio γ2 (=(number of teeth of counter gear 126b)/(number of teeth of counter gear 126a). First speed ratio γ1 is smaller than second speed ratio γ2. In the present embodiment, first speed ratio γ1=1.0 and second speed ratio γ2=1.802. That is, the first power transmitter 124 transmits the rotary motion of the input shaft 114, to the side of the second axis line L2, at the same rotational speed as that of the input shaft 114, however, in a reverse direction; and the second power transmitter 126 transmits the rotary motion of the input shaft 114, to the side of the second axis line L2, at a reduced rotational speed, 1/γ2. In the first transmission portion 120, a path in which the rotary motion of the input shaft 114 is transmitted by the first transmitter 124 is a first intermediate output path; and another in which the rotary motion of the input shaft 114 is transmitted by the second transmitter 126 is a second intermediate output path.

The second transmission portion 122 provided on the second axis line L2 is essentially constituted by a first planetary gear set 128 of double-pinion type, a second planetary gear set 130 of single-pinion type, and a third planetary gear set 132 of single-pinion type. The second transmission portion 122 has substantially the same construction as that of the second transmission portion 22 shown in FIG. 1A. A sun gear S1 of the first planetary gear set 128 and a sun gear S3 of the third planetary gear set 132 are connected to each other to provide a first rotary element RM1; a ring gear R2 of the second planetary gear set 130 provides a second rotary element RM2; a ring gear R1 of the first planetary gear set 128, a carrier CA2 of the second planetary gear set 130, and a carrier CA3 of the third planetary gear set 132 are connected to each other to provide a third rotary element RM3; a sun gear S2 of the second planetary gear set 130 and a ring gear R3 of the third planetary gear set 132 are connected to each other to provide a fourth rotary element RM4; and a carrier CA1 of the first planetary gear set 128 provides a fifth rotary element RM5. The first planetary gear set 128 provides a 2-1 planetary gear set; the second planetary gear set 130 provides a 2-2 planetary gear set; and the third planetary gear set 132 provides a 2-3 planetary gear set.

The first rotary element RM1 (i.e., the sun gears S1, S3) is selectively connected, by a first brake B1, to a transmission case 134, so that the first rotary element RM1 is stopped from rotation; the second rotary element RM2 (i.e., the ring gear R2) is selectively connected, by a second brake B2, to the transmission case 134, so that the second rotary element RM2 is stopped from rotation; the fifth rotary element RM5 (i.e., the carrier CA1) is selectively connected via a first clutch C1 to the counter gear 126b of the second power transmitter 126, i.e., the second intermediate output path; the first rotary element RM1 (i.e., the sun gears S1, S3) is selectively connected via a second clutch C2 to the counter gear 126b of the second power transmitter 126, i.e., the second intermediate output path; the second rotary element RM2 (i.e., the ring gear R2) is selectively connected via a third clutch C3 to the counter gear 124b of the first power transmitter 124, i.e., the first intermediate output path; the third rotary element RM3 (i.e., the ring gear R1 and the carriers CA2, CA3) is selectively connected via a fourth clutch C4 to the counter gear 124b of the first power transmitter 124, i.e., the first intermediate output path; and the fourth rotary element RM4 (i.e., the sun gear S2 and the ring gear R3) is integrally connected to an output gear 136 as an output member so as to output the rotary motion. The output gear 136 is meshed with a ring gear of a differential gear unit 138 provided on a third axis line L3 parallel to the first and second axis lines L1, L2, and transmits the rotary motion which is distributed to left and right wheels via two axle shafts 142, 144. Though in FIG. 25 the first, second, and third axis lines L1, L2, L3 are seen to be located on a common plane, those three axis lines L1, L2, L3, in fact, cooperate with each other to define a triangle as seen in an axial direction thereof.

FIG. 27 shows a collinear chart showing a plurality of straight lines each of which represents, in each of the speed steps, respective rotational speeds of the respective rotary elements of the second transmission portion 122. A lower horizontal straight line indicates a rotational speed of "0"; an upper horizontal straight line indicates a relative rotational speed of "$1/\gamma 1$", more specifically described, in the present embodiment, a relative rotational speed of "1.0" that is equal to the rotational speed of the input shaft 114, but in the reverse direction; and an intermediate horizontal straight line indicates a relative rotational speed of "$1/\gamma 2$". Five vertical lines for the second transmission portion 122 represent the first rotary element RM1 (the sun gears S1, S3), the second rotary element RM2 (the ring gear R2), the third rotary element RM3 (the ring gear R1 and the carriers CA2, CA3), the fourth rotary element RM4 (the sun gear S2 and the ring gear R3), and the fifth rotary element RM5 (the carrier CA1), respectively, in the order from the left to the right. Distances between adjacent ones of the five vertical lines are defined by a gear ratio $\rho 1$ of the first planetary gear set 128, a gear ratio $\rho 2$ of the second planetary gear set 130, and a gear ratio $\rho 3$ of the third planetary gear set 132. FIG. 27 shows a case where gear ratio $\rho 1=0.504$, gear ratio $\rho 2=0.329$, and gear ratio $\rho 3=0.449$. If speed ratio $\gamma 1=1.0$ and speed ratio $\gamma 2=1.802$, then the collinear chart of FIG. 27 is identical with that of FIG. 2.

In the transmission 112, too, the eight forward speed steps, i.e., the first to eighth speed steps "$1^{st}$" to "$8^{th}$", and the reverse speed step "Rev" are established when the first to fourth clutches C1 to C4 and the first and second brakes B1, B2 are selectively engaged or disengaged according to the operation table shown in FIG. 26 that is identical with the operation table shown in FIG. 1B. Respective speed ratios of those speed steps are determined by the first and second speed ratios $\gamma 1$, $\gamma 2$ of the first transmission portion 120 and the respective gear ratios $\rho 1$, $\rho 2$, $\rho 3$ of the first, second, and third planetary gear sets 128, 130, 132. For example, in the case where speed ratio $\gamma 1=1.0$, speed ratio $\gamma 2=1.802$, gear ratio $\rho 1=0.445$, gear ratio $\rho 2=0.392$, gear ratio $\rho 3=0.310$, and gear ratio $\rho 4=0.329$, the speed ratios shown in FIG. 26 that are identical with the speed ratios shown in FIG. 1B are obtained. Thus, the transmission 80 can enjoy the same advantages as those of the first embodiment shown in FIGS. 1A, 1B, and 2.

In addition, in the present embodiment, the engine 116, the torque converter 118, and the counter gears 124a, 126a of the first transmission portion 120 are provided on the first axis line L1, while the counter gears 124b, 126b of the first transmission portion 120 and the three planetary gear sets 128, 130, 132 of the second transmission portion 122 are provided on the second axis line L2. Therefore, a dimension of the transmission 112 in an axial direction thereof can be reduced as compared with the case where all of them are provided on a common axis line. Thus, the present transmission 112 can be transversely set on an FF vehicle, such that the first and second axis lines L1, L2 extend in a widthwise direction of the vehicle.

Figures 28, 29:
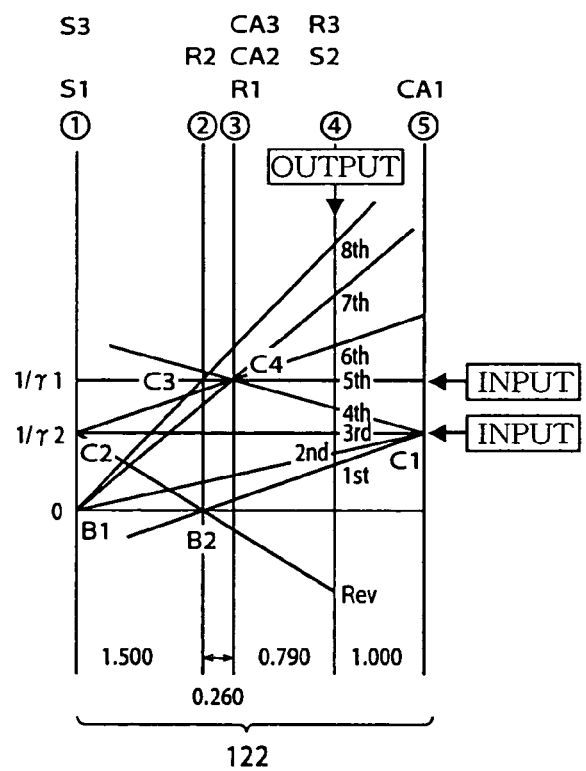
FIG. 28 is an operation table corresponding to FIG. 26, for another vehicle automatic transmission as a fourteenth embodiment of the present invention, in which the combination of respective operating states of engaging elements to establish a fourth speed step differs from that of the operation table of FIG. 26.
FIG. 29 is a collinear chart corresponding to FIG. 27, for the transmission as the fourteenth embodiment.

In the thirteenth embodiment shown in FIGS. 25 to 27, when the first clutch C1 and the third clutch C3 are engaged, the fourth forward speed step "$4^{th}$" is established. However, in a fourteenth embodiment shown in FIGS. 28 and 29, when the first clutch C1 and the fourth clutch C4 are engaged (indicated at symbols "◯" in FIG. 28), the fifth rotary element RM5 is rotated at the speed $1/\gamma 2$ via the second power transmitter 126, and the third rotary element RM3 is rotated at the speed $1/\gamma 1$ via the first power transmitter 124, while the fourth rotary element RM4 is rotated at a speed indicated at "$4^{th}$" (FIG. 29), so as to establish a fourth forward speed step "$4^{th}$" (FIG. 28). Since the speed ratio of the fourth speed step "$4^{th}$" just a little differs from that shown in FIG. 26, the fourteenth embodiment can enjoy the same advantages as those of the thirteenth embodiment shown in FIGS. 25 to 27.

Figure 30:
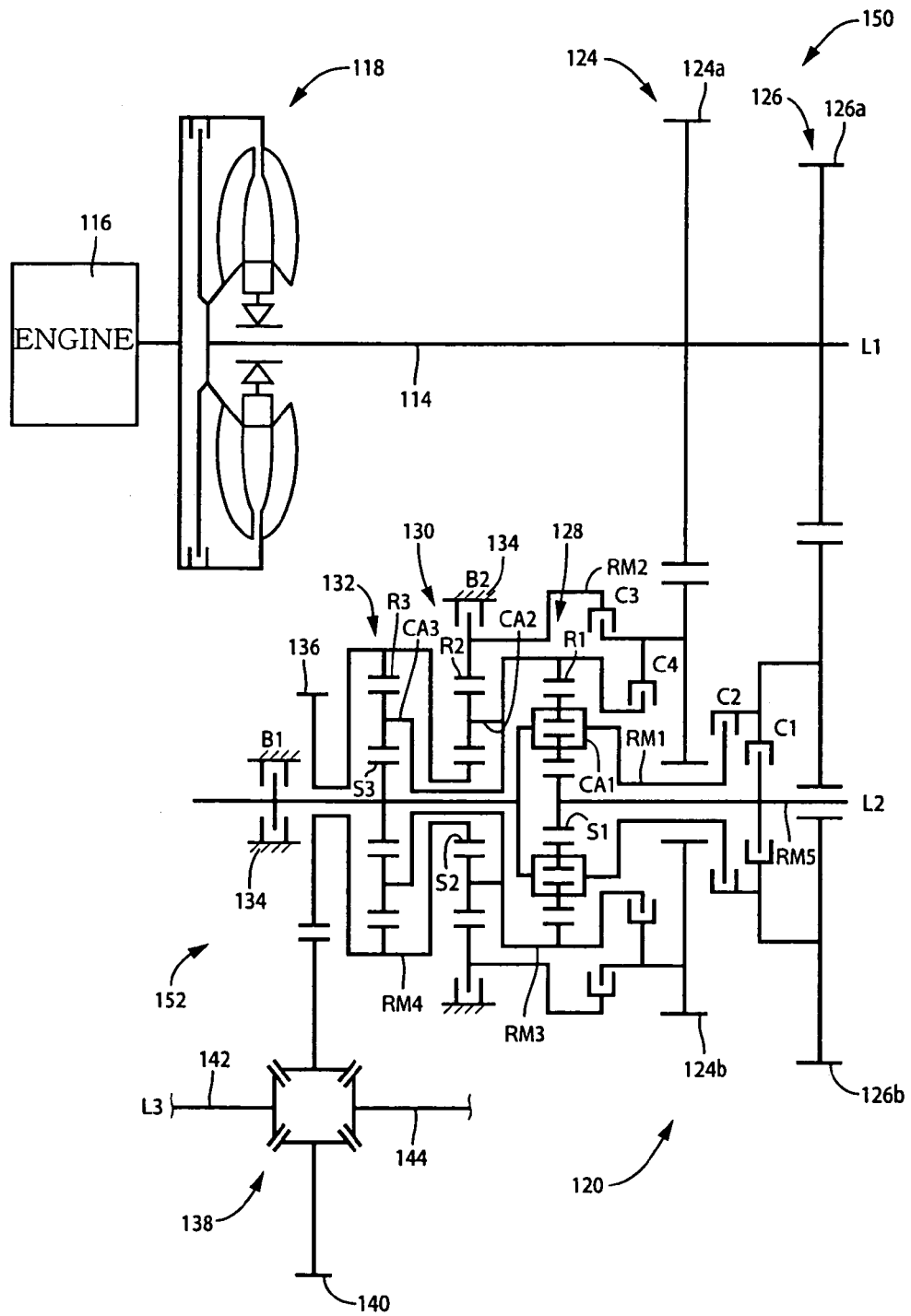
FIG. 30 is a schematic view corresponding to FIG. 25, showing another vehicle drive apparatus including another vehicle automatic transmission of counter-gear type according to a fifteenth embodiment of the present invention, in which a second transmission portion differs from that in the thirteenth embodiment shown in FIG. 25.
Figures 31, 32:
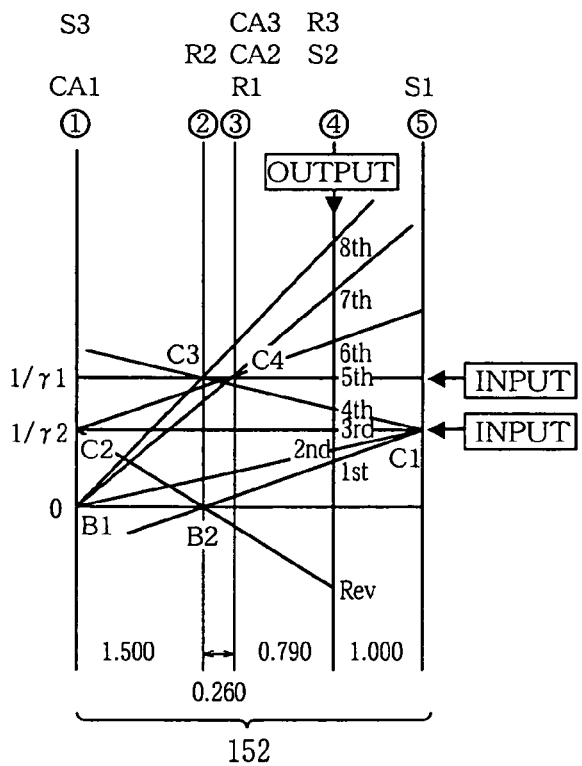
FIG. 31 is an operation table corresponding to FIG. 26, for the transmission of FIG. 30.
FIG. 32 is a collinear chart corresponding to FIG. 27, for the transmission of FIG. 30.

FIG. 30 corresponding to FIG. 25 schematically shows another vehicle automatic transmission 150 as a fifteenth embodiment of the vehicle multiple-step transmission according to the present invention; and FIG. 31 corresponding to FIG. 26 shows an operation table representing a relationship between a plurality of speed steps (i.e., first to eighth forward speed steps "$1^{st}$" through "$8^{th}$", and a reverse speed step "Rev"), and respective operations of engaging elements (i.e., first to fourth clutches C1 through C4, and first and second brakes B1, B2) and respective speed ratios of those speed steps. The vehicle automatic transmission 150 is readable on claims 1, 2, 3, 4, 6, 13, 19, and 20. This transmission 150 differs from the transmission 112 shown in FIGS. 25 to 27, with respect to a construction of a second transmission portion 152. More specifically described, the second transmission portion 152 has substantially the same construction as that of the second transmission portion 42 in the third embodiment shown in FIGS. 5A, 5B, and 6. A carrier CA1 of the first planetary gear set 128 and a sun gear S3 of the third planetary gear set 130 are connected to each other to provide a first rotary element RM1; a ring gear R2 of the second planetary gear set 130 provides a second rotary element RM2; a ring gear R1 of the first planetary gear set 128, a carrier CA2 of the second planetary gear set 130, and a carrier CA3 of the third planetary gear set 132 are connected to each other to provide a third rotary element RM3; a sun gear S2 of the second planetary gear set 130 and a ring gear R3 of the third planetary gear set 132 are connected to each other to provide a fourth rotary element RM4; and a sun gear S1 of the first planetary gear set 128 provides a fifth rotary element RM5. The first to fourth clutches C1, C2, C3, C4 and first and second brakes B1, B2 of the transmission 150 selectively connect the first to third and fifth rotary elements RM1 to RM3, RM5 to a counter gear 124b of a first power transmitter 124, i.e., a first intermediate output path, a counter gear 126b of a second power transmitter 126, i.e., a second intermediate output path, and a transmission case 134, in the same manner as the manner in that the first to fourth clutches C1 to C4 and first and second brakes B1, B2 of the transmission 112, shown in FIGS. 25 to 27, selectively connect the first to third and fifth rotary elements RM1 to RM3, RM5 to the first and second intermediate output paths and the transmission case 134, and the fourth rotary element RM4 of the transmission 150 is integrally connected to an output gear 136, like in the transmission 112.

In the transmission 150, the eight forward speed steps, i.e., the first to eighth speed steps "$1^{st}$" to "$8^{th}$", and the reverse speed step "Rev" are established according to the operation table shown in FIG. 31 that is identical with the operation table shown in FIG. 26. Respective speed ratios of those speed steps are determined by the first and second speed ratios γ1, γ2 of the first transmission portion 120 and the respective gear ratios ρ1, ρ2, ρ3 of the first, second, and third planetary gear sets 128, 130, 132. For example, in the case where speed ratio γ1=1.0, speed ratio γ2=1.802, gear ratio ρ1=0.496, gear ratio ρ2=0.329, gear ratio ρ3=0.449, the speed ratios shown in FIG. 31 that are identical with the speed ratios shown in FIG. 26, and a collinear chart shown in FIG. 32 that is identical with the collinear chart shown in FIG. 27 are obtained. Thus, the transmission 150 can enjoy the same advantages as those of the thirteenth embodiment shown in FIGS. 25 to 27.

Figures 33, 34:
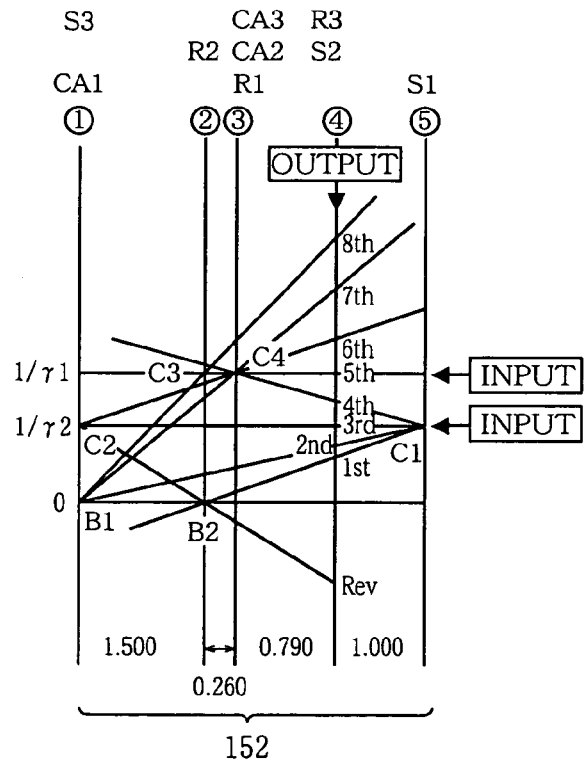
FIG. 33 is an operation table corresponding to FIG. 31, for another vehicle automatic transmission as a sixteenth embodiment of the present invention, in which the combination of respective operating states of engaging elements to establish a fourth speed step differs from that of the operation table of FIG. 31.
FIG. 34 is a collinear chart corresponding to FIG. 32, for the transmission as the sixteenth embodiment.

In the fifteenth embodiment shown in FIGS. 30 to 32, when the first clutch C1 and the third clutch C3 are engaged, the fourth forward speed step "$4^{th}$" is established. However, in a sixteenth embodiment shown in FIGS. 33 and 34, when the first clutch C1 and the fourth clutch C4 are engaged (indicated at symbols "◯" in FIG. 33), the fifth rotary element RM5 is rotated at the speed 1/γ2 via the second power transmitter 126, and the third rotary element RM3 is rotated at the speed 1/γ1 via the first power transmitter 124, while the fourth rotary element RM4 is rotated at a speed indicated at "$4^{th}$" (FIG. 34), so as to establish a fourth forward speed step "$4^{th}$" (FIG. 33). Since the speed ratio of the fourth speed step "$4^{th}$" just a little differs from that shown in FIG. 31, the sixteenth embodiment can enjoy the same advantages as those of the fifteenth embodiment shown in FIGS. 30 to 32.

Figure 35:
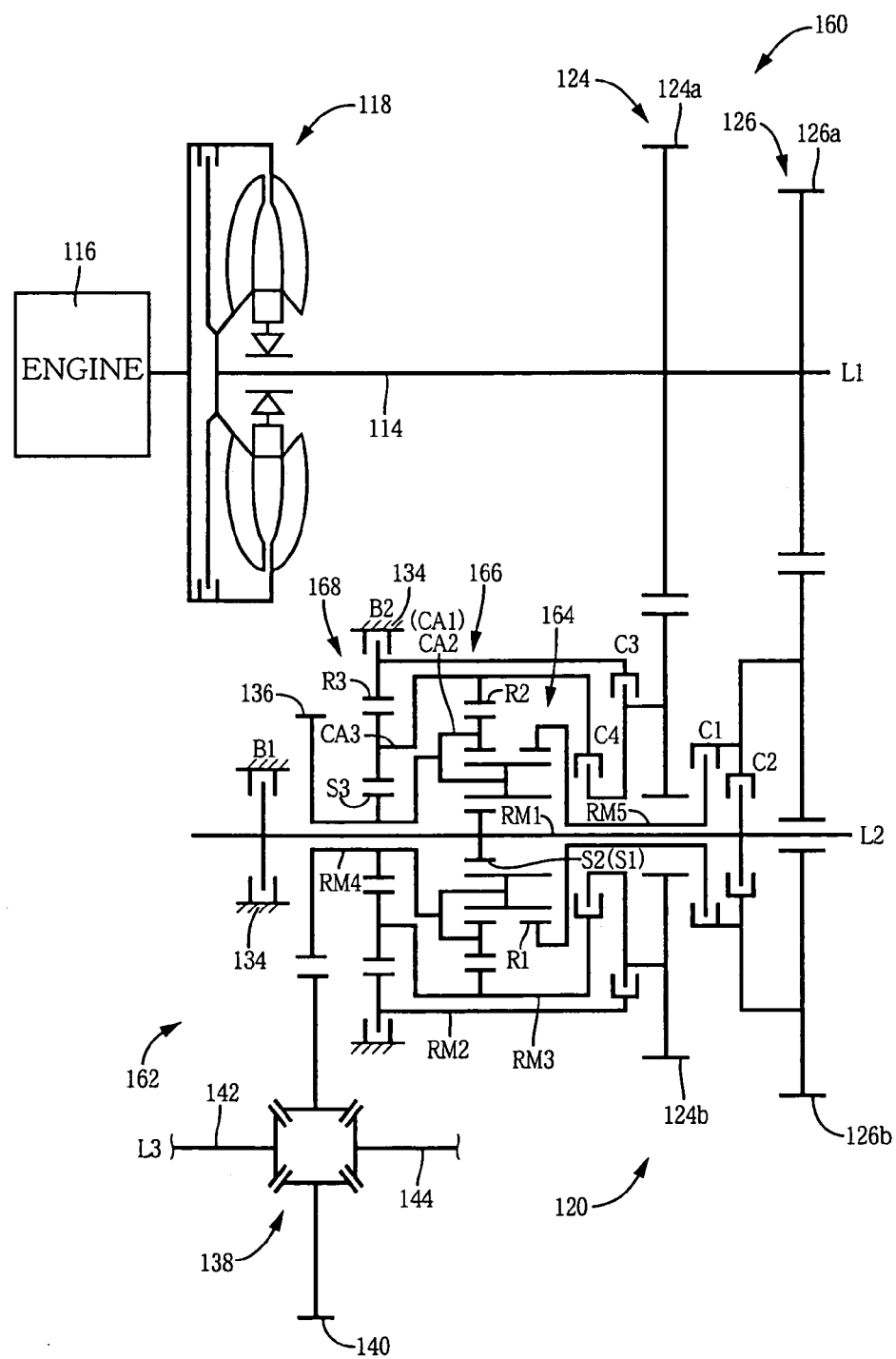
FIG. 35 is a schematic view corresponding to FIG. 25, showing another vehicle drive apparatus including another vehicle automatic transmission of counter-gear type according to a seventeenth embodiment of the present invention, in which a second transmission portion differs from that in the thirteenth embodiment shown in FIG. 25.
Figures 36, 37:
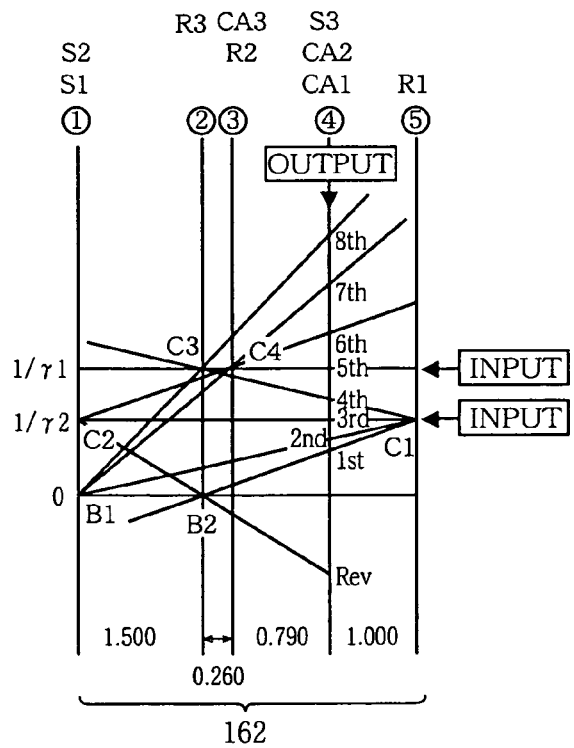
FIG. 36 is an operation table corresponding to FIG. 26, for the transmission of FIG. 35.
FIG. 37 is a collinear chart corresponding to FIG. 27, for the transmission of FIG. 35.

FIG. 35 corresponding to FIG. 25 schematically shows another vehicle automatic transmission 160 as a seventeenth embodiment of the vehicle multiple-step transmission according to the present invention; and FIG. 36 corresponding to FIG. 26 shows an operation table representing a relationship between a plurality of speed steps (i.e., first to eighth forward speed steps "$1^{st}$" through "$8^{th}$", and a reverse speed step "Rev"), and respective operations of engaging elements (i.e., first to fourth clutches C1 through C4, and first and second brakes B1, B2) and respective speed ratios of those speed steps. The vehicle automatic transmission 160 is readable on claims 1, 2, 3, 4, 7, 14, 19, and 20. This transmission 160 differs from the transmission 112 shown in FIGS. 25 to 27, with respect to a construction of a second transmission portion 162. More specifically described, the second transmission portion 162 has substantially the same construction as that of the second transmission portion 52 in the fifth embodiment shown in FIGS. 9A, 9B, and 10. The second transmission portion 162 is essentially constituted by a first planetary gear set 164 of single-pinion type, a second planetary gear set 166 of double-pinion type, and a third planetary gear set 168 of single-pinion type. A sun gear S1 of the first planetary gear set 164 and a sun gear S2 of the second planetary gear set 166 are connected to each other to provide a first rotary element RM1; a ring gear R3 of the third planetary gear set 168 provides a second rotary element RM2; a ring gear R2 of the second planetary gear set 166 and a carrier CA3 of the third planetary gear set 168 are connected to each other to provide a third rotary element RM3; a carrier CA1 of the first planetary gear set 164, a carrier CA2 of the second planetary gear set 166, and a sun gear S3 of the third planetary gear set 168 are connected to each other to provide a fourth rotary element RM4; and a ring gear R1 of the first planetary gear set 164 provides a fifth rotary element RM5. In the seventeenth transmission portion 162, there are some members each of which is shared by two planetary gear sets, like in Ravigneaux-type one. For example, the respective carriers CA1, CA2 of the first and second planetary gear sets 164, 166 are constituted by a common member; the sun gears S1, S2 of the same 164, 166 are constituted by a common member; and pinion gears of the first planetary gear set 164 function as first pinion gears of the second planetary gear set 166. The first to fourth clutches C1, C2, C3, C4 and first and second brakes B1, B2 of the transmission 160 selectively connect the first to third and fifth rotary elements RM1 to RM3, RM5 to a counter gear 124b of a first power transmitter 124, i.e., a first intermediate output path, a counter gear 126b of a second power transmitter 126, i.e., a second intermediate output path, and a transmission case 134, in the same manner as the manner in that the first to fourth clutches C1 to C4 and first and second brakes B1, B2 of the transmission 112, shown in FIGS. 25 to 27, selectively connect the first to third and fifth rotary elements RM1 to RM3, RM5 to the first and second intermediate output paths and the transmission case 134, and the fourth rotary element RM4 of the transmission 160 is integrally connected to an output gear 136, like in the transmission 112. The first planetary gear set 164 provides a 2-1 planetary gear set; the second planetary gear set 166 provides a 2-2 planetary gear set; and the third planetary gear set 168 provides a 2-3 planetary gear set.

In the transmission 160, the eight forward speed steps, i.e., the first to eighth speed steps "$1^{st}$" to "$8^{th}$", and the reverse speed step "Rev" are established according to the operation table shown in FIG. 36 that is identical with the operation table shown in FIG. 26. Respective speed ratios of those speed steps are determined by the first and second speed ratios γ1, γ2 of the first transmission portion 120 and the respective gear ratios ρ1, ρ2, ρ3 of the first, second, and third planetary gear sets 164, 166, 168. For example, in the case where speed ratio γ1=1.0, speed ratio γ2=1.802, gear ratio ρ1=0.392, gear ratio ρ2=0.310, and gear ratio ρ3=0.329, the speed ratios shown in FIG. 36 that are identical with the speed ratios shown in FIG. 26, and a collinear chart shown in FIG. 37 that is identical with the collinear chart shown in FIG. 27 are obtained. Thus, the transmission 160 can enjoy the same advantages as those of the thirteenth embodiment shown in FIGS. 25 to 27.

Figures 38, 39:
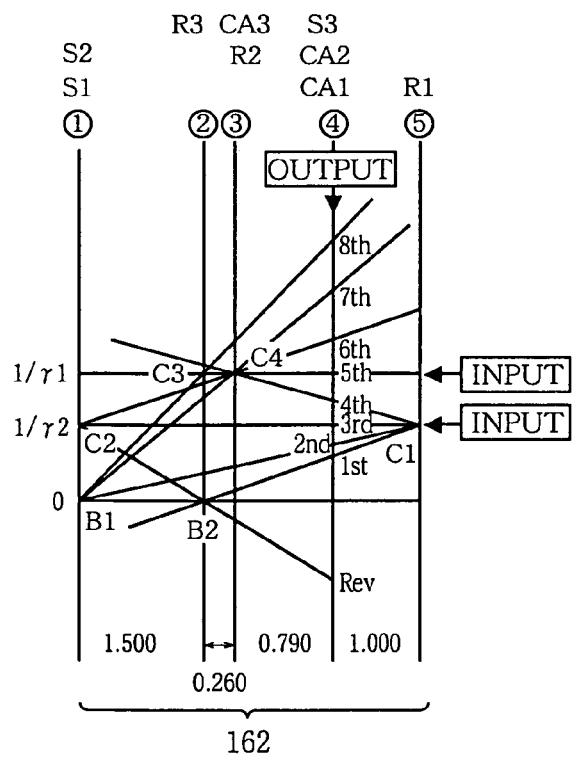
FIG. 38 is an operation table corresponding to FIG. 36, for another vehicle automatic transmission as an eighteenth embodiment of the present invention, in which the combination of respective operating states of engaging elements to establish a fourth speed step differs from that of the operation table of FIG. 36.
FIG. 39 is a collinear chart corresponding to FIG. 37, for the transmission as the eighteenth embodiment.

In the seventeenth embodiment shown in FIGS. 35 to 37, when the first clutch C1 and the third clutch C3 are engaged, the fourth forward speed step "$4^{th}$" is established. However, in an eighteenth embodiment shown in FIGS. 38 and 39, when the first clutch C1 and the fourth clutch C4 are engaged (indicated at symbols "○" in FIG. 38), the fifth rotary element RM5 is rotated at the speed 1/γ2 via the second power transmitter 126, and the third rotary element RM3 is rotated at the speed 1/γ1 via the first power transmitter 124, while the fourth rotary element RM4 is rotated at a speed indicated at "$4^{th}$" (FIG. 39), so as to establish a fourth forward speed step "$4^{th}$" (FIG. 38). Since the speed ratio of the fourth speed step "$4^{th}$" just a little differs from that shown in FIG. 36, the eighteenth embodiment can enjoy the same advantages as those of the seventeenth embodiment shown in FIGS. 35 to 37.

Figure 40:
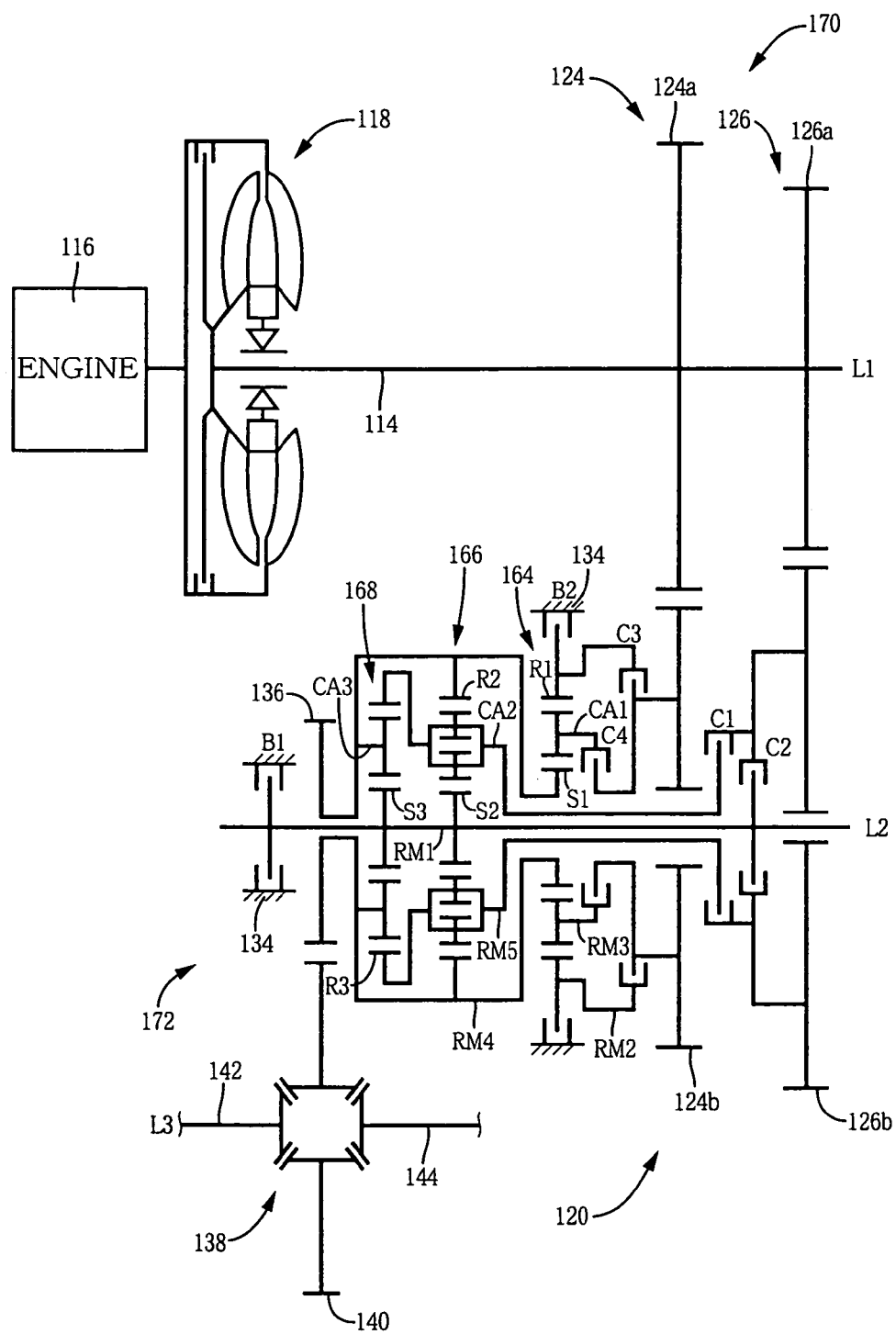
FIG. 40 is a schematic view corresponding to FIG. 25, showing another vehicle drive apparatus including another vehicle automatic transmission of counter-gear type according to a nineteenth embodiment of the present invention, in which a second transmission portion differs from that in the thirteenth embodiment shown in FIG. 25.
Figures 41, 42:
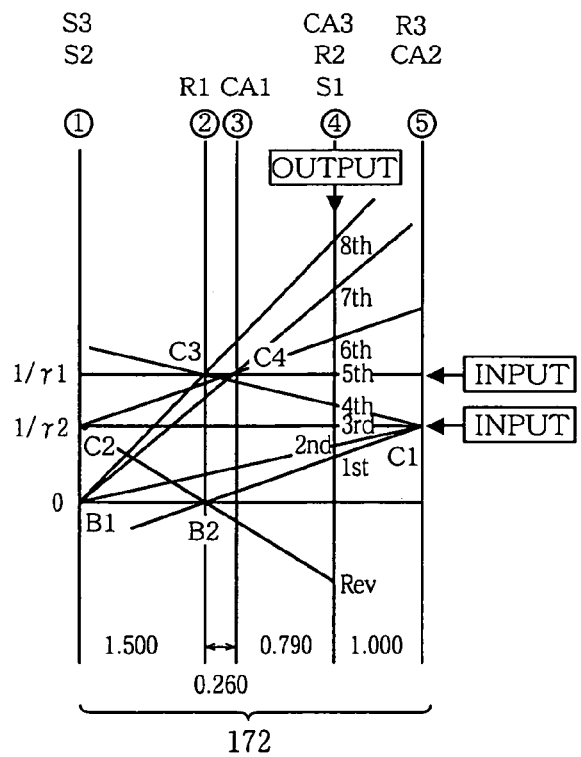
FIG. 41 is an operation table corresponding to FIG. 26, for the transmission of FIG. 40.
FIG. 42 is a collinear chart corresponding to FIG. 27, for the transmission of FIG. 40.

FIG. 40 corresponding to FIG. 25 schematically shows another vehicle automatic transmission 170 as a ninteenth embodiment of the vehicle multiple-step transmission according to the present invention; and FIG. 41 corresponding to FIG. 26 shows an operation table representing a relationship between a plurality of speed steps (i.e., first to eighth forward speed steps "$1^{st}$" through "$8^{th}$", and a reverse speed step "Rev"), and respective operations of engaging elements (i.e., first to fourth clutches C1 through C4, and first and second brakes B1, B2) and respective speed ratios of those speed steps. The vehicle automatic transmission 170 is readable on claims 1, 2, 3, 4, 8, 15, 19, and 20. This transmission 170 differs from the transmission 160 shown in FIGS. 35 to 37, with respect to a construction of a second transmission portion 172. More specifically described, the second transmission portion 172 has substantially the same construction as that of the second transmission portion 62 in the seventh embodiment shown in FIGS. 13A, 13B, and 14. A sun gear S1 of the second planetary gear set 166 and a sun gear S3 of the third planetary gear set 168 are connected to each other to provide a first rotary element RM1; a ring gear R1 of the first planetary gear set 164 provides a second rotary element RM2; a carrier CA1 of the first planetary gear set 164 provides a third rotary element RM3; a sun gear S1 of the first planetary gear set 164, a ring gear R2 of the second planetary gear set 166, and a carrier CA3 of the third planetary gear set 168 are connected to each other to provide a fourth rotary element RM4; and a carrier CA2 of the second planetary gear set 166 and a ring gear R3 of the third planetary gear set 168 are connected to each other to provide a fifth rotary element RM5. The first to fourth clutches C1, C2, C3, C4 and first and second brakes B1, B2 of the transmission 170 selectively connect the first to third and fifth rotary elements RM1 to RM3, RM5 to a counter gear 124b of a first power transmitter 124, i.e., a first intermediate output path, a counter gear 126b of a second power transmitter 126, i.e., a second intermediate output path, and a transmission case 134, in the same manner as the manner in that the first to fourth clutches C1 to C4 and first and second brakes B1, B2 of the transmission 112, shown in FIGS. 25 to 27, selectively connect the first to third and fifth rotary elements RM1 to RM3, RM5 to the first and second intermediate output paths and the transmission case 134, and the fourth rotary element RM4 of the transmission 170 is integrally connected to an output gear 136, like in the transmission 112.

In the transmission 170, the eight forward speed steps, i.e., the first to eighth speed steps "$1^{st}$" to "$8^{th}$", and the reverse speed step "Rev" are established according to the operation table shown in FIG. 41 that is identical with the operation table shown in FIG. 26. Respective speed ratios of those speed steps are determined by the first and second speed ratios γ1, γ2 of the first transmission portion 120 and the respective gear ratios ρ1, ρ2, ρ3 of the first, second, and third planetary gear sets 164, 166, 168. For example, in the case where speed ratio γ1=1.0, speed ratio γ2=1.802, gear ratio ρ1=0.329, gear ratio ρ2=0.282, and gear ratio ρ3=0.392, the speed ratios shown in FIG. 41 that are identical with the speed ratios shown in FIG. 26, and a collinear chart shown in FIG. 42 that is identical with the collinear chart shown in FIG. 27 are obtained. Thus, the transmission 170 can enjoy the same advantages as those of the thirteenth embodiment shown in FIGS. 25 to 27.

Figures 43, 44:
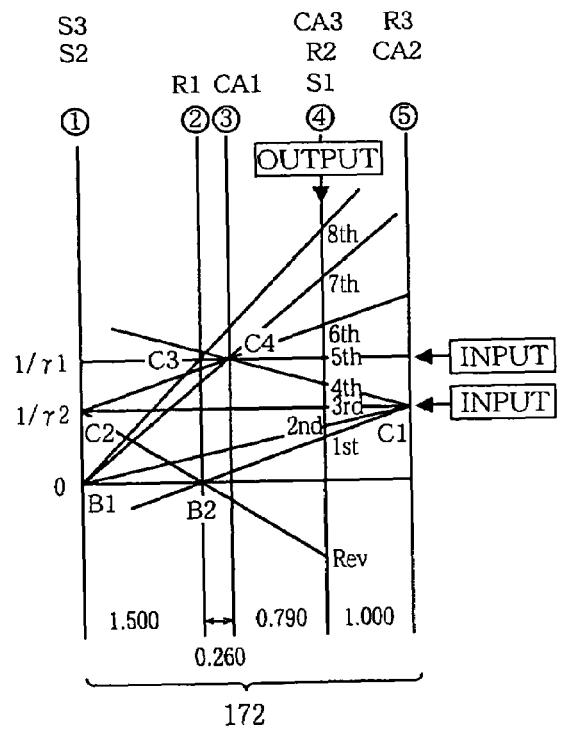
FIG. 43 is an operation table corresponding to FIG. 41, for another vehicle automatic transmission as a twentieth embodiment of the present invention, in which the combination of respective operating states of engaging elements to establish a fourth speed step differs from that of the operation table of FIG. 41.
FIG. 44 is a collinear chart corresponding to FIG. 42, for the transmission as the twentieth embodiment.

In the nineteenth embodiment shown in FIGS. 40 to 42, when the first clutch C1 and the third clutch C3 are engaged, the fourth forward speed step "$4^{th}$" is established. However, in a twentieth embodiment shown in FIGS. 43 and 44, when the first clutch C1 and the fourth clutch C4 are engaged (indicated at symbols "○" in FIG. 43), the fifth rotary element RM5 is rotated at the speed 1/γ2 via the second power transmitter 126, and the third rotary element RM3 is rotated at the speed 1/γ1 via the first power transmitter 124, while the fourth rotary element RM4 is rotated at a speed indicated at "$4^{th}$" (FIG. 44), so as to establish a fourth forward speed step "$4^{th}$" (FIG. 43). Since the speed ratio of the fourth speed step "$4^{th}$" just a little differs from that shown in FIG. 41, the twentieth embodiment can enjoy the same advantages as those of the nineteenth embodiment shown in FIGS. 40 to 42.

Figure 45:
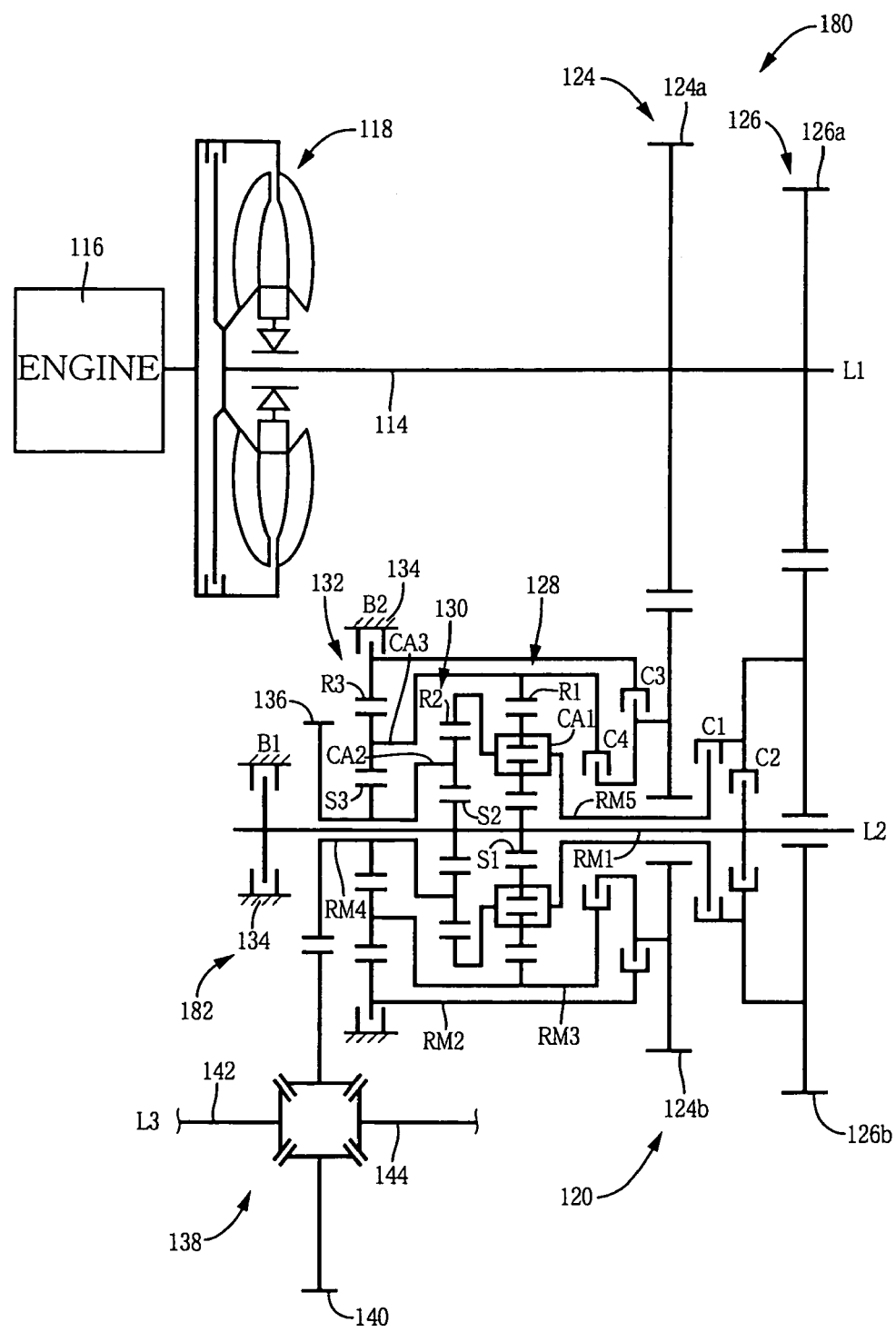
FIG. 45 is a schematic view corresponding to FIG. 25, showing another vehicle drive apparatus including another vehicle automatic transmission of counter-gear type according to a twenty-first embodiment of the present invention, in which a second transmission portion differs from that in the thirteenth embodiment shown in FIG. 25.
Figures 46, 47:
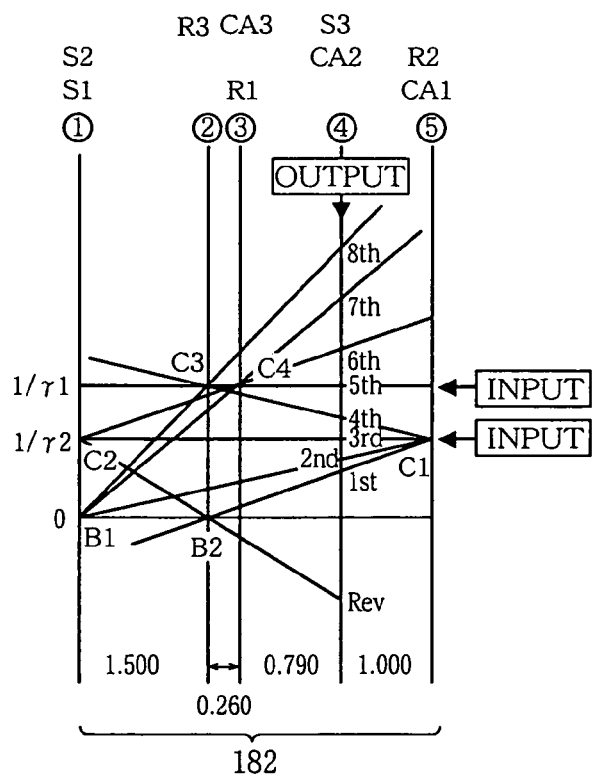
FIG. 46 is an operation table corresponding to FIG. 26, for the transmission of FIG. 45.
FIG. 47 is a collinear chart corresponding to FIG. 27, for the transmission of FIG. 45.

FIG. 45 corresponding to FIG. 25 schematically shows another vehicle automatic transmission 180 as a twenty-first embodiment of the vehicle multiple-step transmission according to the present invention; and FIG. 46 corresponding to FIG. 26 shows an operation table representing a relationship between a plurality of speed steps (i.e., first to eighth forward speed steps "$1^{st}$" through "$8^{th}$", and a reverse speed step "Rev"), and respective operations of engaging elements (i.e., first to fourth clutches C1 through C4, and first and second brakes B1, B2) and respective speed ratios of those speed steps. The vehicle automatic transmission 180 is readable on claims 1, 2, 3, 4, 9, 16, 19, and 20. This transmission 180 differs from the transmission 112 shown in FIGS. 25 to 27, with respect to a construction of a second transmission portion 182. More specifically described, the second transmission portion 182 has substantially the same construction as that of the second transmission portion 72 in the ninth embodiment shown in FIGS. 17A, 17B, and 18. A sun gear S1 of the first planetary gear set 128 and a sun gear S2 of the second planetary gear set 130 are connected to each other to provide a first rotary element RM1; a ring gear R3 of the third planetary gear set 132 provides a second rotary element RM2; a ring gear R1 of the first planetary gear set 128 and a carrier CA3 of the third planetary gear set 132 are connected to each other to provide a third rotary element RM3; a carrier CA2 of the second planetary gear set 130 and a sun gear S3 of the third planetary gear set 132 are connected to each other to provide a fourth rotary element RM4; and a carrier CA1 of the first planetary gear set 128 and a ring gear R2 of the second planetary gear set 130 are connected to each other to provide a fifth rotary element RM5. The first to fourth clutches C1, C2, C3, C4 and first and second brakes B1, B2 of the transmission 180 selectively connect the first to third and fifth rotary elements RM1 to RM3, RM5 to a counter gear 124$b$ of a first power transmitter 124, i.e., a first intermediate output path, a counter gear 126$b$ of a second power transmitter 126, i.e., a second intermediate output path, and a transmission case 134, in the same manner as the manner in that the first to fourth clutches C1 to C4 and first and second brakes B1, B2 of the transmission 112, shown in FIGS. 25 to 27, selectively connect the first to third and fifth rotary elements RM1 to RM3, RM5 to the first and second intermediate output paths and the transmission case 134, and the fourth rotary element RM4 of the transmission 180 is integrally connected to an output gear 136, like in the transmission 112.

In the transmission 180, the eight forward speed steps, i.e., the first to eighth speed steps "1$^{st}$" to "8$^{th}$", and the reverse speed step "Rev" are established according to the operation table shown in FIG. 46 that is identical with the operation table shown in FIG. 26. Respective speed ratios of those speed steps are determined by the first and second speed ratios γ1, γ2 of the first transmission portion 120 and the respective gear ratios ρ1, ρ2, ρ3 of the first, second, and third planetary gear sets 128, 130, 132. For example, in the case where speed ratio γ1=1.0, speed ratio γ2=1.802, gear ratio ρ1=0.504, gear ratio ρ2=0.392, and gear ratio ρ3=0.329, the speed ratios shown in FIG. 46 that are identical with the speed ratios shown in FIG. 26, and a collinear chart shown in FIG. 47 that is identical with the collinear chart shown in FIG. 27 are obtained. Thus, the transmission 180 can enjoy the same advantages as those of the thirteenth embodiment shown in FIGS. 25 to 27.

Figures 48, 49:
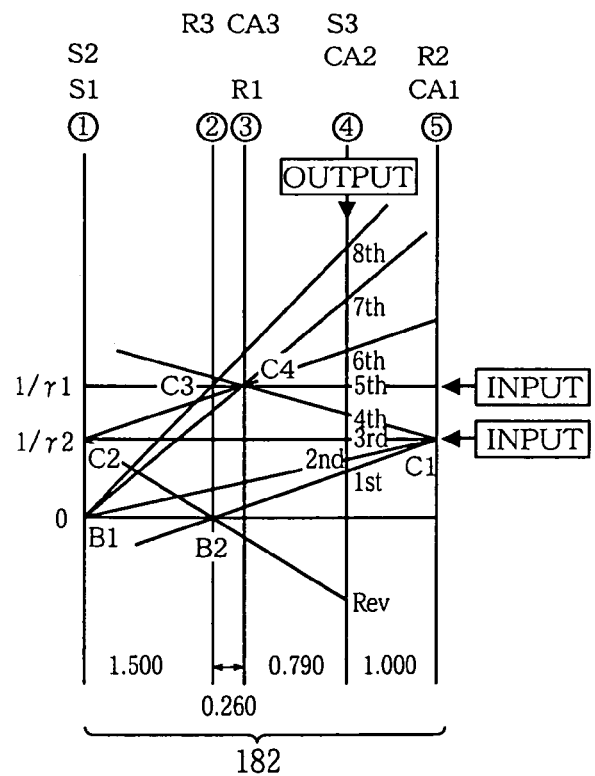
FIG. 48 is an operation table corresponding to FIG. 46, for another vehicle automatic transmission as a twenty-second embodiment of the present invention, in which the combination of respective operating states of engaging elements to establish a fourth speed step differs from that of the operation table of FIG. 46.
FIG. 49 is a collinear chart corresponding to FIG. 47, for the transmission as the twenty-second embodiment.

In the twenty-first embodiment shown in FIGS. 45 to 47, when the first clutch C1 and the third clutch C3 are engaged, the fourth forward speed step "4$^{th}$" is established. However, in a twenty-second embodiment shown in FIGS. 48 and 49, when the first clutch C1 and the fourth clutch C4 are engaged (indicated at symbols "○" in FIG. 48), the fifth rotary element RM5 is rotated at the speed 1/γ2 via the second power transmitter 126, and the third rotary element RM3 is rotated at the speed 1/γ1 via the first power transmitter 124, while the fourth rotary element RM4 is rotated at a speed indicated at "4$^{th}$" (FIG. 49), so as to establish a fourth forward speed step "4$^{th}$" (FIG. 48). Since the speed ratio of the fourth speed step "4$^{th}$" just a little differs from that shown in FIG. 46, the twenty-second embodiment can enjoy the same advantages as those of the twenty-first embodiment shown in FIGS. 45 to 47.

Figure 50:
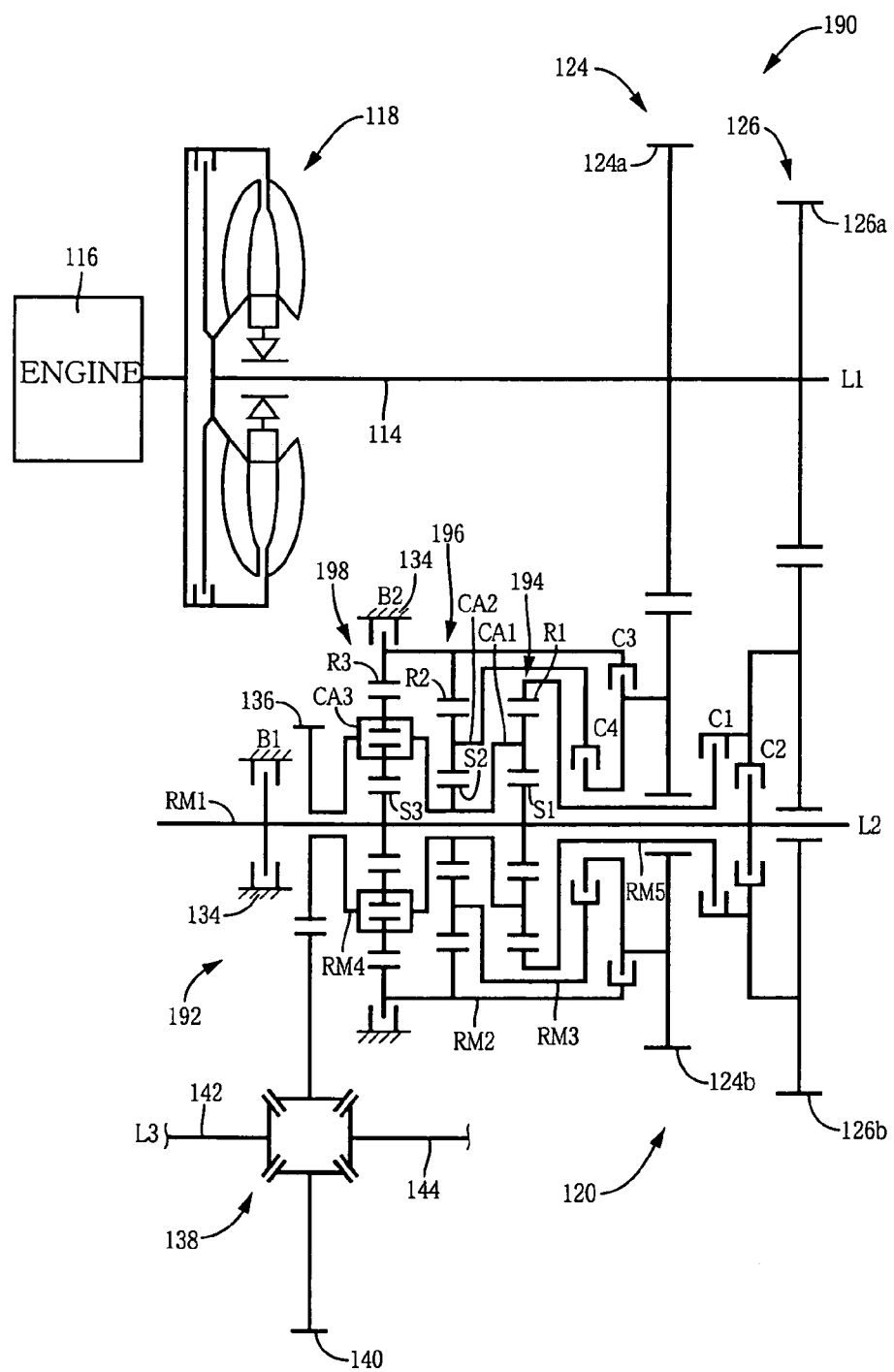
FIG. 50 is a schematic view corresponding to FIG. 25, showing another vehicle drive apparatus including another vehicle automatic transmission of counter-gear type according to a twenty-third embodiment of the present invention, in which a second transmission portion differs from that in the thirteenth embodiment shown in FIG. 25.
Figures 51, 52:
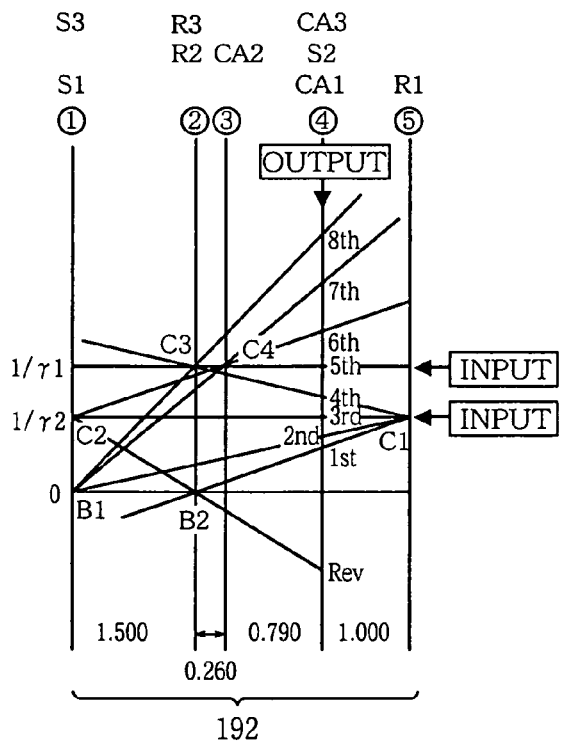
FIG. 51 is an operation table corresponding to FIG. 26, for the transmission of FIG. 50.
FIG. 52 is a collinear chart corresponding to FIG. 27, for the transmission of FIG. 50.

FIG. 50 corresponding to FIG. 25 schematically shows another vehicle automatic transmission 190 as a twenty-third embodiment of the vehicle multiple-step transmission according to the present invention; and FIG. 51 corresponding to FIG. 26 shows an operation table representing a relationship between a plurality of speed steps (i.e., first to eighth forward speed steps "1$^{st}$" through "8$^{th}$", and a reverse speed step "Rev"), and respective operations of engaging elements (i.e., first to fourth clutches C1 through C4, and first and second brakes B1, B2) and respective speed ratios of those speed steps. The vehicle automatic transmission 190 is readable on claims 1, 2, 3, 4, 10, 17, 19, and 20. This transmission 190 differs from the transmission 112 shown in FIGS. 25 to 27, with respect to a construction of a second transmission portion 192. More specifically described, the second transmission portion 192 has substantially the same construction as that of the second transmission portion 82 in the eleventh embodiment shown in FIGS. 21A, 21B, and 22, and is essentially constituted by a first planetary gear set 194 of single-pinion type, a second planetary gear set 196 of single-pinion type, and a third planetary gear set 198 of double-pinion type. A sun gear S1 of the first planetary gear set 194 and a sun gear S3 of the third planetary gear set 198 are connected to each other to provide a first rotary element RM1; a ring gear R2 of the second planetary gear set 196 and a ring gear R3 of the third planetary gear set 198 are connected to each other to provide a second rotary element RM2; a carrier CA2 of the second planetary gear set 196 provides a third rotary element RM3; a carrier CA1 of the first planetary gear set 194, a sun gear S2 of the second planetary gear set 196, and a carrier CA3 of the third planetary gear set 198 are connected to each other to provide a fourth rotary element RM4; and a ring gear R1 of the first planetary gear set 194 provides a fifth rotary element RM5. The first to fourth clutches C1, C2, C3, C4 and first and second brakes B1, B2 of the transmission 190 selectively connect the first to third and fifth rotary elements RM1 to RM3, RM5 to a counter gear 124$b$ of a first power transmitter 124, i.e., a first intermediate output path, a counter gear 126$b$ of a second power transmitter 126, i.e., a second intermediate output path, and a transmission case 134, in the same manner as the manner in that the first to fourth clutches C1 to C4 and first and second brakes B1, B2 of the transmission 112, shown in FIGS. 25 to 27, selectively connect the first to third and fifth rotary elements RM1 to RM3, RM5 to the first and second intermediate output paths and the transmission case 134, and the fourth rotary element RM4 of the transmission 180 is integrally connected to an output gear 136, like in the transmission 112. The first planetary gear set 194 provides a 2-1 planetary gear set; the second planetary gear set 196 provides a 2-2 planetary gear set; and the third planetary gear set 198 provides a 2-3 planetary gear set.

In the transmission 190, the eight forward speed steps, i.e., the first to eighth speed steps "1$^{st}$" to "8$^{th}$", and the reverse speed step "Rev" are established according to the operation table shown in FIG. 51 that is identical with the operation table shown in FIG. 26. Respective speed ratios of those speed steps are determined by the first and second speed ratios γ1, γ2 of the first transmission portion 120 and the respective gear ratios ρ1, ρ2, ρ3 of the first, second, and third planetary gear sets 194, 196, 198. For example, in the case where speed ratio γ1=1.0, speed ratio γ2=1.802, gear ratio ρ1=0.392, gear ratio ρ2=0.329, and gear ratio ρ3=0.412, the speed ratios shown in FIG. 51 that are identical with the speed ratios shown in FIG. 26, and a collinear chart shown in FIG. 52 that is identical with the collinear chart shown in FIG. 27 are obtained. Thus, the transmission 190 can enjoy the same advantages as those of the thirteenth embodiment shown in FIGS. 25 to 27.

Figures 53, 54:
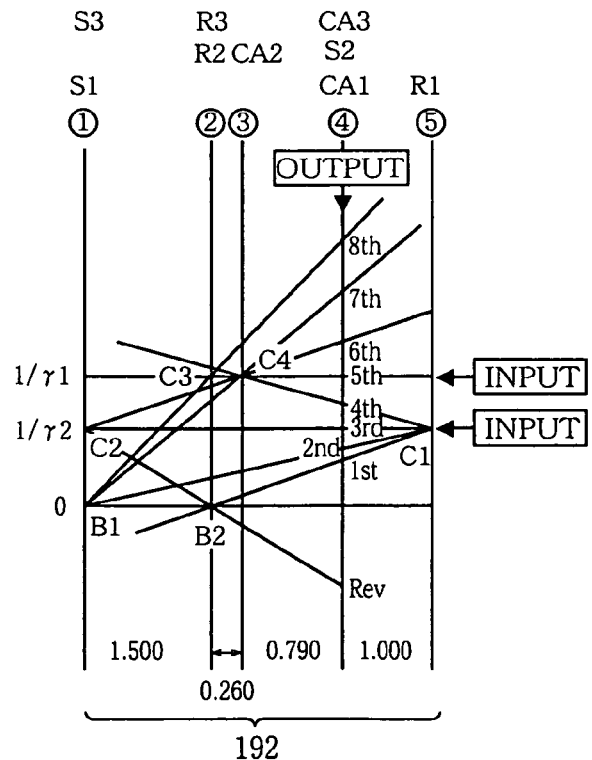
FIG. 53 is an operation table corresponding to FIG. 51, for another vehicle automatic transmission as a twenty-fourth embodiment of the present invention, in which the combination of respective operating states of engaging elements to establish a fourth speed step differs from that of the operation table of FIG. 51.
FIG. 54 is a collinear chart corresponding to FIG. 52, for the transmission as the twenty-fourth embodiment.

In the twenty-third embodiment shown in FIGS. 50 to 52, when the first clutch C1 and the third clutch C3 are engaged, the fourth forward speed step "$4^{th}$" is established. However, in a twenty-fourth embodiment shown in FIGS. 53 and 54, when the first clutch C1 and the fourth clutch C4 are engaged (indicated at symbols "○" in FIG. 53), the fifth rotary element RM5 is rotated at the speed $1/\gamma2$ via the second power transmitter 126, and the third rotary element RM3 is rotated at the speed $1/\gamma1$ via the first power transmitter 124, while the fourth rotary element RM4 is rotated at a speed indicated at "$4^{th}$" (FIG. 54), so as to establish a fourth forward speed step "$4^{th}$" (FIG. 53). Since the speed ratio of the fourth speed step "$4^{th}$" just a little differs from that shown in FIG. 51, the twenty-fourth embodiment can enjoy the same advantages as those of the twenty-third embodiment shown in FIGS. 50 to 52.

Figure 55:
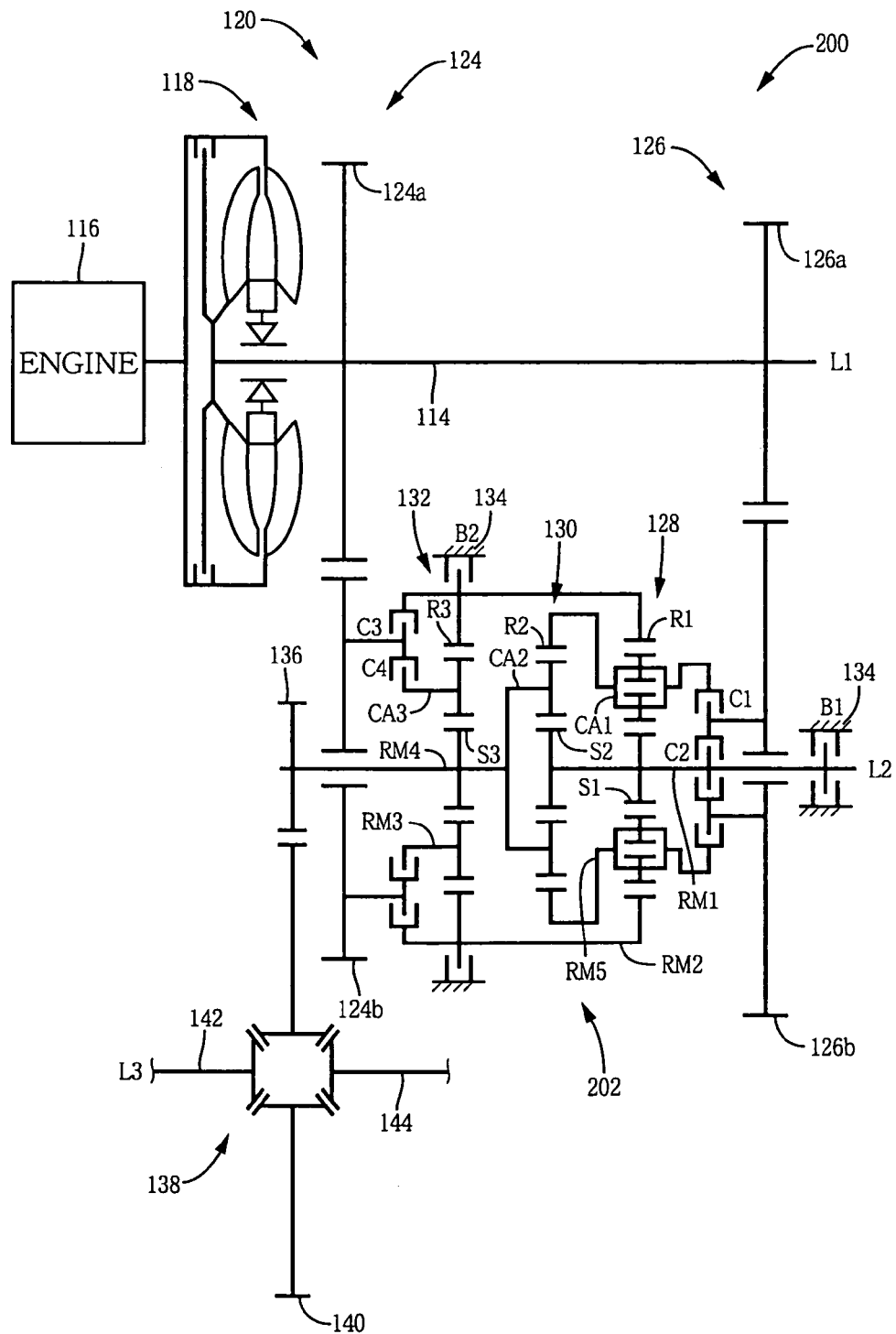
FIG. 55 is a schematic view corresponding to FIG. 25, showing another vehicle drive apparatus including another vehicle automatic transmission of counter-gear type according to a twenty-fifth embodiment of the present invention, in which a second transmission portion differs from that in the thirteenth embodiment shown in FIG. 25.
Figures 56, 57:
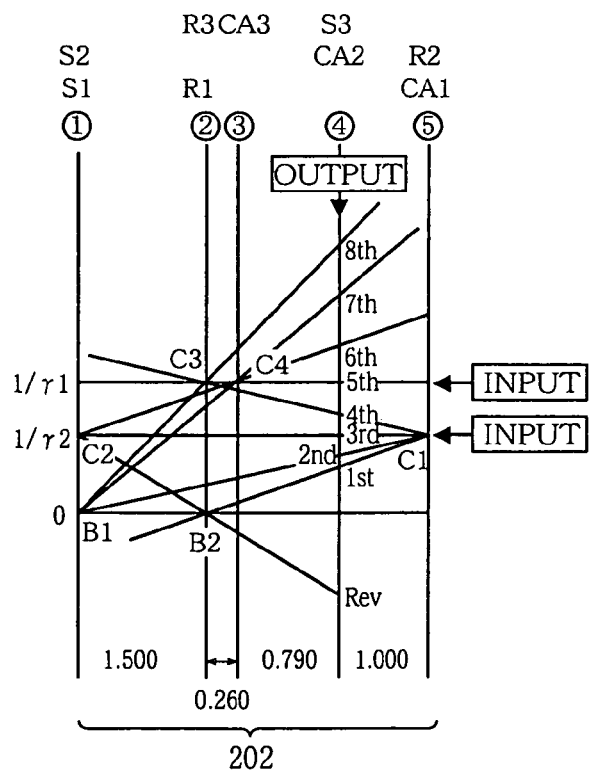
FIG. 56 is an operation table corresponding to FIG. 26, for the transmission of FIG. 55.
FIG. 57 is a collinear chart corresponding to FIG. 27, for the transmission of FIG. 55.

FIG. 55 corresponding to FIG. 25 schematically shows another vehicle automatic transmission 200 as a twenty-fifth embodiment of the vehicle multiple-step transmission according to the present invention; and FIG. 56 corresponding to FIG. 26 shows an operation table representing a relationship between a plurality of speed steps (i.e., first to eighth forward speed steps "$1^{st}$" through "$8^{th}$", and a reverse speed step "Rev"), and respective operations of engaging elements (i.e., first to fourth clutches C1 through C4, and first and second brakes B1, B2) and respective speed ratios of those speed steps. The vehicle automatic transmission 200 is readable on claims 1, 2, 3, 4, 11, 18, 19, and 20. This transmission 200 differs from the transmission 112 shown in FIGS. 25 to 27, with respect to a construction of a second transmission portion 202. More specifically described, a sun gear S1 of the first planetary gear set 128 and a sun gear S2 of the second planetary gear set 130 are connected to each other to provide a first rotary element RM1; a ring gear R1 of the first planetary gear set 128 and a ring gear R3 of the third planetary gear set 132 are connected to each other to provide a second rotary element RM2; a carrier CA3 of the third planetary gear set 132 provides a third rotary element RM3; a carrier CA2 of the second planetary gear set 130 and a sun gear S3 of the third planetary gear set 132 are connected to each other to provide a fourth rotary element RM4; and a carrier CA1 of the first planetary gear set 128 and a ring gear R2 of the second planetary gear set 130 are connected to each other to provide a fifth rotary element RM5. The first to fourth clutches C1, C2, C3, C4 and first and second brakes B1, B2 of the transmission 200 selectively connect the first to third and fifth rotary elements RM1 to RM3, RM5 to a counter gear 124b of a first power transmitter 124, i.e., a first intermediate output path, a counter gear 126b of a second power transmitter 126, i.e., a second intermediate output path, and a transmission case 134, in the same manner as the manner in that the first to fourth clutches C1 to C4 and first and second brakes B1, B2 of the transmission 112, shown in FIGS. 25 to 27, selectively connect the first to third and fifth rotary elements RM1 to RM3, RM5 to the first and second intermediate output paths and the transmission case 134, and the fourth rotary element RM4 of the transmission 200 is integrally connected to an output gear 136, like in the transmission 112. However, in the present embodiment, the first and second power transmitters 124, 126 are spaced from each other in an axial direction parallel to two axis lines L1, L2, and the second transmission portion 202 is provided between the two power transmitters 124, 126.

In the transmission 200, the eight forward speed steps, i.e., the first to eighth speed steps "$1^{st}$" to "$8^{th}$", and the reverse speed step "Rev" are established according to the operation table shown in FIG. 56 that is identical with the operation table shown in FIG. 26. Respective speed ratios of those speed steps are determined by the first and second speed ratios $\gamma1$, $\gamma2$ of the first transmission portion 120 and the respective gear ratios $\rho1$, $\rho2$, $\rho3$ of the first, second, and third planetary gear sets 128, 130, 132. For example, in the case where speed ratio $\gamma1$=1.0, speed ratio $\gamma2$=1.802, gear ratio $\rho1$=0.577, gear ratio $\rho2$=0.392, and gear ratio $\rho3$=0.329, the speed ratios shown in FIG. 56 that are identical with the speed ratios shown in FIG. 26, and a collinear chart shown in FIG. 57 that is identical with the collinear chart shown in FIG. 27 are obtained. Thus, the transmission 200 can enjoy the same advantages as those of the thirteenth embodiment shown in FIGS. 25 to 27.

Figures 58, 59:
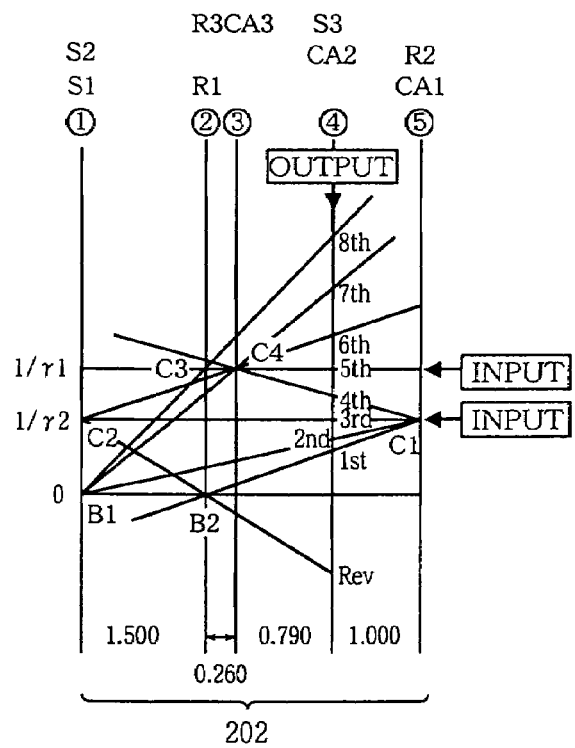
FIG. 58 is an operation table corresponding to FIG. 56, for another vehicle automatic transmission as a twenty-sixth embodiment of the present invention, in which the combination of respective operating states of engaging elements to establish a fourth speed step differs from that of the operation table of FIG. 56.
FIG. 59 is a collinear chart corresponding to FIG. 57, for the automatic transmission as the twenty-sixth embodiment.

In the twenty-fifth embodiment shown in FIGS. 55 to 57, when the first clutch C1 and the third clutch C3 are engaged, the fourth forward speed step "$4^{th}$" is established. However, in a twenty-sixth embodiment shown in FIGS. 58 and 59, when the first clutch C1 and the fourth clutch C4 are engaged (indicated at symbols "○" in FIG. 58), the fifth rotary element RM5 is rotated at the speed $1/\gamma2$ via the second power transmitter 126, and the third rotary element RM3 is rotated at the speed $1/\gamma1$ via the first power transmitter 124, while the fourth rotary element RM4 is rotated at a speed indicated at "$4^{th}$" (FIG. 59), so as to establish a fourth forward speed step "$4^{th}$" (FIG. 58). Since the speed ratio of the fourth speed step "$4^{th}$" just a little differs from that shown in FIG. 56, the twenty-sixth embodiment can enjoy the same advantages as those of the twenty-fifth embodiment shown in FIGS. 55 to 57.

Figure 60:
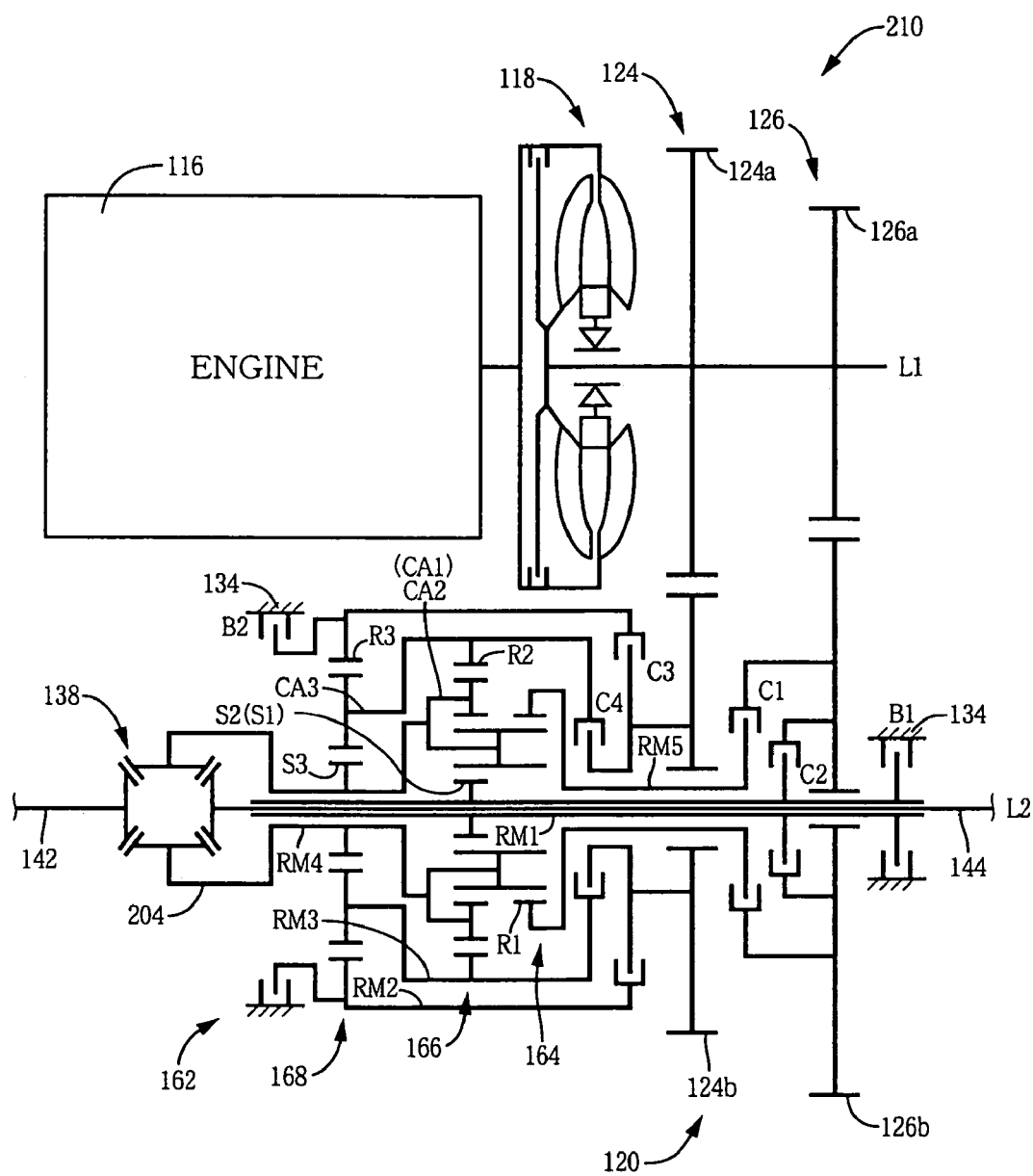
FIG. 60 is a schematic view corresponding to FIG. 35, showing another vehicle drive apparatus including another vehicle automatic transmission as a twenty-seventh embodiment of the present invention, in which the vehicle drive apparatus is provided along two axis lines.

FIG. 60 shows another vehicle drive apparatus including another vehicle automatic transmission 210 as a twenty-seventh embodiment of the vehicle multiple-step transmission according to the present invention. The present vehicle drive apparatus differs from the vehicle drive apparatus, shown in FIG. 35, including the vehicle automatic transmission 160, in that as shown in FIG. 60 a differential gear unit 138 is provided on a second axis line L2 and is located on one of opposite sides of a second transmission portion 162 of the vehicle automatic transmission 210 that is opposite to the other side on which a first transmission portion 120 of the same 210 is located. Thus, the differential gear unit 138 is located on the side of an engine 116, with respect to the second transmission portion 162, and adjacent the same 162. A fourth rotary element RM4 (i.e., carriers CA1, CA2 and a sun gear S3) of the second transmission portion 162 is connected to a differential case 204 of the differential gear unit 138, and one 144 of two axle shafts 142, 144 extends through a central portion of the second transmission portion 162, and additionally through respective central portions of respective counter gears 124b, 126b of first and second power transmitters 124, 126, so as to project outward from the counter gear 126b. The differential case 204 provides an output member.

In the present embodiment, though the dimension of the vehicle drive apparatus in the axial direction thereof is increased, the drive apparatus as a whole, including the transmission 210, can be provided along the two axis lines L1, L2. Thus, the overall size of the drive apparatus can be decreased, and the drive apparatus can be more easily mounted on the vehicle.

The twenty-seventh embodiment shown in FIG. 60 is obtained by modifying the seventeenth embodiment shown in FIG. 35 so as to be provided along the two axis lines L1, L2. Likewise, each of the embodiments shown in FIGS. 30, 40, 45, 50, and 55 may be so modified as to be provided along the two axis lines L1, L2, such that the differential gear unit 138 is located on the second axis line L2.

In each of the illustrated embodiments, the eight forward speed steps are established. However, each of the illustrated embodiments may be modified such that seven forward speed steps, such as first to seventh speed steps "$1^{st}$" to "$7^{th}$" (shown in each of the operation tables), second to eighth speed steps "$2^{nd}$" to "$8^{th}$", or first to sixth speed steps "$1^{st}$" to "$6^{th}$" plus eighth speed step "$8^{st}$", are established.

It is to be understood that the present invention may be embodied with various other changes, modifications and improvements, which may occur to those skilled in the art, in the light of the technical teachings of the present invention which have been described.

What is claimed is:

1. A multiple-step transmission, comprising:
a first transmission portion including
a first intermediate output path which transmits, at a first speed ratio, an input rotary motion of an input member, and
a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and
a second transmission portion including
a 2-1 planetary gear set, a 2-2 planetary gear set, and a 2-3 planetary gear set each of which includes a sun gear, a carrier, and a ring gear, the 2-1 planetary gear set, the 2-2 planetary gear set, and the 2-3 planetary gear set being partly connected to each other so as to provide a first rotary element, a second rotary element, a third rotary element, a fourth rotary element, and a fifth rotary element,
a first brake which selectively stops a rotary motion of the first rotary element,
a second brake which selectively stops a rotary motion of the second rotary element,
a first clutch which selectively connects the fifth rotary element to the second intermediate output path of the first transmission portion,
a second clutch which selectively connects the first rotary element to the second intermediate output path,
a third clutch which selectively connects the second rotary element to the first intermediate output path of the first transmission portion, and
a fourth clutch which selectively connects the third rotary element to the first intermediate output path,
the fourth rotary element being connected to an output member so as to provide an output rotary motion,
each of the first and second brakes and the first, second, third, and fourth clutches being switched between an engaged state thereof and a disengaged state thereof, so as to provide the output rotary motion in each of a plurality of speed steps.

2. The multiple-step transmission according to claim 1, wherein said each of the first and second brakes and the first, second, third, and fourth clutches is switched between the engaged state thereof and the disengaged state thereof, so as to provide the output rotary motion in each of at least seven forward speed steps.

3. A multiple-step transmission, comprising:
a first transmission portion including
a first intermediate output path which transmits, at a first speed ratio, an input rotary motion of an input member, and
a second intermediate output path which transmits the input rotary motion of the input member at a second speed ratio greater than the first speed ratio, so that a rotational speed of the rotary motion transmitted by the second intermediate output path is lower than a rotational speed of the rotary motion transmitted by the first intermediate output path; and
a second transmission portion including
a 2-1 planetary gear set, a 2-2 planetary gear set, and a 2-3 planetary gear set each of which includes a sun gear, a carrier, and a ring gear, the 2-1 planetary gear set, the 2-2 planetary gear set, and the 2-3 planetary gear set being partly connected to each other so as to provide a first rotary element, a second rotary element, a third rotary element, a fourth rotary element, and a fifth rotary element,
a first brake which selectively stops a rotary motion of the first rotary element,
a second brake which selectively stops a rotary motion of the second rotary element,
a first clutch which selectively connects the fifth rotary element to the second intermediate output path of the first transmission portion,
a second clutch which selectively connects the first rotary element to the second intermediate output path,
a third clutch which selectively connects the second rotary element to the first intermediate output path of the first transmission portion, and
a fourth clutch which selectively connects the third rotary element to the first intermediate output path,
the fourth rotary element being connected to an output member so as to provide an output rotary motion in each of at least seven forward speed steps selected from the group consisting of a first forward speed step, a second forward speed step, a third forward speed step, a fourth forward speed step, a fifth forward speed step, a sixth forward speed step, a seventh forward speed step, and an eighth forward speed step,
the first clutch and the second brake being engaged to provide the output rotary motion in the first forward speed step having a first speed ratio as a greatest speed ratio,
the first clutch and the first brake being engaged to provide the output rotary motion in the second forward speed step having a second speed ratio smaller than the first speed ratio of the first forward speed step,
the first clutch and the second clutch being engaged to provide the output rotary motion in the third forward speed step having a third speed ratio smaller than the second speed ratio of the second forward speed step,
the first clutch and the third clutch being engaged to provide the output rotary motion in the fourth forward speed step having a fourth speed ratio smaller than the third speed ratio of the third forward speed step,
the third clutch and the fourth clutch being engaged to provide the output rotary motion in the fifth forward speed step having a fifth speed ratio smaller than the fourth speed ratio of the fourth forward speed step, the second clutch and the fourth clutch being engaged to provide the output rotary motion in the sixth forward speed step having a sixth speed ratio smaller than the fifth speed ratio of the fifth forward speed step, the fourth clutch and the first brake being engaged to provide the output rotary motion in the seventh forward speed step having a seventh speed ratio smaller than the sixth speed ratio of the sixth forward speed step, and the third clutch and the first brake being engaged to provide the output rotary motion in the eighth forward speed step having an eighth speed ratio smaller than the seventh speed ratio of the seventh forward speed step.

4. A multiple-step transmission, comprising:

a first transmission portion including a first intermediate output path which transmits, at a first speed ratio, an input rotary motion of an input member, and a second intermediate output path which transmits the input rotary motion of the input member at a second speed ratio greater than the first speed ratio, so that a rotational speed of the rotary motion transmitted by the second intermediate output path is lower than a rotational speed of the rotary motion transmitted by the first intermediate output path; and a second transmission portion including a 2-1 planetary gear set, a 2-2 planetary gear set, and a 2-3 planetary gear set each of which includes a sun gear, a carrier, and a ring gear, the 2-1 planetary gear set, the 2-2 planetary gear set, and the 2-3 planetary gear set being partly connected to each other so as to provide a first rotary element, a second rotary element, a third rotary element, a fourth rotary element, and a fifth rotary element, a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion in each of a first forward speed step, a second forward speed step, a third forward speed step, a fourth forward speed step, a fifth forward speed step, a sixth forward speed step, a seventh forward speed step, and an eighth forward speed step, the first clutch and the second brake being engaged to provide the output rotary motion in the first forward speed step having a first speed ratio as a greatest speed ratio, the first clutch and the first brake being engaged to provide the output rotary motion in the second forward speed step having a second speed ratio smaller than the first speed ratio of the first forward speed step, the first clutch and the second clutch being engaged to provide the output rotary motion in the third forward speed step having a third speed ratio smaller than the second speed ratio of the second forward speed step, the first clutch and the third clutch being engaged to provide the output rotary motion in the fourth forward speed step having a fourth speed ratio smaller than the third speed ratio of the third forward speed step, the third clutch and the fourth clutch being engaged to provide the output rotary motion in the fifth forward speed step having a fifth speed ratio smaller than the fourth speed ratio of the fourth forward speed step, the second clutch and the fourth clutch being engaged to provide the output rotary motion in the sixth forward speed step having a sixth speed ratio smaller than the fifth speed ratio of the fifth forward speed step, the fourth clutch and the first brake being engaged to provide the output rotary motion in the seventh forward speed step having a seventh speed ratio smaller than the sixth speed ratio of the sixth forward speed step, and the third clutch and the first brake being engaged to provide the output rotary motion in the eighth forward speed step having an eighth speed ratio smaller than the seventh speed ratio of the seventh forward speed step.

5. The multiple-step transmission according to claim 1, wherein the 2-1 planetary gear set comprises a double-pinion planetary gear set, the 2-2 planetary gear set comprises a single-pinion planetary gear set, and the 2-3 planetary gear set comprises a single-pinion planetary gear set, and wherein the first rotary element comprises the respective sun gears of the 2-1 and 2-3 planetary gear sets that are connected to each other; the second rotary element comprises the ring gear of the 2-2 planetary gear set; the third rotary element comprises the ring gear of the 2-1 planetary gear set, and the respective carriers of the 2-2 and 2-3 planetary gear sets, that are connected to each other; the fourth rotary element comprises the sun gear of the 2-2 planetary gear set and the ring gear of the 2-3 planetary gear set that are connected to each other; and the fifth rotary element comprises the carrier of the 2-1 planetary gear set.

6. The multiple-step transmission according to claim 1, wherein the 2-1 planetary gear set comprises a double-pinion planetary gear set, the 2-2 planetary gear set comprises a single-pinion planetary gear set, and the 2-3 planetary gear set comprises a single-pinion planetary gear set, and wherein the first rotary element comprises the carrier of the 2-1 planetary gear set and the sun gear of the 2-3 planetary gear set that are connected to each other; the second rotary element comprises the ring gear of the 2-2 planetary gear set; the third rotary element comprises the ring gear of the 2-1 planetary gear set, and the respective carriers of the 2-2 and 2-3 planetary gear sets, that are connected to each other; the fourth rotary element comprises the sun gear of the 2-2 planetary gear set and the ring gear of the 2-3 planetary gear set that are connected to each other; and the fifth rotary element comprises the sun gear of the 2-1 planetary gear set.

7. The multiple-step transmission according to claim 1, wherein the 2-1 planetary gear set comprises a single-pinion planetary gear set, the 2-2 planetary gear set comprises a double-pinion planetary gear set, and the 2-3 planetary gear set comprises a single-pinion planetary gear set, and wherein the first rotary element comprises the respective sun gears of the 2-1 and 2-2 planetary gear sets that are connected to each other; the second rotary element comprises the ring gear of the 2-3 planetary gear set; the third rotary element comprises the ring gear of the 2-2 planetary gear set and the carrier of the 2-3 planetary gear set that are connected to each other; the fourth rotary element comprises the respective carriers of the 2-1 and 2-2 planetary gear sets and the sun gear of the 2-3 planetary gear set that are connected to each other; and the fifth rotary element comprises the ring gear of the 2-1 planetary gear set.

8. The multiple-step transmission according to claim 1, wherein the 2-1 planetary gear set comprises a single-pinion planetary gear set, the 2-2 planetary gear set comprises a double-pinion planetary gear set, and the 2-3 planetary gear set comprises a single-pinion planetary gear set, and wherein the first rotary element comprises the respective sun gears of the 2-2 and 2-3 planetary gear sets that are connected to each other; the second rotary element comprises the ring gear of the 2-1 planetary gear set; the third rotary element comprises the carrier of the 2-1 planetary gear set; the fourth rotary element comprises the sun gear of the 2-1 planetary gear set, the ring gear of the 2-2 planetary gear set, and the carrier of the 2-3 planetary gear set that are connected to each other; and the fifth rotary element comprises the carrier of the 2-2 planetary gear set and the ring gear of the 2-3 planetary gear set.

9. The multiple-step transmission according to claim 1, wherein the 2-1 planetary gear set comprises a double-pinion planetary gear set, the 2-2 planetary gear set comprises a single-pinion planetary gear set, and the 2-3 planetary gear set comprises a single-pinion planetary gear set, and wherein the first rotary element comprises the respective sun gears of the 2-1 and 2-2 planetary gear sets that are connected to each other; the second rotary element comprises the ring gear of the 2-3 planetary gear set; the third rotary element comprises the ring gear of the 2-1 planetary gear set and the carrier of the 2-3 planetary gear set; the fourth rotary element comprises the carrier of the 2-2 planetary gear set and the sun gear of the 2-3 planetary gear set that are connected to each other; and the fifth rotary element comprises the carrier of the 2-1 planetary gear set and the ring gear of the 2-2 planetary gear set.

10. The multiple-step transmission according to claim 1, wherein the 2-1 planetary gear set comprises a single-pinion planetary gear set, the 2-2 planetary gear set comprises a single-pinion planetary gear set, and the 2-3 planetary gear set comprises a double-pinion planetary gear set, and wherein the first rotary element comprises the respective sun gears of the 2-1 and 2-3 planetary gear sets that are connected to each other; the second rotary element comprises the respective ring gears of the 2-2 and 2-3 planetary gear sets that are connected to each other; the third rotary element comprises the carrier of the 2-2 planetary gear set; the fourth rotary element comprises the carrier of the 2-1 planetary gear set, the sun gear of the 2-2 planetary gear set, and the carrier of the 2-3 planetary gear set that are connected to each other; and the fifth rotary element comprises the ring gear of the 2-1 planetary gear set.

11. The multiple-step transmission according to claim 1, wherein the 2-1 planetary gear set comprises a double-pinion planetary gear set, the 2-2 planetary gear set comprises a single-pinion planetary gear set, and the 2-3 planetary gear set comprises a single-pinion planetary gear set, and wherein the first rotary element comprises the respective sun gears of the 2-1 and 2-2 planetary gear sets that are connected to each other; the second rotary element comprises the respective ring gears of the 2-1 and 2-3 planetary gear sets that are connected to each other; the third rotary element comprises the carrier of the 2-3 planetary gear set; the fourth rotary element comprises the carrier of the 2-2 planetary gear set and the sun gear of the 2-3 planetary gear set that are connected to each other; and the fifth rotary element comprises the carrier of the 2-1 planetary gear set and the ring gear of the 2-2 planetary gear set that are connected to each other.

12. A multiple-step transmission, comprising:
a first transmission portion including
a first intermediate output path which transmits, at a first speed ratio, an input rotary motion of an input member, and
a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and
a second transmission portion including
a 2-1 double-pinion planetary gear set, a 2-2 single-pinion planetary gear set, and a 2-3 single-pinion planetary gear set each of which includes a sun gear, a carrier, and a ring gear, the respective sun gears of the 2-1 and 2-3 planetary gear being connected to each other to provide a first rotary element, the ring gear of the 2-2 planetary gear set providing a second rotary element, the ring gear of the 2-1 planetary gear set, and the respective carriers of the 2-2 and 2-3 planetary gear sets being connected to each other to provide a third rotary element, the sun gear of the 2-2 planetary gear set and the ring gear of the 2-3 planetary gear set being connected to each other to provide a fourth rotary element, the carrier of the 2-1 planetary gear set providing a fifth rotary element,
a first brake which selectively stops a rotary motion of the first rotary element,
a second brake which selectively stops a rotary motion of the second rotary element,
a first clutch which selectively connects the fifth rotary element to the second intermediate output path of the first transmission portion,
a second clutch which selectively connects the first rotary element to the second intermediate output path,
a third clutch which selectively connects the second rotary element to the first intermediate output path of the first transmission portion, and
a fourth clutch which selectively connects the third rotary element to the first intermediate output path,
the fourth rotary element being connected to an output member so as to provide an output rotary motion of the output member,
each of the first and second brakes and the first, second, third, and fourth clutches being switched between an engaged state thereof and a disengaged state thereof, so as to provide the output rotary motion in each of a plurality of speed steps.

13. A multiple-step transmission, comprising:
a first transmission portion including
a first intermediate output path which transmits, at a first speed ratio, an input rotary motion of an input member, and a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and a second transmission portion including a 2-1 double-pinion planetary gear set, a 2-2 single-pinion planetary gear set, and a 2-3 single-pinion planetary gear set each of which includes a sun gear, a carrier, and a ring gear, the carrier of the 2-1 planetary gear set and the sun gear of the 2-3 planetary gear set being connected to each other to provide a first rotary element; the ring gear of the 2-2 planetary gear set providing a second rotary element; the ring gear of the 2-1 planetary gear set and the respective carriers of the 2-2 and 2-3 planetary gear sets being connected to each other to provide a third rotary element; the sun gear of the 2-2 planetary gear set and the ring gear of the 2-3 planetary gear set being connected to each other to provide a fourth rotary element; and the sun gear of the 2-1 planetary gear set providing a fifth rotary element, a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion of the output member, each of the first and second brakes and the first, second, third, and fourth clutches being switched between an engaged state thereof and a disengaged state thereof, so as to provide the output rotary motion in each of a plurality of speed steps.

14. A multiple-step transmission, comprising:

a first transmission portion including a first intermediate output path which transmits, at a first speed ratio, an input rotary motion of an input member, and a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and a second transmission portion including a 2-1 single-pinion planetary gear set, a 2-2 double-pinion planetary gear set, and a 2-3 single-pinion planetary gear set each of which includes a sun gear, a carrier, and a ring gear, the respective sun gears of the 2-1 and 2-2 planetary gear sets being connected to each other to provide a first rotary element; the ring gear of the 2-3 planetary gear set providing a second rotary element; the ring gear of the 2-2 planetary gear set and the carrier of the 2-3 planetary gear set being connected to each other to provide a third rotary element; the respective carriers of the 2-1 and 2-2 planetary gear sets and the sun gear of the 2-3 planetary gear set being connected to each other to provide a fourth rotary element; and the ring gear of the 2-1 planetary gear set providing a fifth rotary element, a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion of the output member, each of the first and second brakes and the first, second, third, and fourth clutches being switched between an engaged state thereof and a disengaged state thereof, so as to provide the output rotary motion in each of a plurality of speed steps.

15. A multiple-step transmission, comprising:

a first transmission portion including a first intermediate output path which transmits, at a first speed ratio, an input rotary motion of an input member, and a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and a second transmission portion including a 2-1 single-pinion planetary gear set, a 2-2 double-pinion planetary gear set, and a 2-3 single-pinion planetary gear set each of which includes a sun gear, a carrier, and a ring gear, the respective sun gears of the 2-2 and 2-3 planetary gear sets being connected to each other to provide a first rotary element; the ring gear of the 2-1 planetary gear set providing a second rotary element; the carrier of the 2-1 planetary gear set providing a third rotary element; the sun gear of the 2-1 planetary gear set, the ring gear of the 2-2 planetary gear set, and the carrier of the 2-3 planetary gear set being connected to each other to provide a fourth rotary element; and the carrier of the 2-2 planetary gear set the ring gear of the 2-3 planetary gear set being connected to each other to provide a fifth rotary element, a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion of the output member, each of the first and second brakes and the first, second, third, and fourth clutches being switched between an engaged state thereof and a disengaged state thereof, so as to provide the output rotary motion in each of a plurality of speed steps.

16. A multiple-step transmission, comprising:

a first transmission portion including a first intermediate output path which transmits, at a first speed ratio, an input rotary motion of an input member, and a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and a second transmission portion including a 2-1 double-pinion planetary gear set, a 2-2 single-pinion planetary gear set, and a 2-3 single-pinion planetary gear set each of which includes a sun gear, a carrier, and a ring gear, the respective sun gears of the 2-1 and 2-2 planetary gear sets being connected to each other to provide a first rotary element; the ring gear of the 2-3 planetary gear set providing a second rotary element; the ring gear of the 2-1 planetary gear set and the carrier of the 2-3 planetary gear set being connected to provide a third rotary element; the carrier of the 2-2 planetary gear set and the sun gear of the 2-3 planetary gear set being connected to each other to provide a fourth rotary element; and the carrier of the 2-1 planetary gear set the ring gear of the 2-2 planetary gear set being connected to each other to provide a fifth rotary element, a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion of the output member, each of the first and second brakes and the first, second, third, and fourth clutches being switched between an engaged state thereof and a disengaged state thereof, so as to provide the output rotary motion in each of a plurality of speed steps.

17. A multiple-step transmission, comprising:

a first transmission portion including a first intermediate output path which transmits, at a first speed ratio, an input rotary motion of an input member, and a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and a second transmission portion including a 2-1 single-pinion planetary gear set, a 2-2 single-pinion planetary gear set, and a 2-3 double-pinion planetary gear set each of which includes a sun gear, a carrier, and a ring gear, the respective sun gears of the 2-1 and 2-3 planetary gear sets being connected to each other to provide a first rotary element; the respective ring gears of the 2-2 and 2-3 planetary gear sets being connected to each other to provide a second rotary element; the carrier of the 2-2 planetary gear set providing a third rotary element; the carrier of the 2-1 planetary gear set, the sun gear of the 2-2 planetary gear set, and the carrier of the 2-3 planetary gear set being connected to each other to provide a fourth rotary element; and the ring gear of the 2-1 planetary gear set providing a fifth rotary element, a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion of the output member, each of the first and second brakes and the first, second, third, and fourth clutches being switched between an engaged state thereof and a disengaged state thereof, so as to provide the output rotary motion in each of a plurality of speed steps.

18. A multiple-step transmission, comprising:

a first transmission portion including a first intermediate output path which transmits, at a first speed ratio, an input rotary motion of an input member, and a second intermediate output path which transmits the input rotary motion of the input member, at a second speed ratio greater than the first speed ratio, so that a rotational speed of the rotary motion transmitted by the second intermediate output path is lower than a rotational speed of the rotary motion transmitted by the first intermediate output path; and a second transmission portion including a 2-1 double-pinion planetary gear set, a 2-2 single-pinion planetary gear set, and a 2-3 single-pinion planetary gear set each of which includes a sun gear, a carrier, and a ring gear, the respective sun gears of the 2-1 and 2-2 planetary gear sets being connected to each other to provide a first rotary element; the respective ring gears of the 2-1 and 2-3 planetary gear sets being connected to each other to provide a second rotary element; the carrier of the 2-3 planetary gear set providing a third rotary element; the carrier of the 2-2 planetary gear set and the sun gear of the 2-3 planetary gear set being connected to each other to provide a fourth rotary element; and the carrier of the 2-1 planetary gear set and the ring gear of the 2-2 planetary gear set being connected to each other to provide a fifth rotary element, a first brake which selectively stops a rotary motion of the first rotary element, a second brake which selectively stops a rotary motion of the second rotary element, a first clutch which selectively connects the fifth rotary element to the second intermediate output path of the first transmission portion, a second clutch which selectively connects the first rotary element to the second intermediate output path, a third clutch which selectively connects the second rotary element to the first intermediate output path of the first transmission portion, and a fourth clutch which selectively connects the third rotary element to the first intermediate output path, the fourth rotary element being connected to an output member so as to provide an output rotary motion of the output member, each of the first and second brakes and the first, second, third, and fourth clutches being switched between an engaged state thereof and a disengaged state thereof, so as to provide the output rotary motion in each of a plurality of speed steps.

19. The multiple-step transmission according to claim 12, wherein the output rotary motion is provided in each of at least seven forward speed steps selected from the group consisting of a first forward speed step, a second forward speed step, a third forward speed step, a fourth forward speed step, a fifth forward speed step, a sixth forward speed step, a seventh forward speed step, and an eighth forward speed step, and wherein the first clutch and the second brake are engaged to provide the output rotary motion in the first forward speed step having a first speed ratio as a greatest speed ratio, the first clutch and the first brake are engaged to provide the output rotary motion in the second forward speed step having a second speed ratio smaller than the first speed ratio of the first forward speed step, the first clutch and the second clutch are engaged to provide the output rotary motion in the third forward speed step having a third speed ratio smaller than the second speed ratio of the second forward speed step, the first clutch and the third clutch are engaged to provide the output rotary motion in the fourth forward speed step having a fourth speed ratio smaller than the third speed ratio of the third forward speed step, the third clutch and the fourth clutch are engaged to provide the output rotary motion in the fifth forward speed step having a fifth speed ratio smaller than the fourth speed ratio of the fourth forward speed step, the second clutch and the fourth clutch are engaged to provide the output rotary motion in the sixth forward speed step having a sixth speed ratio smaller than the fifth speed ratio of the fifth forward speed step, the fourth clutch and the first brake are engaged to provide the output rotary motion in the seventh forward speed step having a seventh speed ratio smaller than the sixth speed ratio of the sixth forward speed step, and the third clutch and the first brake are engaged to provide the output rotary motion in the eighth forward speed step having an eighth speed ratio smaller than the seventh speed ratio of the seventh forward speed step.

20. The multiple-step transmission according to claim 12, wherein the output rotary motion is provided in each of a first forward speed step, a second forward speed step, a third forward speed step, a fourth forward speed step, a fifth forward speed step, a sixth forward speed step, a seventh forward speed step, and an eighth forward speed step, and wherein the first clutch and the second brake are engaged to provide the output rotary motion in the first forward speed step having a first speed ratio as a greatest speed ratio, the first clutch and the first brake are engaged to provide the output rotary motion in the second forward speed step having a second speed ratio smaller than the first speed ratio of the first forward speed step, the first clutch and the second clutch are engaged to provide the output rotary motion in the third forward speed step having a third speed ratio smaller than the second speed ratio of the second forward speed step, the first clutch and the third clutch are engaged to provide the output rotary motion in the fourth forward speed step having a fourth speed ratio smaller than the third speed ratio of the third forward speed step, the third clutch and the fourth clutch are engaged to provide the output rotary motion in the fifth forward speed step having a fifth speed ratio smaller than the fourth speed ratio of the fourth forward speed step, the second clutch and the fourth clutch are engaged to provide the output rotary motion in the sixth forward speed step having a sixth speed ratio smaller than the fifth speed ratio of the fifth forward speed step, the fourth clutch and the first brake are engaged to provide the output rotary motion in the seventh forward speed step having a seventh speed ratio smaller than the sixth speed ratio of the sixth forward speed step, and the third clutch and the first brake are engaged to provide the output rotary motion in the eighth forward speed step having an eighth speed ratio smaller than the seventh speed ratio of the seventh forward speed step.

21. The multiple-step transmission according to claim 1, wherein the first transmission portion comprises a first planetary gear set including three elements a first one of which is connected to the input member and is rotated with the input member, a second one of which is fixed such that the second element is not rotatable about an axis thereof, and a third one of which provides an intermediate output member whose rotational speed is reduced from a rotational speed of the input rotary motion of the input member, and wherein the first intermediate output path of the first transmission portion transmits, at the first speed ratio of 1.0, a rotary motion of the first element to the second transmission portion, and the second intermediate output path of the first transmission portion transmits, at the second speed ratio greater than the first speed ratio, a rotary motion of the third element to the second transmission portion.

* * * * *